(12) United States Patent
Black et al.

(10) Patent No.: US 7,567,523 B2
(45) Date of Patent: Jul. 28, 2009

(54) SYSTEM AND METHOD FOR NETWORK TOPOLOGY DISCOVERY

(75) Inventors: Richard Black, Cambridge (GB); Austin Donnelly, Cambridge (GB); Cédric Fournet, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 916 days.

(21) Appl. No.: 10/768,582

(22) Filed: Jan. 29, 2004

(65) Prior Publication Data

US 2005/0169193 A1 Aug. 4, 2005

(51) Int. Cl.
*H04L 12/28* (2006.01)
*G06F 15/173* (2006.01)

(52) U.S. Cl. .................. 370/255; 370/401; 709/224
(58) Field of Classification Search ......... 370/252–256, 370/351, 389, 392, 400, 401; 709/208, 209, 709/220–224
See application file for complete search history.

(56) References Cited

U.S. PATENT DOCUMENTS

| | | | | |
|---|---|---|---|---|
| 5,886,643 A | * | 3/1999 | Diebboll et al. ............ | 709/224 |
| 6,115,394 A | * | 9/2000 | Balachandran et al. ...... | 370/477 |
| 6,359,894 B1 | * | 3/2002 | Hong et al. ................. | 370/402 |
| 6,426,947 B1 | * | 7/2002 | Banker et al. ............... | 370/254 |
| 6,587,440 B1 | * | 7/2003 | Dawes ........................ | 370/255 |
| 6,654,802 B1 | * | 11/2003 | Oliva et al. ................. | 709/224 |
| 6,667,955 B1 | * | 12/2003 | Blanc et al. ................. | 370/220 |
| 6,674,738 B1 | * | 1/2004 | Yildiz et al. ................ | 370/338 |
| 2003/0112809 A1 | * | 6/2003 | Bharali et al. .............. | 370/400 |
| 2005/0047350 A1 | * | 3/2005 | Kantor et al. .............. | 370/254 |
| 2007/0263553 A1 | * | 11/2007 | Bharali et al. .............. | 370/254 |

* cited by examiner

*Primary Examiner*—Hong Cho
(74) *Attorney, Agent, or Firm*—Workman Nydegger

(57) ABSTRACT

A system and method for discovering network topology by various switch training and probing methods. Segments are discovered by having computers enter a promiscuous mode and determining from packets sent to a selected computer which computers see which other computers in the network. From the segments, various switch interconnections are determined, by having different computers train switches as to a training address and seeing which computers receive probe packets sent to that training address from another computer. Various training and probing methods are described that locate intermediate segments, deep switches, switch interconnections, and edge and singleton cases. In one implementation, a master computer coordinates the other computers (and devices) in the network to send the training and probing packets, and report on received packets, in order to determine the network topology.

73 Claims, 38 Drawing Sheets

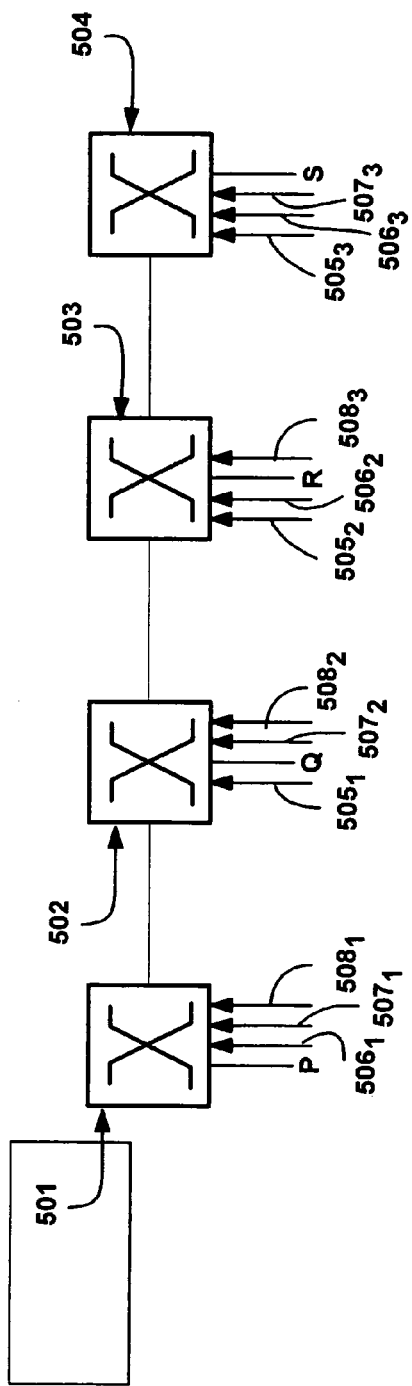
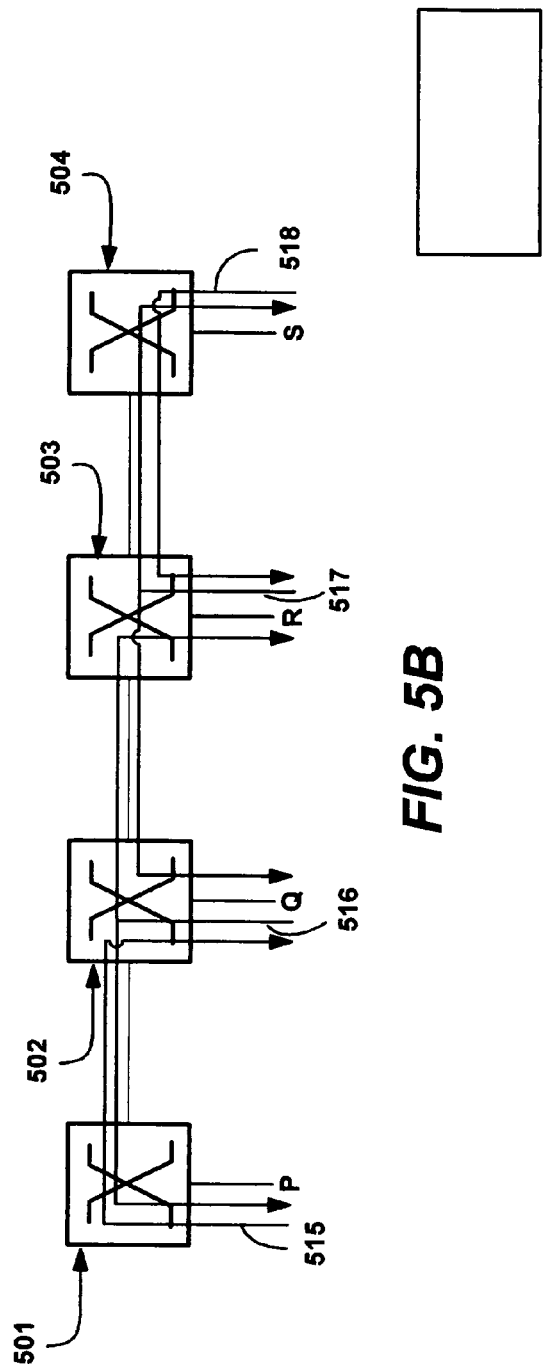
FIG. 5A
FIG. 5B

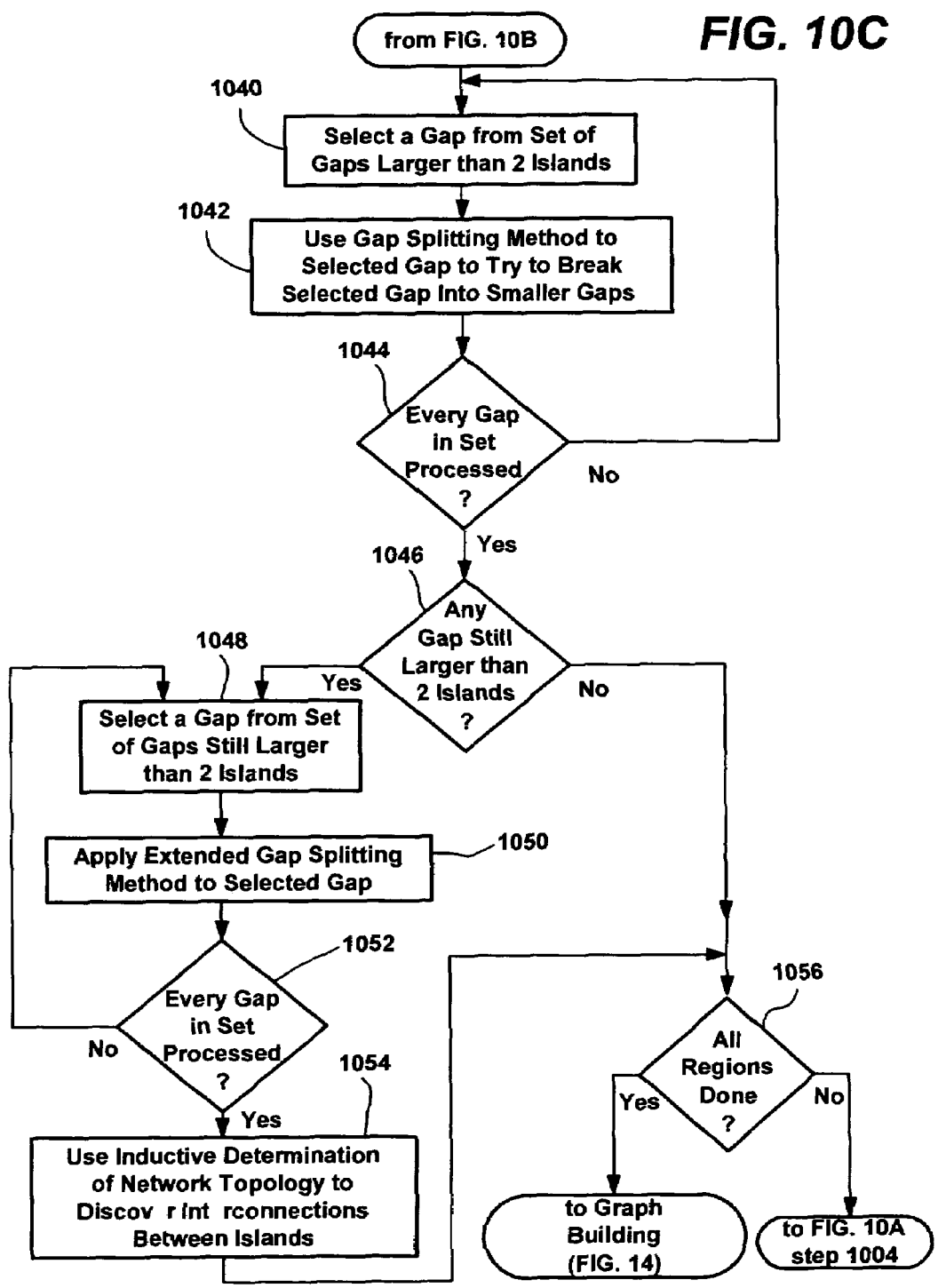

SYSTEM AND METHOD FOR NETWORK TOPOLOGY DISCOVERY

FIELD OF THE INVENTION

The present invention is generally directed to computer systems and networks, and more particularly to network topology.

BACKGROUND OF THE INVENTION

Network topology discovery is the practice of mapping a network to discover a graph representing hosts (e.g. computer systems), network elements (e.g. routers or switches), and the various interconnections between them. Topology discovery can be at a variety of levels ranging from Internet-scale mapping efforts to small-scale home area networks. However, the techniques applicable to one effort are not necessarily transferable to others. Further, the amount of support for topology discovery provided by the network elements also varies. For example, network elements typically found in the home area provide minimal or no support, while enterprise Local Area Networks (LANs) usually include Simple Network Management Protocol (SNMP)-capable switches that allow their own knowledge about the topology of the network to be extracted using a remote management interface.

Knowledge of the network topology is useful for a variety of reasons, involving the computer systems themselves, direct users of computer systems, and support technicians. As a first example, computer systems attempting to carry media streams between them over a computer network can benefit from various schemes to do admission control, congestion avoidance and/or bandwidth adaptation in order to present the best quality media stream possible. In a general network formed from many network links and network elements, the bandwidth, congestion and usage of the links can be varied. It is generally accepted that schemes which attempt to monitor and adapt to network behavior provide better quality than those that do not. Any automated scheme of monitoring the network will be more easily constructed, or perform more accurate monitoring, if the organization (topology) of the network links is available to that scheme. Systems exist to analyze a link or path in the network; use of the topological information can lead to a more efficient analysis of the links and paths in the network. Likewise, if a computer system, or agent running on a computer system, is performing admission control of streams through some network element or network link on behalf of the streams of data packets wishing to use that network element or network link, such a system will act with greater information if the topological arrangement of the network links and network elements is known to it.

As a second example, the availability of network topology to users can benefit the level of troubleshooting which can be carried out, even by ordinary, untrained users. For example, if the computers attached to some network element become uncommunicative simultaneously, it is likely to be the network element that is at fault, rather than a correlated failure of the computer systems. Helpful fault diagnosis is particularly important in small office network environments and home network environments where it is unlikely that a dedicated support staff is available on site to resolve problems.

As a third example, where professional support staff is available, such as in an enterprise network environment, knowing the topology of the network is one of the key pieces used for operations, maintenance and troubleshooting. Software products exist that are designed to present the network topology to the enterprise administrator.

Previous work in the field of network topology discovery includes discovery schemes that can be characterized under a number of different classifications. For example, one classification is active or passive, which is directed towards whether the scheme requires the deliberate sending of additional traffic into the network in order to cause its topology to be discovered, or whether the topology can be discovered entirely passively from observation of real traffic naturally present in the network. Another classification is collaborative or non-collaborative, which is directed towards whether the computers attached to the network need to support the topology discovery process in some particular way (e.g., for them to be visible to the network topology), or whether the discovery process can proceed without their aid.

Other ways of classifying topology discovery are directed towards mapping layer, network support, and information properties. In general, one can associate a particular network topology with each communications layer. More particularly, communications systems are structured into multiple layers using concepts of abstraction in order to help deal with issues of complexity, each layer using the services of a lower layer. Topology discovery techniques may be applicable or discover only the structure of the network visible at some particular layer in this hierarchy. For example, the topology may operate at the layer of the Internet Protocol (IP), or at the Ethernet network (IEEE 802.3) layer.

Network support is generally directed toward determining whether the network elements (as distinct from the computers attached to the network) need to support an information protocol (such as the Simple Network Management Protocol (SNMP) or the Cisco Discovery Protocol (CDP)) in order to permit the topology to be discovered. Information properties are directed towards how much information is discovered about the links and elements in the network. For example, information properties consider whether connectivity is the only aspect discovered, or whether information about manufacturer, physical location (distinct from the logical location within the graph of the network), loss rate, error rate, bandwidth, delay or some other properties are discovered. It should be understood that many schemes begin with connectivity information alone and then use it to determine some of these other properties.

Recently, there has been some research into Internet-scale mapping, sometimes called tomography, which tend to be passive, non-collaborative protocols which map at the IP-layer. Mapping enterprise or data-center networks is often performed with commercial products such as IBM/Tivoli's NetView and Hewlett Packard's OpenView, as well as an SNMP software tool generally referred to as Nomad (Paul Coates, "Nomad: Network Mapping and Monitoring" an SNMP software tool distributed by Newcastle University, United Kingdom). In general, these systems work by issuing SNMP queries for Management Information Base (MIB) tables stored in routers, IEEE 802.1d Bridge MIBs, and RMON-2 MIBs (Remote Network Monitoring Management Information Base). These MIBs give information about the ports on the network element (IP router or Ethernet network switch), and include which hosts or other network elements are connected to these ports.

However these MIBs may only contain information on recently active hosts, since bridges timeout their port filtering tables after around five minutes. Also, properly secured network elements will need the mapping system to supply appropriate authentication (known in SNMP as a community string) before allowing access. Another feature of these management interfaces is that there is some variance in how they are implemented, although they are supposed to be standardized. Work-around techniques are needed to deal with these variances, as described in the publication by Bruce Lowekamp, David R. O'Hallaron and Thomas R. Gross, "Topology Discovery for Large Ethernet networks" in Proceedings of ACM SIGCOMM 2001. In general, the use of MIBs presents a fairly efficient technique for stitching together the partial topologies resulting from SNMP queries into a consistent whole, using contradictions to quickly narrow down the possible interconnections between switches.

A significant shortcoming with any of these known techniques is that in many cases, certain areas of networks have heretofore remained unmapped. One reason for this is that in many cases, no one has control over the hardware with respect to being able to automatically identify the equipment and its capabilities. Even if new standards are implemented with respect to hardware that does identify itself and its capabilities, there will still remain large quantities of legacy Ethernet network equipment in circulation. Moreover, inexpensive switches and hubs (e.g., for home networking or small business use) will likely never implement such complex behavior, due to it being too costly.

SUMMARY OF THE INVENTION

Briefly, the present invention provides a method and system for discovering the topology of an Ethernet network of computers and other elements, which using the taxonomy described above, is active, collaborative (of the computer systems), operates at the data-link layer, and does not require any support from the network elements. Using only the computer systems of a network, the method and system provide significant detail of the network, without needing support from the network elements. Network topology information is thus provided which previously was unavailable. This information, possibly in conjunction with that discovered by prior techniques, can provide substantial benefits and advantages.

In one implementation of the present invention, the computer systems incorporate a software component which is capable of collaboration with similar components incorporated on other computer systems attached to the network of interest. The components arrange to inject traffic into the network, and the components also observe the links on which they are connected to detect such injected traffic, whether injected by that computer system or one of the collaborating computer systems. The effect of the routing of the injected traffic by the network is that the traffic will pass over some links, will not pass over some links, and in some cases may be discarded by the network. The detection of the link or links over which the injected traffic passes, and the link or links over which the injected traffic does not pass, or the loss of the injected traffic within the network can be used according to several aspects of the present invention to determine the organization of the network links. According to one aspect of the present invention, the system and method can discover not only the topology of those links of the network on which collaborative systems are directly connected, but can also infer the topology of other links on the network on which no such systems are directly connected.

The present invention also includes a method and system for the coordination and organization of the collaborating computer systems, while carrying out the above-described techniques. In general, in accordance with several aspects of the present invention, the coordination method is designed to limit the performance-detracting effects on the network of the traffic that is injected to analyze the topology of the network. The coordination method is designed to limit such performance-detracting effects on the computer system that initiates a discovery of the topology as well as the portion of the network close to the attachment of that computer system. Further, the coordination method is designed such that the discovery of the topology proceeds in an orderly and coherent way when multiple computer systems attempt to initiate a discovery of the topology. Moreover, the coordination method is designed to prevent a malicious computer system on a network from abusing the collaborative software components by causing more negative effects on the computer systems or network than those that could already be achieved by the malicious computer system acting without the presence of the collaborative components, and the method is also designed to prevent a malicious computer system on the network from abusing the collaborative software components to cause an additional loading or performance degradation on the computer systems or network (relative to what could already be achieved by the malicious computer system acting without the presence of the collaborative components, or could be achieved by the malicious computer system acting to request a discovery of the topology as if it were non-malicious).

In order to facilitate the testing of the correct execution of the operation of the topology discovery method and the coordination method without the need to construct a physical network with those properties, an implementation of the present invention can be executed on a network simulated by another software component. It should be understood that this aspect of the invention is highly beneficial for the regression testing of the software code in a product before the product is released on general sale.

Other objects and advantages of the present invention will become apparent from the following detailed description of the drawings, the properties of the network elements applicable to the method, the detailed operation of the topology discovery method, and the detailed operation of the coordination method.

BRIEF DESCRIPTION OF THE DRAWINGS

FIGS. 5A and 5B each comprise a block diagram showing a network of several switches and computers, illustrating an example of neighbor flooding by which the location of adjacent switches in a network may be discovered;

FIGS. 10A to 10C comprise a flow diagram generally representing a summary of the operations for mapping a network topology in accordance with various aspects of the present

DETAILED DESCRIPTION

Exemplary Operating Environment

Figure 1:
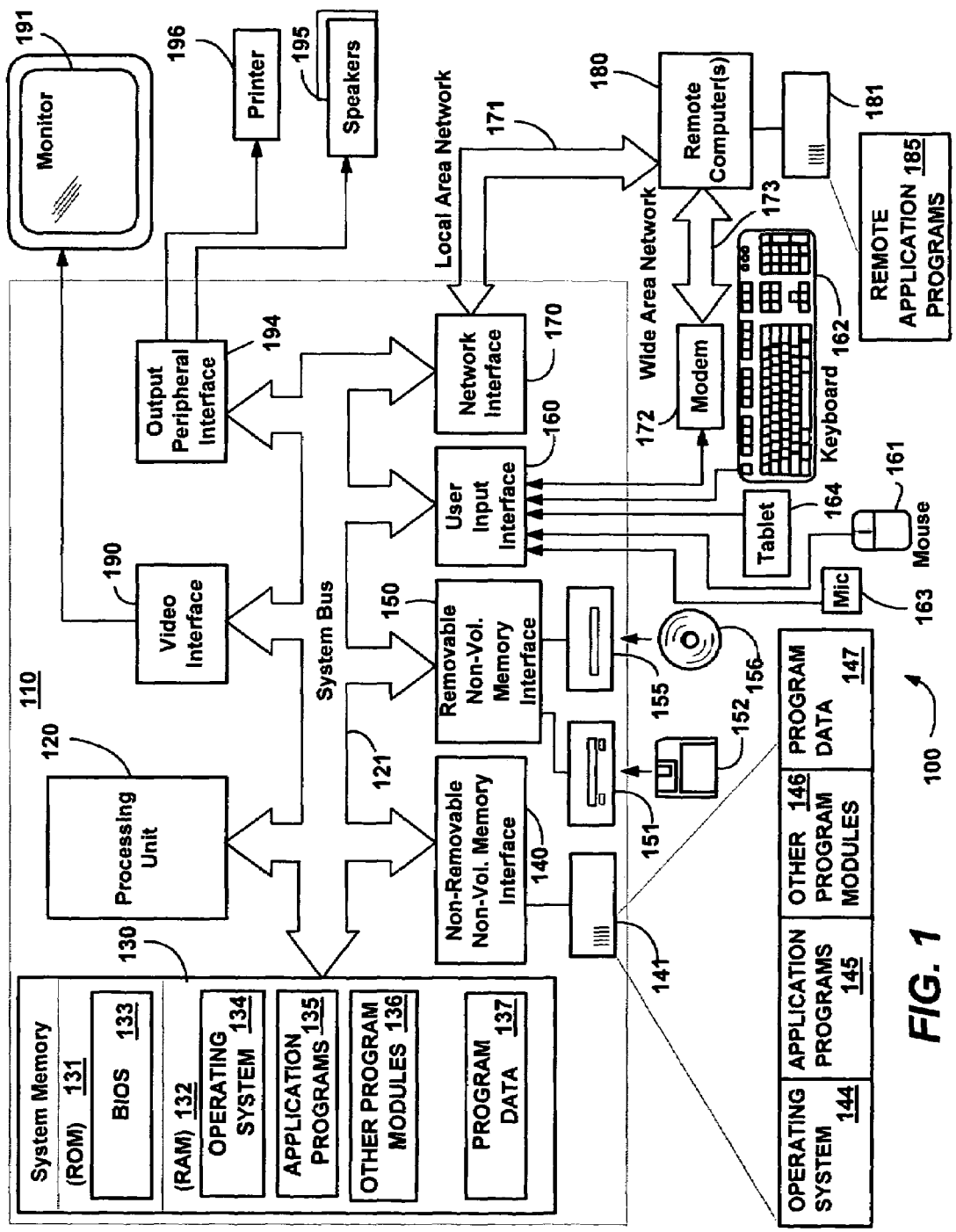
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In general, hereinafter a computer is referred to in the general sense of a device with an attachment to the network which is capable of containing computer processing components or computer code. Computers with more than one attachment to a computer network are not excluded from the present invention, however it should be understood that the following descriptions and examples describe such computers as if they were independent computers attached to the network at the multiple points of attachment. In general, the presence of any computing platform attached to the network is within the spirit and scope of the present invention.

Topology Discovery

Figure 2A:
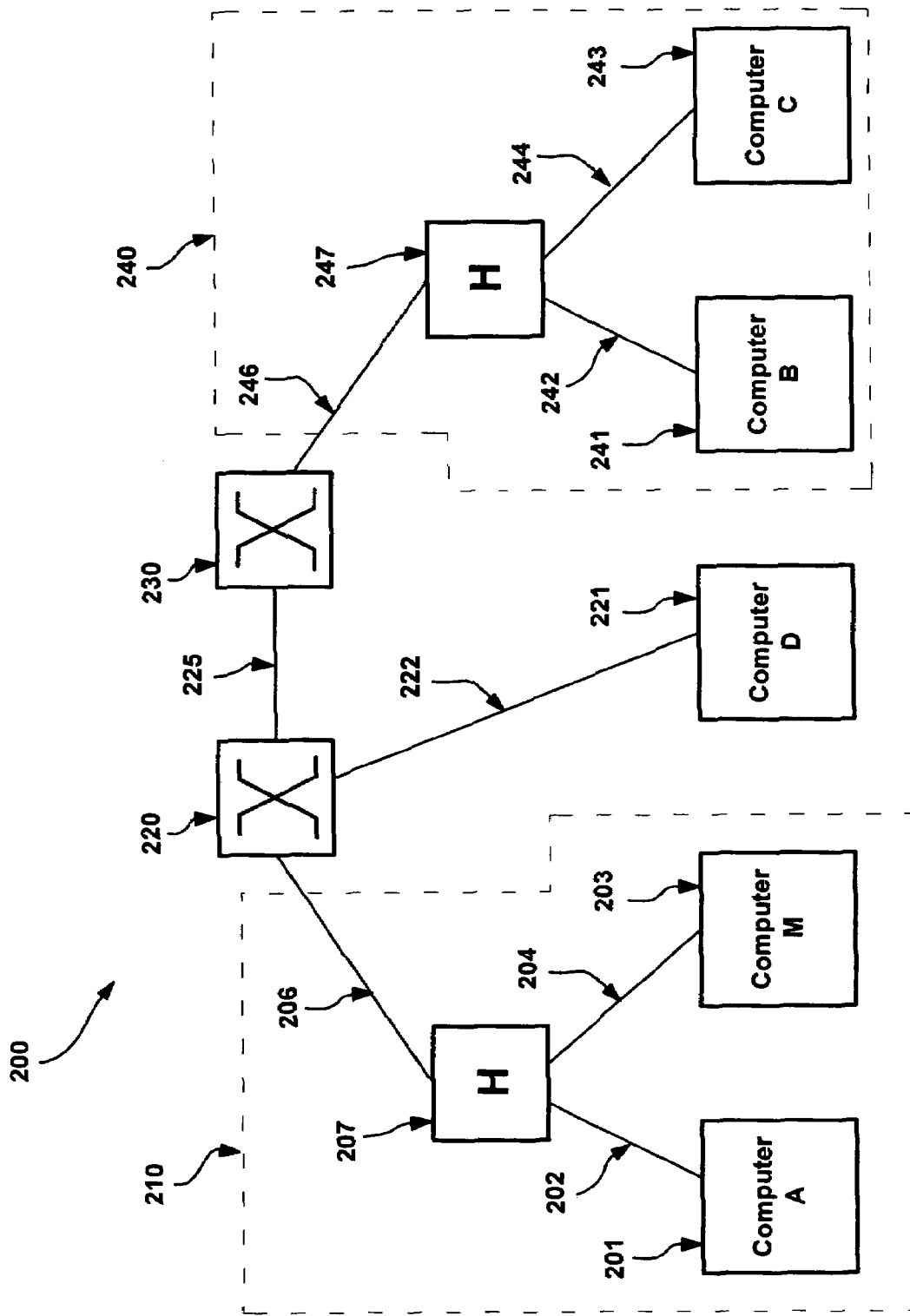
FIG. 2A is a block diagram generally representing an example network, including several distinct types of components into which the current invention may be incorporated.

FIG. 2A illustrates an example of a suitable network system environment 200 in which the present invention may be implemented. The network system environment 200 is only one example of a suitable networking environment and is not intended to suggest any limitation as to the scope of use or functionality of the invention. Neither should the networking environment 200 be interpreted as having any dependency or requirement relating to any one or combination of components illustrated in the example networking environment 200.

As represented in FIG. 2A, in which the overall network 200 is used to describe certain aspects of the present invention, computers 201, 203, 221, 241 and 243 are connected to the network by wires 202, 204, 222, 242 and 244, respectively. The wires 202 and 204 connect the computers 201 and 203, respectively, to a network element referred to as a hub 207, while similarly the wires labeled 242 and 244 respectively connect the computers 241 and 243 to the hub 247. In turn, via wire 206, the hub 207 is connected to a network element referred to as a switch 220. The hub 247 is connected to a switch 230 by the wire 246. The switch 220 and switch 230 are connected together via wire 225. The computer 221 is connected to the switch 220 by the wire 222.

The Institution of Electrical and Electronic Engineers (IEEE) uses certain specific terminology to refer to components of its standardized local area computer packet communication networks (including Ethernet network, also known as IEEE 802.3) where the components have particular forms of functionality. However, these terms are frequently used incorrectly in the marketing material of companies producing such equipment, and thus are generally defined herein, and used hereinafter in the present application. Notwithstanding, equivalent mechanisms, structure and/or functionality are feasible, and the present invention is not limited to the terminology used in the definitions set forth herein.

In general, a segment is a portion of the network in which packets are not deliberately constrained from being visible by the computers attached to that portion of the network. In other words, in normal operation (excepting a data transmission error), the computers attached to a segment are presented with a copy of every packet which is transmitted onto the segment of the network. Under normal operation, a computer system uses its network interface card to exclude from consideration by the computer system any packet which bears a destination address other than that of the computer system, or of certain multicast or broadcast addresses (which are special addresses put as the destination address of packets which should be considered by a group of computers, or all computers). A piece of wire and the computer or computers attached to it form a segment. A computer may also configure its network interface card to receive all the packets that are present on the locally attached segment irrespective of the destination address, which is known as operating in a "promiscuous mode."

A hub is generally a device which connects multiple pieces of wire together to form a single larger segment comprised of the union of the devices attached to those pieces of wire. Multiple hub devices may be connected together directly to form a single larger segment. For example, in FIG. 2A, there are four segments shown. One segment (indicated by the dashed box) labeled 210 is comprised of wires 202, 204 and 206 together with hub 207 and the computers attached to this segment, namely computers 201 and 203. Another segment is comprised of computer 221 and wire 222. A third segment (indicated by the dashed box) labeled 240 is comprised of wires 242, 244 and 246, hub 247 and computers 241 and 243. Wire 225 forms the fourth segment. As can be readily understood, some segments in a network may have computers present on the segment and some may not. It is generally apparent which type of segment is being referred to when the term "segment" is used herein. Where it is necessary to disambiguate these two types of segment, the term "shallow segment" may be used for the former (one or more computers present) and the term "deep segment" for the latter (no computers present), e.g., with respect to FIG. 2A, segment 225 is a deep segment and the others are shallow.

A switch is generally a device which permits data packets to travel between multiple disjoint segments. (Switches may be connected to a single segment; such switches do not serve any purpose, and are not considered further in our description.) A switch differs from a hub in that a switch attempts to constrain the segments of the network over which data packets travel to only those segments which are necessary for the packet to travel over. A switch does this by passively learning which of the segments attached to it provide packets with a particular source address, and subsequently sending packets having that address as a destination to only that segment. Where a switch does not know any information about an address, then it replicates the packet destined for that address to all segments, except to that segment from which the packet arrived.

By way of example, consider the network 200 shown in FIG. 2A being freshly initialized (e.g., immediately subsequent to power having been applied). If the computer 201 sends a packet to the address of the computer 241, then the packet travels across the segment 210 (being visible to the network interfaces of the computers on segment 210) and arrives at the switch 220. In this freshly initialized state, the switch 220 does not know any information about the address of the computer 241, and thus the switch 220 sends the packet on the wire 222 (towards the computer 221) and on the wire 225 (to the switch 230). At the same time, the switch 220 learns from the source address in the packet that the machine 201 was "on" the segment 210.

Continuing with the example, the switch 230 also does not know about the address of the computer 241, and thus sends the packet onto the segment 240. The switch 230 also learns that the address of 201 was on the segment (the wire) 225 from the perspective of the switch 230. The packet then arrives at the computer 241, as it is visible to the network interfaces of each of the computers on the segment 240. If the computer 241 replies to this packet by sending a packet addressed to the computer 201, this reply packet travels across the segment 240. The switch 230 would detect that destination address 201 was on the segment (wire) 225 and send the packet across the segment 225 to the switch 220. Because, the switch 220 has already learned that the computer 201 is on the segment 210, the switch 200 sends the packet on that segment, and not on the segment corresponding to the wire 222. At the same time the switch 220 would learn that the computer 241 was on the segment 225 and so would not send any subsequent packets with that destination to the segment 222. Likewise if the computer 243 were to send a packet to the computer 241, it would be visible to the switch 230 (since it is attached to the segment 240 on which the packet passes), but the switch 230 would not send the packet onto the segment 225 because the switch 230 already knows that the computer 241 is on the segment 240.

To maintain the address information corresponding to which addresses are on which segments, according to the source information they see in packets which they are manipulating, switches include tables which they continuously update. Switches can be implemented in different ways, and thus switches sometimes take a period of time between observing a packet and learning that the source address of the packet is "on" the segment on which the packet arrived. Switches also time-out or deliberately forget to which segment a computer is attached if they do not see any packets from that computer in a long time (e.g., the IEEE recommends five minutes, but permits between ten and one million seconds).

An Ethernet network is configured in a tree topology, rather than an arbitrary graph, so that packets (such as broadcast packets) do not circulate indefinitely. This means that there can be no redundant links in an Ethernet network topology. A bridge (not shown in FIG. 2A) is a network element like a switch, with the additional property that a bridge can communicate with other bridges to determine the presence of redundant links in a topology and to selectively exclude them from normal operation of the topology. As used herein, any distinction between switches and bridges is immaterial to the present invention. Note that the present invention applies to any computer network that includes segments, hubs and switches, comprising those in which packets on a segment are visible by the network interface cards of the computers on the segment, and the switches learn from the source address in packets where to send subsequent packets, and send packets on all connected segments if the switch does not know where the location of the destination is. An Ethernet is one example of such a network; however it should be understood that the present invention is not limited to an Ethernet, but covers numerous alternative computer networks.

Turning to an explanation of topology discovery methods and systems in accordance with an aspect of the present invention, one method and system for Ethernet topology discovery operates by applying a method of deriving information from each of a number of steps, which are each performed in order to determine the topology of the network. As mentioned above, the network interface of a computer system can be instructed to enter a promiscuous mode in which the network interface receives all packets that reach the computer system, irrespective of whether the destination address on the packet matches the address of the computer's network interface card. This technique has been used since the earliest days of local area networks to facilitate the analysis of network traffic on the segment, since it permits one computer to observe and analyze the traffic traveling between two other computers on the same segment. Note that once a switch learns from the packets traveling through it about addresses and segments, the switch prevents a computer network interface in promiscuous mode on one segment from receiving (and thus observing) the packets traveling on another segment in the network. These properties are well known and understood in the art.

Shallow Segment Detection

In accordance with one aspect of the present invention, there is provided a method and system referred to as "shallow segment detection" that leverages the properties of promiscuous mode to discover shallow segments present in the network, using a carefully constructed sequence of packets. The method proceeds by a number of steps involving each computer system present on the network. In a first step, the computer systems put their network interfaces into the promiscuous mode, and train each of the switches in the entire network as to their location, as described below with reference to an overall coordination method of the present invention. Second, a particular computer system such as computer system M (the computer also labeled 203 in FIG. 2A) is selected and is referred to as the "collector" for the method. This computer is normally the computer which has initiated an instance of discovering the network topology. Third, each other computer system, such as computer systems A, B, C and D (201, 241, 243 and 221 in the example of FIG. 2A), sends a packet to the selected computer system M and at the same time observes and records which packets it observes from the other computers also sent to the selected computer system M. Fourth, each computer reports the source addresses of the packets that it was able to observe in step three.

From the received packets, the computer M then constructs a Boolean matrix called a "sees" matrix, which can be used to determine if two computers are on the same segment. It records that computer A sees computer B if computer A was able to observe a packet from computer B to computer M. Note that as used herein, the term "see" and its derivatives is not (of course) intended to mean see in a visual sense, but instead refers to whether a given computer receives the packet of another computer and is thus aware of its activity. Further, note that seeing another computer is not necessarily a symmetric relationship. For example, consider FIG. 2A: if the computer 203 is chosen as computer M, and computer 201 is computer A, and computer 241 is B, then A sees B, but computer B does not see computer A. This is because computers A and M are on the same segment. The sees matrix needs to be manipulated to adjust for this; the general rule is that two computers are in the same segment only if both are capable of seeing the other, that is, when computer A sees computer B and also computer B sees computer A. This allows the segments (specifically those segments on which there is at least one computer) to be determined. The data manipulation methods used to make this determination from the sees matrix, as with other data manipulation methods and systems, are described below with reference to various processing methods and systems.

Note that there is a particular exception with the above method which needs to be handled, in that most computer network interfaces or the operating systems running on a computer system are designed such that if a computer sends a packet to itself, the packet is never actually transmitted but is instead internally looped back. This design has several benefits in normal operation, including that bandwidth on the segment is not consumed by such traffic, and also that the computer can be assured of privacy of such traffic. Therefore it is assumed not possible for computer M to send a packet to computer M in order to permit the other computers on the same segment as it to see the packet. As a result, another way of determining which computers are on the same segment as the computer M is required.

One possible method is to use the preliminary information from the sees matrix to pick another computer from some other segment in the network. That computer could also repeat the steps one to four described above (possibly for a subset of computers focusing on computers likely to be close to M based on the information in the original sees matrix recovered by M) and then the sees matrix information from the two different points in the network could be combined to produce the final correct result. This method correctly detects the computers on the same segment as M for most networks; however the method fails to correctly distinguish cases wherein all computers are on the same segment as M, or wherein two shallow segments are in the network with M on one segment and all the other computers on the other. Also the method requires many additional packets to be sent and thus is relatively inefficient.

Instead, an alternative is provided comprising a method permitting M to transmit a packet which remains on its local segment, such that any computer on the segment may check whether it sees that packet, in a manner similar to steps three and four above.

Local Segment Transmission

In accordance with an aspect of the present invention, another method and system known as "local segment transmission" is provided and described herein, and can be used to permit a computer to transmit a packet which remains on its local segment. Note that the IEEE have standardized certain specific destination addresses called segment-local addresses, whereby a switch device is required (by the standard) that it should not forward a packet sent to such a destination address. Further note that if this aspect of the standard was known to be implemented correctly, then this technique could be applied to the purpose of topology discovery and used by the present invention. However in practice, many manufacturers (especially manufacturers of home networking equipment, which is one type of network that the present invention supports) do not implement this aspect of the standard, and thus this method is unreliable.

Instead of attempting to use such an unreliably implemented standard, the local segment transmission method of the present invention proceeds by two steps. In a first step, the computer M chooses a new network address X which is not in use by any computer in the network (and which may be presumed to belong to the author of the topology discovery software) and sends a packet with a forged source address X to the network; (any address other than the address of M will suffice as a destination, either an address of a known computer, or of the broadcast address). This packet will cause any switches attached to the local segment of M to learn that the location of address X is on that segment and hence those switches will not forward packets sent to address X. In step two, the computer M can then send a packet from its own address M to address X. This latter packet will stay on the segment local to M and can be seen by any other computers on that segment. This method is very efficient because it requires the sending of only one additional packet.

Returning to the method of shallow segment detection, it can be seen that the method of local segment transmission can be used to satisfy the requirement for M to transmit a packet which remains on its local segment and thereby complete the sees matrix information. It should be understood that there are many and various ways of manipulating the sees information and matrix to achieve the shallow segment results. As such, the present invention is not limited to any particular sequence, let alone that described herein, but only provides these examples for the purposes of explanation.

Segment Leader Election

In accordance with one aspect of the present invention, another method and system is provided and described herein, referred to herein as "segment leader election," and operates with the general purpose of reducing the load on the network of subsequent methods and systems of the present invention. To this end, once the segments on which there is at least one computer are identified, together with the computers thereon, (e.g., by the shallow segment detection method), the method proceeds to identify a single computer on each segment and to denote that computer as the segment leader. Since packets on a segment are visible to the computers and switches on a segment, the subsequent method steps of the system can be carried out by one representative computer on the segment (the segment leader) rather than by each of the computers on the segment. The concept of electing a leader of a group of computers is known, and can be done by any means appropriate at the choice of the implementer, and the selection may be accomplished by a distributed or a centralized method, e.g., by selecting the computer with the lowest numerical network address. As will be understood, the present invention's use of an elected segment leader to represent each segment in the subsequent methods reduces the number of computers that are active and thus reduces the load on the computer systems, the network, the network elements, and on the coordination system of the topology discovery system.

Shallow Intermediate Segment Detection

In accordance with one aspect of the present invention, another method and system referred to herein as "shallow intermediate segment detection" is provided and described, and operates with the general purpose of detecting segments which contain at least one computer and at least two switches. Note that it is also possible to have deep intermediate segments comprising segments containing no computers and at least three switches, as described below. It will be understood from the description of methods and systems below that the existence of intermediate segments (either shallow or deep) in the network can cause complications in topology discovery. To deal with these complications, the shallow intermediate segment detection method discovers the shallow intermediate segments present in the network.

Referring to the shallow segment detection method described above, it is possible for the sees matrix to contain non-symmetric information. One possible cause for this is that any computers which are on the same segment as the collector will see the other computers on the network as they send packets to the collector. Second, it is possible for computers to be present on a segment between two switches (that is, an intermediate segment), where the packets from some other segment pass across the segment towards the segment on which the collector is located.

Figure 2B:
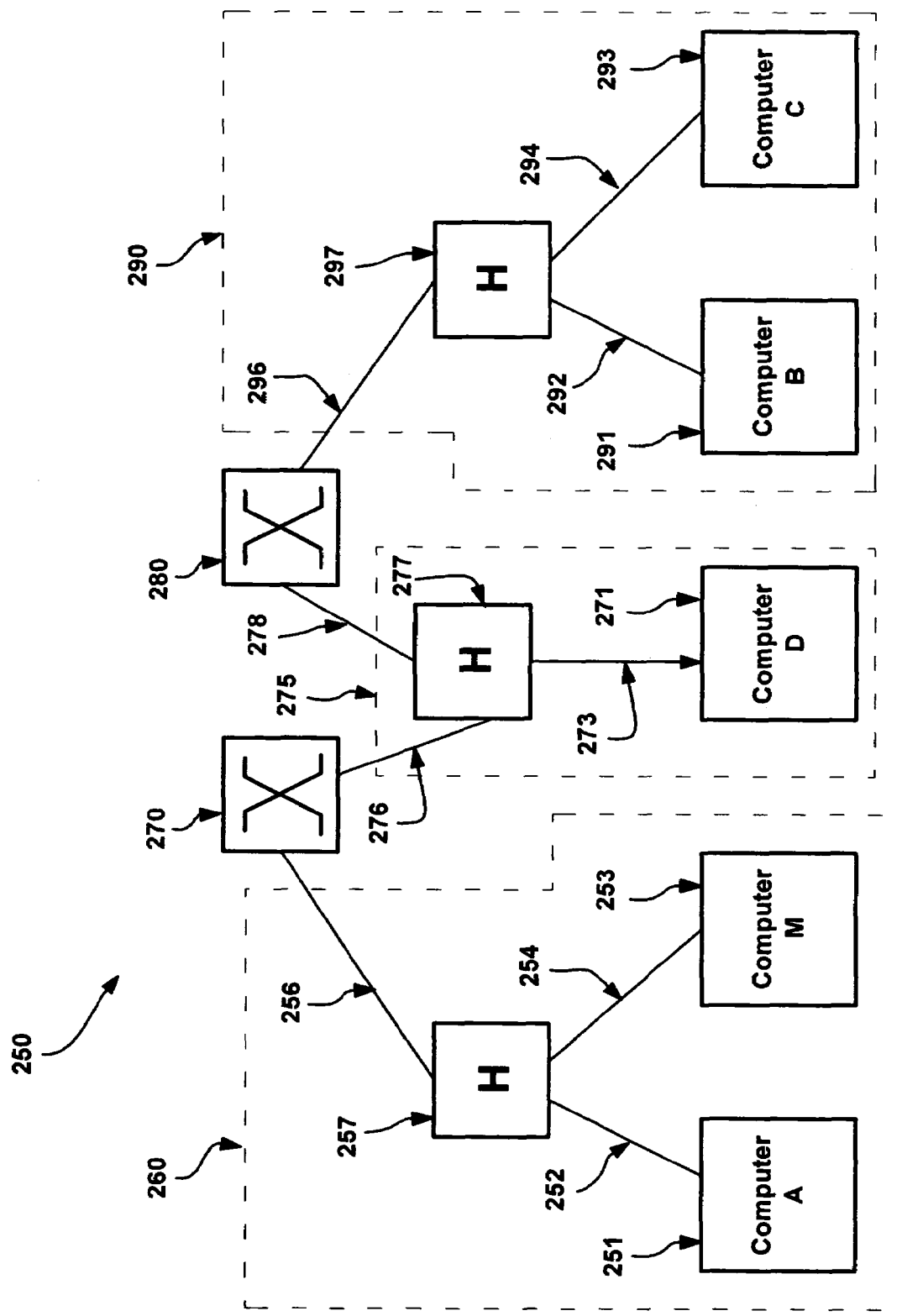
FIG. 2B is a block diagram representing an alternative example network (to that of FIG. 2A) in which an intermediate segment is present, illustrating an example of intermediate segments.

An example of this latter configuration can be seen in the network 250, shown in FIG. 2B, (which includes a slight change relative to the network 200 of FIG. 2A) in which wires (which would be the wires 222 and 225 in FIG. 2A) have been removed, and instead the computer 271 and the switches 270 and 280 are connected to the hub 277 by the wires 273, 276 and 278 respectively. The computer 271, the hub 277, and the wires 273, 276 and 278 form a shallow intermediate segment (indicated by the dashed box) labeled 275. In this network, packets from the computers 291 and 293 will be observable by the computer 271 as they pass from the switch 280 to switch 270, even though the computer 271 is neither on the segment 260 nor the segment 290, because they pass through the segment 275.

In general, the method proceeds to take the sees matrix (as generated above), and reduces it to contain only representative segment leader computers. As described, any asymmetry in the sees information for a segment leader represents an indication that the segment leader's segment is an intermediate segment; the exception is for the segment of computer M, which will always appear asymmetric because it is the destination for the traffic. The method and system determines whether it is genuinely an intermediate segment according to certain rules, including that if there are either one or two segments in the network, then it cannot be an intermediate segment. However, if there are three or more segments, then it may be an intermediate segment, and the method and system described above for generating the sees matrix is repeated, except that only the segment leaders participate, and the collector (the distinguished computer to which the packets are sent), denoted N, is a segment leader of a different segment to M. If M's segment is asymmetric under this second sees matrix then M's segment is an intermediate segment. It should be understood that there are many possible variant implementations of this method and system, such as varying the method by which the computer N may be chosen, the choice of segment leaders to participate in this method, and/or the processing which may be performed to detect the intermediate segments from the sees matrices.

Hosts connected via a wireless medium pose another problem for the system and method of segment detection by promiscuous mode. Wireless hosts connect to the network by associating with an Access Point (AP), which filters the packets sent to the host based on their source address. This means that even if the host were to enable promiscuous mode, it would not overhear other packets on the segment to which the Access Point is connected. Such wireless hosts are suspended from consideration before using the system and method of segment detection by promiscuous mode. However, if the machine originally initiating the discovery of the network topology is a wireless host, another (non-wireless) host is arbitrarily selected to be the collector M in the shallow segment detection method. Similarly, a non-wireless host is selected as the collector N, distinct from the newly selected M in the shallow intermediate segment detection method. In general, in the various systems and methods described herein, wired computers are chosen over wireless computers as the actors in the steps of the methods.

Shallow Segment Tree Ordering

In accordance with one aspect of the present invention, another method and system is provided, known as "shallow segment tree ordering" and described herein, with the purpose of establishing an ordered tree (mathematical covering order) on the shallow segments for the subsequent use of other methods and systems that require an ordering on steps related to the tree of the network.

The shallow segment tree ordering method acts as a manipulation on the sees matrix obtained from the methods described above, and creates a tree of segments. The tree is defined by the covering relation of the mathematical strict partial order whereby a segment S is smaller than a segment T when the set of computers seen by S is a superset of the set of computers seen by T. Hence, the segment of the collector is the least segment, at the root of the tree, and the segment T is a child of S in the tree when S is smaller than T and every other segment smaller than T is also smaller than S.

The shallow segment tree ordering method proceeds in as many steps are there are shallow segments. In a first step, the segment of the collector computer is used to create the initial tree structure of one node. In each subsequent step, each other segment is added to the tree in turn until all have been added and the tree is complete; a segment is added by use of a sub-method in which a segment is added to a sub-tree whereby the step is to add the segment to the sub-tree comprising the full tree existing at that time. A segment S is added as a node in a sub-tree by a sub-method which proceeds in two sub-steps. In the first sub-step the method begins at the root of the sub-node. In the second sub-step the sub-method compares the segment S with each of the child nodes of the root of the sub-tree with three cases. In the first case, (case one), if a child node T which is a superset of the segment S is found, then the sub-method is called recursively to add the segment S to the sub-tree with root T. In the second case, (case two), if one or more child nodes T are found which are a subset of S then those nodes T are removed as child nodes and S is added as a child node and the T nodes are made children of S. In the third case, (case three), neither of the first or second cases applies, and segment S is added as a child node.

Figure 15A:
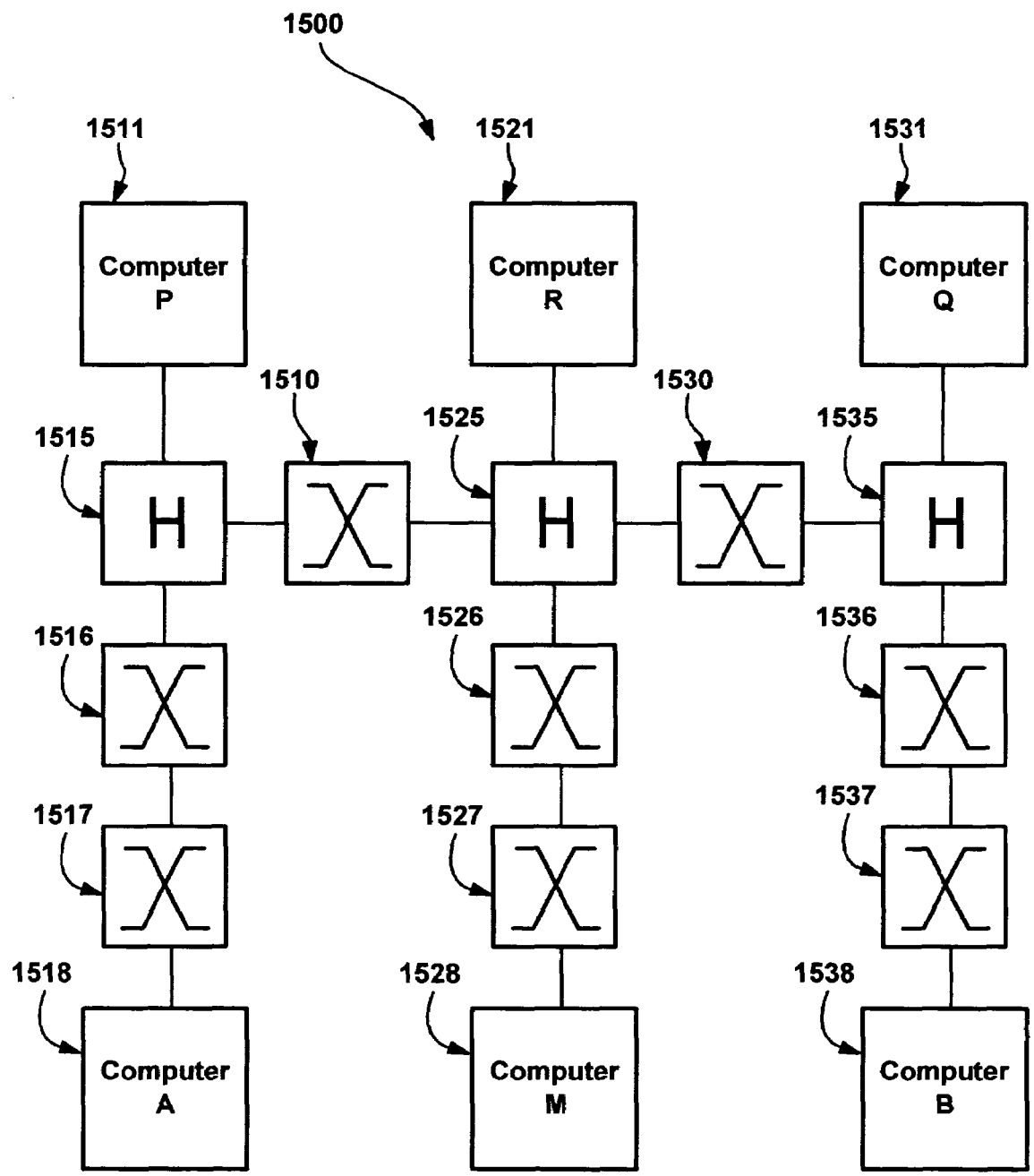
FIGS. 15A and 15B are block diagrams showing two networks of several switches, hubs and computers illustrating an example of three phase grouping in accordance with an aspect of the present invention.

Consider by way of example and not of limitation the network 1500 of FIG. 15A. Assume that the computer M (marked 1528 in FIG. 15A) is the collector computer, and that the computers representing the other segments are processed in the order 1511, 1518, 1531, 1521 and 1538. Further, the sees matrix for such a network is assumed to be easily understood by those skilled in the art. In the first step of the method, the segment 1528 forms an initial tree. In the second step, segment 1528 has no children and so segment 1511 is added as a child node (case three applies). In the third step, the segment 1518 is compared against the segment 1511 and found to be a subset (case one applies); on a second sub-step the segment 1511 has no children and so segment 1518 is added as a child of segment 1511 (case three applies). In the third step, the segment 1531 is compared against the segment 1511 and found to be disjoint, and since there are no other children of the node representing the segment 1528, the segment 1531 is added as a child of node 1528 (case three applies). In the fourth step, the segment 1521 is compared against the segment 1511 and found to be a superset (case two applies); the segment 1511 is removed from being a child of the segment 1528 and is instead made a child of the segment 1521 and the segment 1521 is made a child of the segment 1528; in the subsequent sub-steps, the segment 1531 is also found to be a subset of the segment 1521 and so is also moved from being a child of the segment 1528 to being a child of the segment 1521. In the fifth step, segment 1538 is found to be a subset of the segment 1521 (case one applies); on a second sub-step the segment 1538 is found not to be a subset of the segment 1511 but it is a subset of segment 1531 (case one applies); on a third sub-step the segment 1531 has no children, so the segment 1538 is added as a child node of segment 1531.

It should be understood that there are many possible variant implementations of this method and system, including variations in any known technique for organizing or structuring the representation of a tree of nodes in a computer system, in the order by which the nodes are inserted into such a tree, and/or in forming a tree from composing of the nodes or sub-trees. The aspect of the invention is not directed towards the manipulation of a data structure representing a tree, but rather towards the method by which the information in the sees matrix may be processed to discover an ordering of segments which is consistent with the order of segments in the topology of a network with the purpose of use in several additional methods and systems described below and requiring such an order.

Training and Probing

In accordance with an aspect of the present invention, another method and system is provided, referred to and described herein as training and probing, having the general purpose of deducing information about the presence and location of switches in the network. The operation of a switch in the network and how it behaves before and after it has learned information about the location of addresses in the network is described above. In accordance with one aspect of the present invention, the change in behavior before and after a switch has learned some information can be observed and used to deduce information about the presence and location of the switch in the network. This method is referred to by the terms "training" and "probing" and is used as described below.

In a straightforward usage of the method, the training and probing method uses a carefully constructed packet to train only a single switch in the network to know a particular address. In a more general usage of this method, various switches may be trained to know different or related addresses, or a single switch may be trained with a series of different addresses. Also, multiple switches may be trained by the use of a broadcast training packet, or by the use of a training packet which is sent to a destination known to be on a different segment.

One particular use of the method generally proceeds in two steps. In a first step, a computer (usually a segment leader) establishes an address with the properties that it differs from its own address, and is known to the switches on its local segment as a local-segment address; it does not matter whether this address is also learned by other switches. There are various techniques to obtain such an address, including if there is more than one computer on the segment, then the address of another computer could be chosen (this requires no packets to be sent). An alternative (which can also be used in the case that there is no other computer on the segment) is for the computer to pick some address which is guaranteed not to be in use anywhere in the network (e.g., because it belongs to the organization implementing the topology discovery software) and send a packet from that source address to any other address (e.g., broadcast). This has the effect of causing any switches attached to the segment to know that the address is present on that segment. Note that the packet in the first step may be seen by other switches or segments, since the address used as a source in step one may be known by other switches.

In a second step, the same computer sends a packet to this local-segment destination address which was previously established in step one, with the source address that it wishes to train (typically a freshly chosen address). Since the destination address of this second packet is known to be local to this segment, the second packet is not forwarded by any of the switches local to the segment. The effect of this second packet is that exactly the switches that are local to the segment learn the source address of the second packet. This second packet is called the local training packet. Note that this is similar to the local segment transmission method which is described above.

The probe method operates based on the fact that some other computer in the network can then send a packet to the source address used in the local training packet, and the system can observe which of the segment leaders receive the probe packet. Note that any switch other than the ones trained in the second step of the training phase will not know the trained address and so will copy the packet to segments other than the segment from which it came in.

Figure 3A:
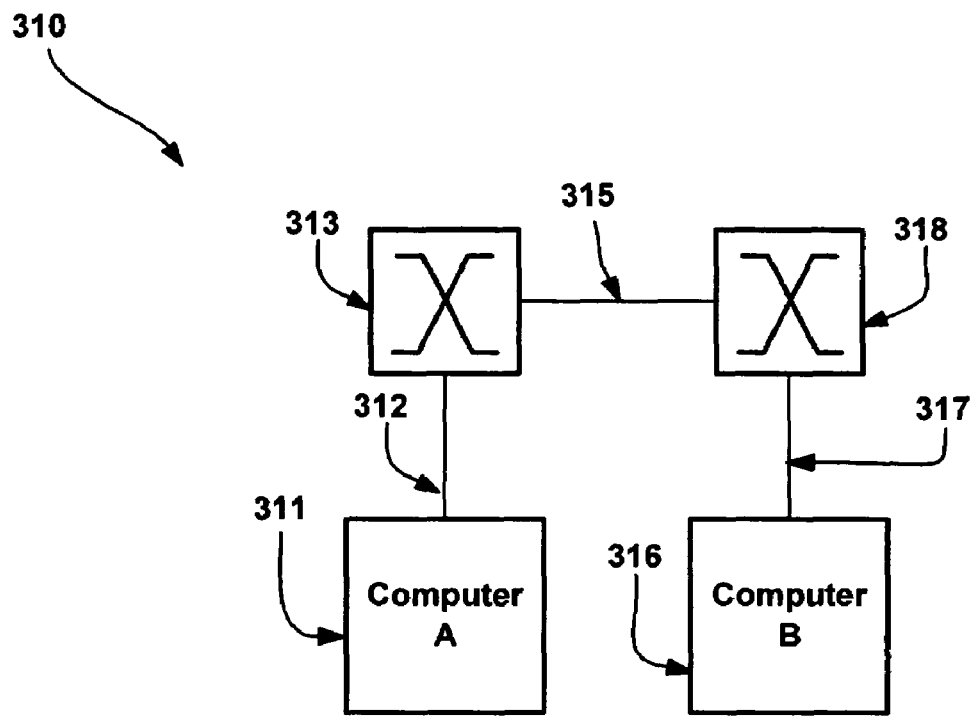
FIGS. 3A and 3B are block diagrams representing two networks of two computers which differ by whether the two computers are connected by one switch or two, illustrating an example of training and probing to discover switches.
Figure 3B:
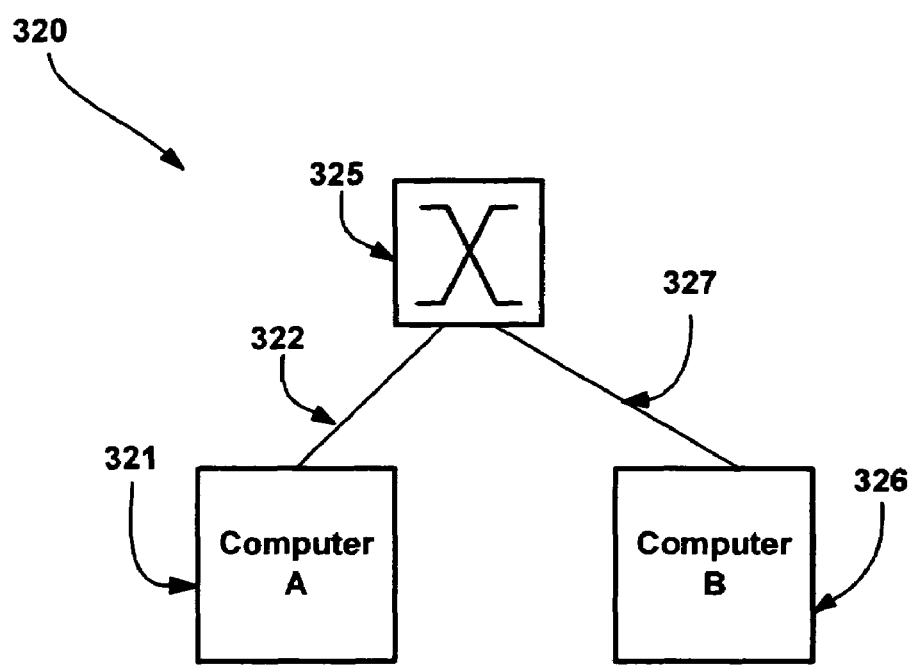

By way of example and without limitation, the method and system can be applied to discover the difference between a network 310 and a network 320 shown diagrammatically in FIGS. 3A and 3B. In each network 310 and 320, there are two segment leaders, each called A and B. The general intention is to discover whether the segments are attached to two different switches (as in the network 310) or a single switch (as in the network 320). To this end, each computer establishes a local address to be used in training and then the method proceeds as follows in this example. First, the computer A trains any switches attached to its segment by sending a packet from an address X. Second, the computer B trains any switches attached to its segment by sending a packet from the same address X. Third, the computer A sends a probe packet to address X. As is understood, in the network 310, the first packet will train the switch 313 that address X is on segment 312. The second packet will train the switch 318 that address X is on the segment 317 (and will not be visible to and hence have no effect on the switch 313); the third packet will not be propagated by the switch 313 since the switch 313 (still) believes that address X is on segment 312. Thus, the computer B will not receive the third packet, and it is thus known that the segments are attached to two different switches.

In the network 320, however, the first packet will train the switch 325 that X is on the segment 322. The second packet will retrain the switch 325 that the address X is on the segment 327. Thus, when A sends the third packet to address X, the third packet will be propagated by the switch 325 onto segment 327, where it will be seen by the computer B. In this network the computer B will receive the third packet, and it is thus known that the segments are attached to a single switch. Therefore the training and probing method may be used to distinguish the networks 310 and 320.

It should be understood that there are many possible variant implementations of this method and system whereby the variations may include the ordering of packets sent by the various computers, or the source addresses which may be put in the various packets or the destination addresses that may be used providing they have the same effects on the switches present. For example, if one of the computers is a segment leader with other computers on the same segment, then other addresses could be used to the same effect. Many more general uses of the method and system of training and probing (including the use of one or many training packets followed by one of many probing packets) will be used as steps within other of the methods and systems of the present invention which are described below.

Three Sweep Detection

In accordance with one aspect of the present invention, another method and system is provided, known as "Three Sweep Detection" and described herein, which can be used to determine which shallow segments are attached to the same switch in a computer network. The method proceeds in three general steps, each of which involves each segment leader computer in the network.

In a first step, the system causes each segment leader to train the switches local to its segment with a particular address X, which is the same for each segment leader. This is done initially in a very specific order by the segment leaders of intermediate segments, each of which will train multiple switches, and then subsequently (in any convenient order) by the segment leaders of non-intermediate segments, each of which will train only one switch. The specific order required of the intermediate segment leaders is that a segment leader P which sees a message from a segment leader Q in the initial segment detection method and system needs to send its training packet before the segment leader Q sends its training packet. The result of the first step is to establish several properties, specifically: One; that every switch which is attached to a shallow segment believes that it knows what to do with the address X, and will direct it to a local shallow segment. Two; that if any switch has more than one shallow segment attached to it, then the switch will have learned and updated its knowledge more than once during step one. Three; that if any switch which has more than one shallow segment attached to it, where the shallow segments comprise at least one intermediate segment and at least one non-intermediate segment, then the switch will have learned to send the address X to a non-intermediate segment. Four, that if any switch has more than one intermediate segment and no non-intermediate segments attached to it, then the switch will be trained to send the address X to some non-intermediate segment which is not the non-intermediate segment closest to the collector node. Note that property four does not cause a dependency of the method and system on the choice of the original collector node used to define the shallow segment tree ordering (that is the root of the tree) because the property that it establishes is that probe messages work away from the root of the tree and the network tree is topologically equivalent under rotation.

In a second step, the system causes each segment leader in turn to send a (probe) packet to the address X. Since every switch adjacent to a segment leader knows where to deliver such a packet, these packets will not travel from one switch to another, but will be delivered to the segment attached to that switch which had the segment leader which sent the most recent train message in step one. This will be different for every such switch. Note that when the most recent-to-train segment leader sends the message to X, the packet will not be forwarded by the switch and will effectively be discarded by the network; a corollary of this is that a switch with only one segment will have a segment leader that will never see any of these probe packets sent in step two. Note also that it is possible for the segment leader of an intermediate segment to receive probe packets; this occurs for example when a switch is attached to two intermediate segments and no non-intermediate segments.

In the third step, the results are collected from each segment leader in turn. Each segment leader will either have seen no probe packets, or will have seen a probe packet from each of the other segments attached to the same switch as itself. This information can then be stored in a matrix called the "gathers matrix" and processed to determine which segments share a switch and which segments are attached to switches to which no other segment is attached. The processing of the gathers matrix representing the information returned is undertaken by a method including three steps.

In a first processing step, the method selects each intermediate segment leader in turn. It looks at the sees matrix information obtained by the shallow segment detection method, and if the chosen intermediate segment leader saw a particular computer then it removes from the gathers matrix any probe gathered (received) by that computer which was also gathered by the intermediate segment leader. This is carried out for each intermediate segment leader.

In a second processing step, the method selects in turn each segment leader computer which gathered at least one message (i.e. which was the recipient of probe messages). For each such computer, the method creates an internal computer representation for a switch and connects the segment of that segment leader to the switch (marking the segment as a child segment of that switch); also, for each probe gathered by that computer it examines the source of the probe to see whether it was sent by a peer in the segment tree order, or whether it was sent by the leader of the parent segment in the segment tree order. If the probe was sent by a peer, then the segment of the peer is added to the switch representation as a child of the switch. If the probe was sent by the parent, then the segment of the parent is added to the switch as the distinguished unique parent of the switch. In addition, the method adds to the internal computer representation of each of the segments attached to the switch representation so created, a link to the switch representation. These links are also distinguished to indicate whether the switch is the unique parent of the segment or one of many possible child switches of the segment.

In a third processing step, the method determines which segment leaders have neither gathered probe packets, nor had the probe packet sent from them gathered by any other segment leader. For each such segment leader, the method creates an internal computer representation for a switch and adds the segment of that segment leader to the switch as a child segment (the switch is also added to the segment as the parent switch of that segment).

Note that portions of the network containing only shallow segments and switches connected by (intermediate) shallow segments now have their topology known. Hereinafter, the term "islands" may be used to refer to these network portions.

It can be observed that a segment leader may receive no probe packets because it is the sole segment leader on a switch, or there are other segment leader(s) attached, but their probe packet(s) have been lost. In accordance with one aspect of the present invention, to distinguish these two cases, the method and system makes a repetition of steps two and three, with an optimization that only segment leaders which have not yet been accounted for send probe packets. A segment leader is deemed to have been accounted for when a probe packet from it is seen by another segment leader, or when it has received one or more probe packets from other segment leaders. For each segment leader, the method performs a union of the information obtained from both occasions of following the three steps of the method before the gathers matrix is processed.

By way of example, consider again the network 200 represented in FIG. 2A, with the computer 201 being the segment leader of the segment 210, the computer 241 being the segment leader of the segment 240, and the computer 221 being the segment leader of the segment 222. Further, the order of acting in this example is the computer 201, the computer 241, and the computer 221. Thus, in step one, the computers 201, 241 and 221 will each send a "train" packet for address X. The result of this is that the switch 220 is trained to think that address X is on the segment 222 (since the computer 221 sent a train message after the computer 201) and the switch 230 is trained to think that address X is on the segment 240. In step two, the computer 201 will send a probe packet to address X which will be received at the computer 221, the computer 241 will send a probe packet to address X which will be discarded by the switch 230, and the computer 221 will send a probe packet to the segment 222 which will also be discarded. In step three, when the results are collected, it can be deduced that the segments 210 and 222 are connected to the same switch, whereas the segment 240 is connected to a different switch (and no other segments with active computers are attached to that same switch). Note that it is seen from this example that the probe message sent by the computer 221 could have been elided because the computer 221 had already received a probe message (from the computer 201) and hence knows that it is the most recent segment leader to have trained address X on its switch; for practical implementation reasons this packet is not normally elided because it is usually more efficient to take account of received packets at the end of step two, rather than during step two, due to the overhead of collecting and processing such packets.

Figure 15B:
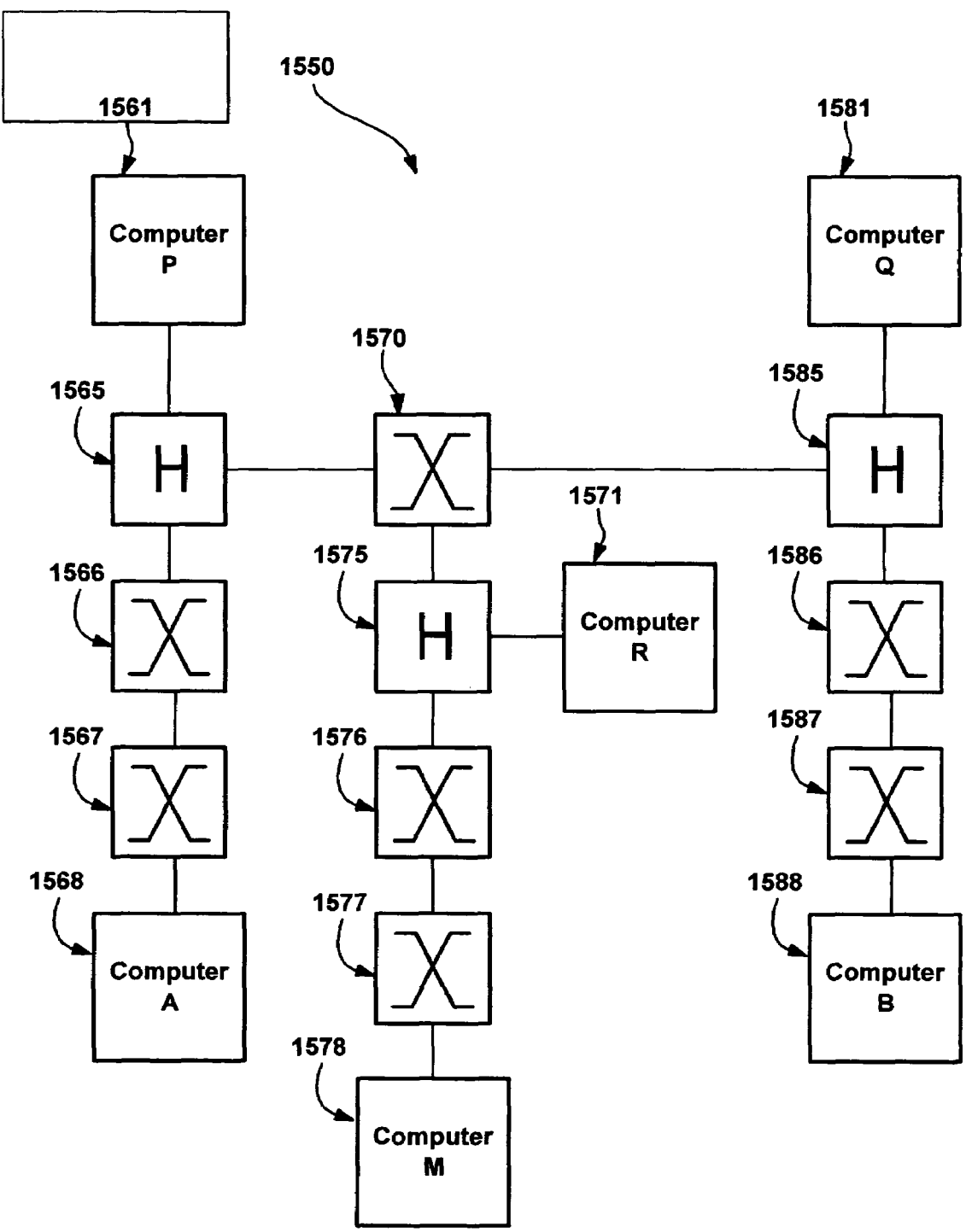

By way of another example which illustrates the importance of the ordering of the train messages sent in step one of the method, consider networks 1500 and 1550 shown in FIGS. 15A and 15B, respectively, which each contain three intermediate segments (e.g. 1511, 1521 and 1531 in FIG. 15A and 1561, 1571 and 1583 in FIG. 15B) connected to switches that have no shallow non-intermediate segments attached to them. In both networks 1500 and 1550, the computers denoted A, B and M (e.g. 1518, 1538 and 1528 in FIG. 15A and 1568, 1588 and 1578 in FIG. 15B) and the switches (e.g. 1510, 1530, 1516, 1517, 1526, 1527, 1536 and 1537 in FIG. 15A and 1570, 1566, 1567, 1576, 1577, 1586 and 1587 in FIG. 15B) and hubs (1515, 1525, and 1535 in FIG. 15A and 1565, 1575 and 1585 in FIG. 15B) to which they are connected are present in order that the segments of P, Q and R are intermediate segments; further assume that M was the collector for the shallow segment detection method. A difference between the two networks is that in network 1500, the segments of P and Q are connected to the segment of R through distinct switches (1510 and 1530), whereas in network 1550 they are connected through the same switch (1S70). It can be seen that if the order of the training messages was such that computer R trained last, then in both networks R would receive the probe messages from both of P and Q, whereby the two networks would be indistinguishable. Instead, the aspect of the present invention which imposes an ordering on the training messages of step one will ensure that the networks can be disambiguated irrespective of the location of the collector computer.

By way of another example which illustrates the importance of the first step of the processing of the gathers matrix, consider again the network of 250 represented in FIG. 2B and assuming that computers 253, 291 and 271 are the segment leaders, and that computer 253 was the collector in the shallow segment detection method. In the first step, the computer 253 would train the switch 270; subsequently the computer 271 would train both switches 270 and 280; subsequently computer 291 would train switch 280. In step two, the probe packets sent by computer 291 will be discarded, the probe packet sent by computer 273 will be received by computer 291, and the probe packet sent by computer 253 will be received at both 271 and 291; this is because the switch 270 will transmit the packet on segment 275 where it will be seen by the switch 280 which believes that the address resides on segment 290. After the probes are collected in step three, the presence in the gathers matrix of the probe from computer 253 received at computer 291 does not confuse the detection of switches because it was also received at computer 271. Thus, it can be determined that switch 270 is attached to both segments 260 and 275, and that switch 280 is attached to both segments 290 and 275. The result is that the topology of network 250 is completely determined.

It should be understood that there are many possible subtle and essentially unrelated variations that could be applied to this method and system. By way of example and without limitation, one such variation would be the use of a different ordering of segment leaders in step two from the order used in step one.

In accordance with an aspect of the present invention, one particularly straightforward way to implement the ordering requirement on intermediate segment leaders in step one, is to order them based on the number of responses that they saw, and to train in the order from the segment leader which saw the most responses to the segment leader which saw the least.

One way to implement the ordering requirement of the "three sweep detection" method and system is to use the ordering generated by the "shallow segment tree ordering" method, whereby the order of the training messages is to proceed from the root node of the tree order towards the leaves (either by breadth first or pre-order depth first traversal), such that a training message is sent on a segment after the training message of any segment which is closer than that segment in the tree ordering to the root.

Island Determination

In accordance with one aspect of the present invention, another method and system referred to herein as "island determination" is provided and described, which can be used to detect maximal portions of the network that are comprised only of shallow segments (there are no deep segments within the portion of the network). These portions are herein known as "islands" and it is defined (by the meaning of maximal) that an island covers all the shallow segments that it can. The purpose of islands will become clear in the description of other methods and systems below.

The method and system of island determination proceeds as follows, including that each shallow segment is part of an island. Two shallow segments are part of the same island if they are connected to the same switch. The information derived from the three sweep detection method, or some similar method which determines which segments are attached to the same switch, is used to determine islands by transitivity.

The method proceeds to evaluate the segments one at a time and to keep a set of possible islands. The first segment is put in the first proposed (possible) island. For each other segment, the method looks at the information provided to see if the segment shares a switch with any of the segments already in any of the proposed islands. If it does then any of the proposed islands with which it shares a switch are merged and the segment is also put in that proposed island. If it does not, then a new proposed island comprising just that segment is created. This continues until all the segments have been considered, at which time the proposed islands are in fact the islands in the network.

It should be understood that there are many possible alternative implementations of the application of transitivity to the segments to discover the set of islands. The above-described method is only one example, and there is no intention to limit the present invention to the particular example implementation described herein.

Switch Leader Election

In accordance with one aspect of the present invention, another method and system is provided and described herein, referred to as "switch leader election." The switch leader election method and system can be used to select a representative computer attached to a switch to engage in training of that switch (or paths starting at that switch), in order to reduce the number of computers involved in various other methods and systems of topology discovery (described below) for the purpose of improved performance.

In accordance with an aspect of the present invention, once the segments that share the property that they are attached to the same switch have been determined, the method selects a single segment leader from amongst the segment leaders attached to the same switch and denotes that computer as the switch leader. Because the segments are known, as is the attachment of segments to switches, and because subsequent steps involve the determination of the interconnection of switches (that is, in the deep portions of the network), the subsequent method steps of the system can be carried out by one representative computer on the switch (the switch leader) rather than by each of the segment leaders attached to the switch. Once again, the election of the switch leader can be done by any means appropriate, and reduces the number of computers active in those methods, thus reducing the load.

Note that in the case of intermediate segments that a connection to the deep portion of the network may be to the segment directly rather than to a switch. This is described in further detail below, including the selection of the leaders for the switches which are the points of attachment.

Negative Path Expressions

In accordance with an aspect of the present invention, another method and system, referred to herein as "Negative Path Expressions" may be used to determine certain information about the interconnection of switches in the computer network, and also to determine which segments are attached to the same switch in a computer network, provided that the network does not contain intermediate segments. Although this method is less efficient than the above-described "Three Sweep Detection" method for discovering which segments are attached to the same switch, Negative Path Expressions can be used to perform that operation at the same time as gathering switch path expressions, and is described in terms of the actions of segment leaders. Negative Path Expressions can also be implemented by switch leaders. The method proceeds in three steps, each of which involves each segment leader computer in the network.

In a first step, each segment leader trains its local switch with a different fresh address $X_j$ where the subscript j denotes the number of the segment leader. As before, the system can use any appropriate technique to gain the necessary fresh addresses. Since these addresses are new and unique to each segment leader, only the switch directly connected to a particular segment leader's segment will know about the address trained by that particular segment leader; the other switches will not know the location of that address and so will have to flood a packet to that destination. In a second step, each segment leader in turn sends a probe packet to the $X_j$ address of every segment leader except itself. Such a probe packet will be flooded from the switches in the network except for any path in which the packet travels to the switch which has had the $X_j$ address trained. At that switch the flood is terminated and the packet delivered to the segment leader which trained the $X_j$ address. Note that since an Ethernet network is always a tree and not a general graph, the switch which trained the address divides the network into two regions. In the region in which the packet originated, the segment leaders will see a copy of the packet; in the other region, none of the segment leaders will see the packet. In step three, the information about which segment leader received which probe packets is gathered and processed as described below.

Figure 4A:
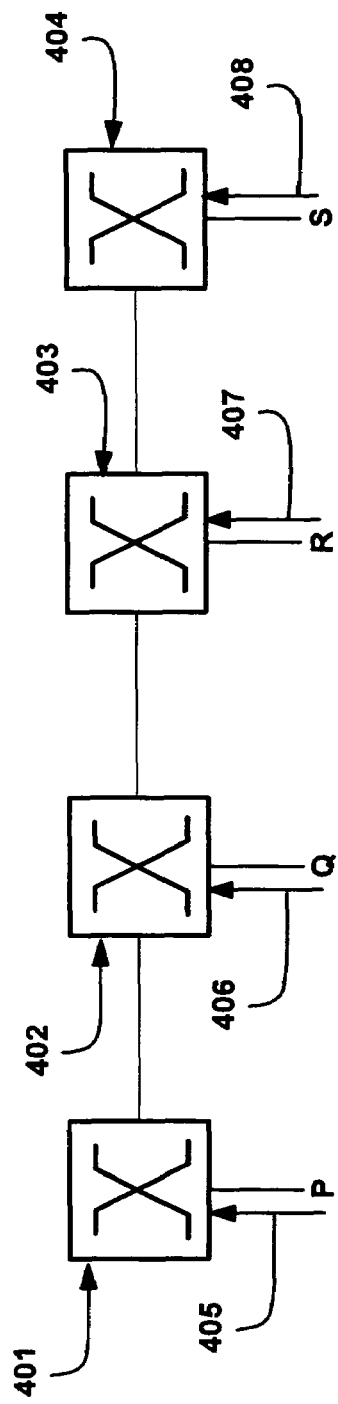
FIGS. 4A and 4B each comprises a block diagram showing a network of several switches and computers to illustrate an example of negative path expressions by which information about certain paths in the network may be discovered.
Figure 4B:
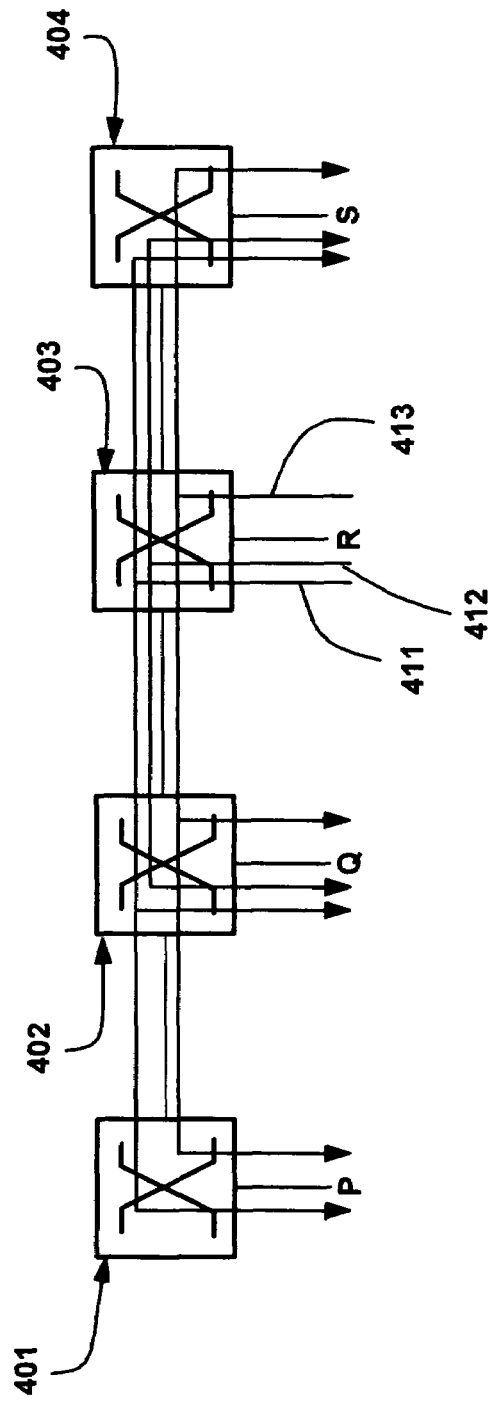

Consider, by way of example and not of limitation, the network depicted in FIGS. 4A and 4B. The network has four switches 401-404, and four segment leaders (computers) labeled P, Q, R and S. In step one, each segment leader trains its local switch with an address unique to that segment leader and unknown to the rest of the switches. In FIG. 4A this is shown by the four numbered, straight upward arrows 405, 406, 407 and 408, respectively, e.g., segment leader P trains switch 401, segment leader Q trains switch 402, and so forth.

In step two, represented in FIG. 4B, each of P, Q, R and S take turns to send a packet to each of the other addresses, excepting the one that each itself trained. In FIG. 4B, the propagation of probe packets as sent by the segment leader R is shown, (as can be determined from the direction of the arrows outward from R through the switches to the other segment leaders). None of the packets sent by R have destination addresses known by the switch attached to R, and so the switch 403 floods the packets to the switch 402 attached to Q and the switch 404 attached to S. For the packet 411 (sent to address $X_p$) it is not known by the switch 402 (attached to Q) and so is flooded both to Q and to the switch 401 attached to P. Though the switch 401 knows about the address and the switch 404 does not, they both have only one port other than the one on which the packet arrives, and so in either case they deliver the packet to P and S, respectively. For the packet 413 (sent to address $X_s$) the behavior is similar to the packet 411, in that the switch 402 attached to Q floods the packet, the switch 401 (attached to P) floods the packet also (sending it to the single output P) and the switch 404 (attached to S) does know about the address and delivers it to its only output S. For the packet 412 (sent to address $X_q$) however, the switch 404 floods the packet, but the switch 402 (attached to Q) believes that the address is on the same segment as the machine Q and so does not flood the packet. The result is that neither the switch 401 attached to P, nor P, receives a copy of the packet. The result of this particular sequence of packets is that it can be deduced that P is not on the path from R to Q. The flowing are the negative path expressions that can be deduced once the segment leaders have completed sending the probe packets to the other addresses. For the particular network shown in FIG. 4 these expressions are sufficient to uniquely determine the topology shown in the diagram (e.g., S is not on the path from R to P; P and S are not on the path from R to Q, and P and Q are not on the path from R to S):

$S \not\in R \to P; P,S \not\in R \to Q; P,Q \not\in R \to S$

It is thus readily apparent how the information gained in step three of the method can be used to determine negative path expressions (such as P is not on the path from R to Q) and hence to generate information about the topology of the network. In accordance with one aspect of the present invention, the same information can also be used to determine which segment leaders are attached to the same switch (which is an alternative method to the "Three Sweep Detection" method). Any probe packet sent at step two of the method which reaches a switch which has been trained with the destination address of that packet will send the packet directly to the segment that trained the address, and not to any other segment attached to that switch. Therefore, if a segment leader receives a probe sent to an address other than its own trained address, the segment leader can determine that it is not attached to the same switch as the segment leader which did train (does own) that address. Therefore if a Boolean matrix is used to represent the packets received at each segment leader for each other segment leaders' probes, then by the system of logical inversion of each element of the matrix, followed by determining the strongly connected components (which is a standard mathematical technique), the segments which are connected to the same switch can be determined.

It should be understood that there are many possible variant implementations of this method and system, including varying the ordering by which either the training packets or the probe packets may be sent, the order in which the results are collected, and the mathematical functions that can be applied to the results to determine the information about the topology of the switches, or which segments share direct attachment to the same switch. In one variation of the present method, the processing is based on the observation that any probe packet sent at step two of the method will be flooded by the switch that is local to the segment leader sending the probe packet. Therefore, if a segment leader does not receive a probe sent by some other segment leader, then those two segment leaders are attached to different switches.

Note that either this method or the "Three Sweep Detection" method suffices to determine which switches share direct attachment to the same switch. However, the "Three Sweep Detection" method is more efficient in that it requires the sending of fewer packets and the creation of fewer new addresses. Also, the three sweep detection method works in networks which have intermediate segments. The "Negative Path Expressions" method is therefore more useful when it is known (by some a priori method) that there are no intermediate segments, and when applied to switch leaders, to determine information about the interconnection of switches, once the segments sharing attachment to the same switch have been identified.

Neighbor Flooding

In accordance with one aspect of the present invention, a method and system known as "Neighbor Flooding" and described herein may be used to determine certain information about the interconnection of switches in the computer network. The method proceeds in three steps, each of which involves each switch leader computer in the network, and results in the knowledge of which switches are adjacent each other.

In a first step a new fresh address $X_j$ is chosen where the subscript j denotes the number of the switch leader, and each switch leader trains its local switch with the address of every other switch leader; that is, the new addresses except the one representing the particular switch leader itself. As before, the system can use any appropriate technique to gain the necessary fresh addresses. Because these addresses are new and unique to each switch leader, the switch directly attached to the switch leader to whom the address has been allocated (and the only switch leader not to train with the address) will not know about the location of that address, and will thus flood a packet to that destination. Other switches will have seen a training packet for that address from their own local switch leader and so each will believe that a packet to that address should be delivered to their local switch leader's segment.

In a second step, each switch leader in turn sends a probe packet to the $X_j$ address allocated to it (but trained not by it, but rather by every switch leader except itself). Such a probe packet will be flooded from the switch local to the switch leader which sends the probe packet, but the other switch leaders' switches will stop such a flood as soon as the packet reaches them, and instead deliver it to their local switch leader's segment, where it will be recorded by the switch leader. Therefore this packet is flooded by one switch, and delivered to the switch leaders of the switches adjacent that switch.

In step three the information about which switch leaders received which probe packets is gathered and processed to determine which switches are neighbors of which other switches and hence to determine information about the topology of the network.

Consider, by way of example and not of limitation, the network depicted in FIGS. 5A and 5B. The network has four switches 501-504 and four switch leaders labeled P, Q, R and S. In step one each switch leader trains its local switch with the unique addresses allocated to each other switch leader, and does not train its local switch with its own allocated address. In FIG. 5A this is shown by the arrows labeled 505$_1$-508$_3$, in which the arrows labeled 505$_1$-505$_3$ each represent the address allocated to switch leader P, and so it is trained by the other switch leaders Q, R and S. The arrows labeled 506$_1$-506$_3$ each represent the address allocated to Q and so it is trained by P, R and S. The arrows labeled 507$_1$-507$_3$ each represent the address allocated to R and so it is trained by P, Q and S. The arrows labeled 508$_1$-508$_3$ each represent the address allocated to S and so it is trained by P, Q and R.

In step two, each of P, Q, R and S send a probe packet to the address that was allocated to them. This is shown by the arrows 515-518 in FIG. 5B. The packet sent by P is shown by arrow 515; it is flooded by the switch 501 (local to P) but when it reaches the switch 502 local to Q, that switch has been trained that the address corresponding to packet 515 is on the segment where Q is located, and so the packet is delivered there. The probe packet 516 sent by Q is flooded by the switch 502 local to Q and delivered to P and R because their respective switches do not flood it. Likewise the packet 517 sent by R is received only by Q and S, and the packet 518 sent by S is received only by R. When this information is collected in step three and processed, then it shows that the switches are connected together in the fashion shown in FIGS. 5A and 5B.

Note that in the case of intermediate segments, the segment leader, which is attached to possibly multiple switches, does not know which attached switch comprises the switch that is a neighbor to the switch where the probe packet originated. This matter is further described below.

It should be understood that there are many possible variant implementations of this method and system, including the ordering by which either the training packets or the probe packets may be sent. For example, in one variation of the present method, the probe packet for each chosen address may be sent following the training of that address by the other switch leaders in the network, rather than have all probes following all training packets.

As described above, the various discovery method and systems have provided information about switches which have at least one computer directly attached to the switch, or switches which are neighbors. Most computer networks are comprised of a single island, but some computer networks contain switches with no computers attached, but where switches (referred to as "deep switches") are used only to interconnect other switches in the network. Also, most computer networks do not contain intermediate segments of any sort. Because intermediate segments are relatively rare, described first herein are some methods and systems that may be used to discover the topology of the deep portions of a network assuming that there are no intermediate segments. Thereafter these methods and systems are extended to deal with networks in which intermediate segments may be present.

Path Trained Grouping

In accordance with one aspect of the present invention, a method and system referred to as "Path trained grouping" and described herein may be used to determine certain information about the interconnection of switches in a deep portion of a computer network where it can be assumed that there are no intermediate segments. The Path trained grouping method proceeds in three steps, and involves each switch leader computer in the network, and results in the knowledge of which switches share common paths through certain deep switches with respect to certain chosen switches.

In a first step, a distinguished switch leader, denoted P, is chosen from among the switch leaders. This switch leader can be chosen by any appropriate means. In a second step a different switch leader, denoted Q, is also chosen from among the remaining switch leaders. In a third step, the other switch leaders are grouped into equivalence classes under the relation that switch leaders in the same equivalence class can exchange packets without those packets traveling through a switch in the network which is on the path from P to Q, and switch leaders are in different equivalence classes if a packet from one to the other must pass through a switch which is on the path from P to Q. In general, the grouping into equivalence classes is done using any suitable mathematical technique or the like, where the basic operation is to compare two elements to see if they are equivalent. More particularly, one suitable method is to chose an arbitrary numbering over the switch leaders, and iterate from smallest to largest number comparing each against the switch leaders having a lower number to see if they are equivalent, except that, where an equivalence has already been established, it is sufficient to test for equivalence against a single representative member of each equivalence class (referred to as the "class leader").

The act of testing two switch leaders for equivalence under the defined relation is another method and system included in the present invention, and it also takes place using three general steps. To explain this general method, consider an example in which P and Q denote any two computers on the network, and that the two switch leaders chosen for equivalence testing are denoted by A and B. As with several previous example methods, an address X which is not in use by any computer in the system is chosen. In step one, computer A sends a training packet from address X, but rather than sending it only on its local segment, it sends it to switch leader B. This causes the switches in the path from A to B to know how to deliver packets for address X (namely to computer A). In step two, computer P sends a similar training packet from address X not to its local segment but rather to switch leader Q. This causes the switches in the path from P to Q to know how to deliver packets for address X (namely to computer P). In step three, computer B sends a probe packet to address X. If the packet in step two passes through a switch which also carried the packet from step one, then when the packet in step three reaches that switch the packet will follow the more recent training information and will be delivered to computer P; in this case computers A and B are not equivalent under the relation defined by the path from P to Q. If the packet in step two does not pass through a switch which carried the packet from step one, then the switches which were trained by the packet in step one will retain that training information, whereby the probe packet in step three will be delivered to computer A. In this latter case, the computers A and B are equivalent under the relation defined by the path from P to Q.

Figure 6A:
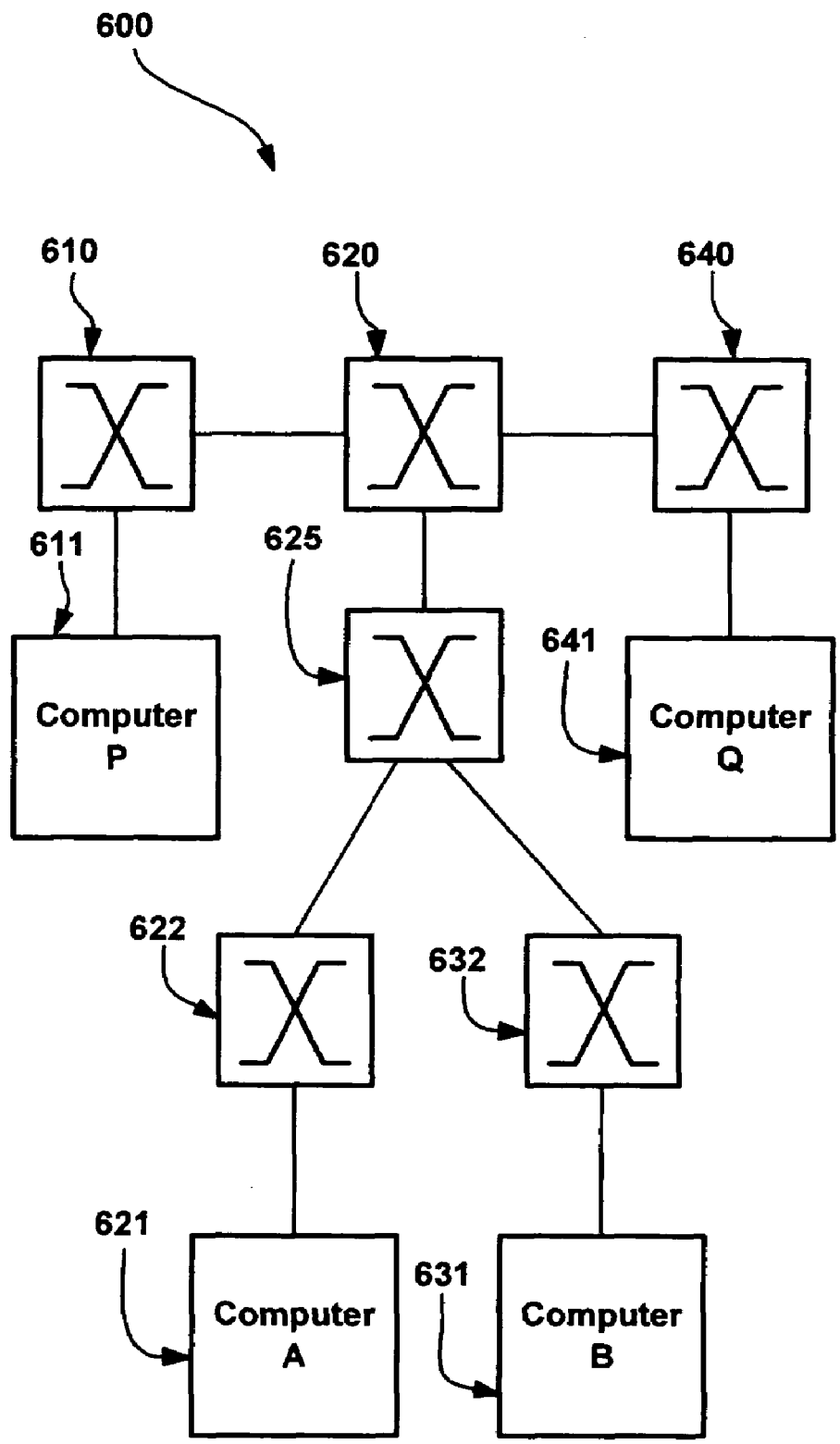
FIGS. 6A and 6B are block diagrams showing two networks of several switches and computers, illustrating an example of path trained grouping by which switches may be grouped into equivalence classes with respect to a path through the network.
Figure 6B:
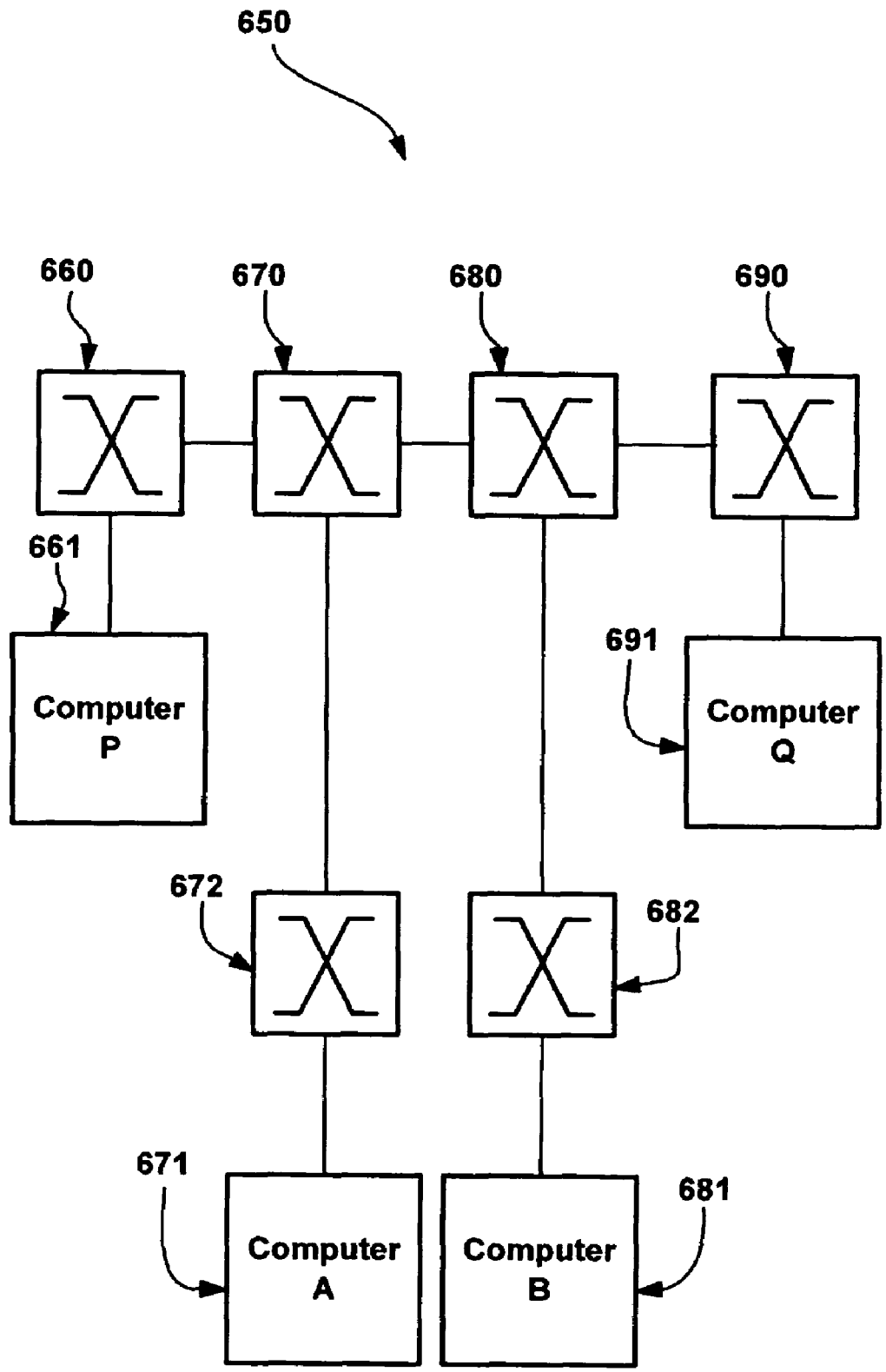

Consider by way of example and not of limitation, the networks 600 and 650 depicted in FIGS. 6A and 6B, respectively. FIGS. 6A and 6B each show a network having a number of switch leaders, switches and deep switches. In the network 600 of FIG. 6A, the switch 620 and switch 625 are deep switches, whereas in the network 650, the switches 670 and 680 are deep switches. In the network 600, the computers 611, 641, 621 and 631 are denoted P, Q, A and B, respectively. In the network 650 of FIG. 6B, the computers 661, 691, 671 and 681 are denoted P, Q, A and B respectively.

For the network 600 of FIG. 6A, in step one the training packet travels from the computer 621 through the switch 622 to the switch 625 and then through the switch 632 to the computer 631. In step two, the training packet travels from the computer 611 through the switch 610, the switch 620, and the switch 640, and arrives at the computer 641. In step three the probe packet travels from the computer 631 through the switch 632 to the switch 625. Since the training packet in step two did not pass through the switch 625, the packet in step three will then travel through the switch 622 to the computer 621. The result is that the computers 621 and 631 are equivalent.

For the network 650 of FIG. 6B, in step one the training packet travels from the computer 671 through the switch 672, then through the switch 670, the switch 680, the switch 682 and finally arrives at the computer 681. In step two, the training packet travels from the computer 661, through the switch 660, the switch 670, the switch 680, and the switch 690 to arrive at the computer 691. In step three the probe packet travels from the computer 681 through the switch 682 to the switch 680. When the probe packet reaches the switch 680, it has reached the path used and trained by the packet in step two, and so the probe packet will subsequently travel through the switch 670, and the switch 660 to arrive at computer the 661. The result is that the computers 671 and 681 are not equivalent.

It should be understood that there are many possible variant implementations of Path trained grouping methods including the ordering by which the two training packets may be sent for each equivalence test, the ordering by which switch leaders are selected for testing for equivalence, and/or the method by which the computers designated P and Q may be chosen.

In accordance with one aspect of the present invention one efficient variant implementation of the Path trained grouping method and system is to keep a record within the system from one instance of determining the network topology to the next, and to select for priority equivalence testing (i.e., the chosen ordering) switch leader computers which were found to be equivalent in some previous instance of determining the network topology. The advantage of this variation is that if the network has changed little, then the equivalence information will be found with fewer packets. Conversely if the network has changed significantly then this variation method will statistically not perform any worse than any arbitrary ordering of the switch leaders for equivalence testing.

In accordance with another aspect of the present invention one efficient variant implementation is to choose the computers P and Q, based on the information obtained and kept from some previous instance of determining the network topology, in such a way as to tend to optimize the amount of information learned about the network topology from the formation of equivalence classes, and to tend to minimize the number of packets which are sent, under the present invention. For instance, one can choose the longest previously-known chain of switches.

Path Trained Ordering

In accordance with one aspect of the present invention, another method and system known as "Path trained ordering" and described herein may be used to determine certain information about the ordering of certain sections of a deep portion of a computer network (where it can be assumed that there are no intermediate segments) with respect to a particular path through the network topology. More particularly, given that the above-described "Path trained grouping" method has been used to group the switch leaders into equivalence classes with respect to the path from P to Q, this current method and system can be used to order the equivalence classes with respect to their attachment to the path from P to Q. The Path trained ordering method proceeds in several steps and involves each class leader comprising a representative member of an equivalence class determined by the path trained grouping method.

In general, the Path trained ordering method orders the equivalence classes with respect to the path from P to Q by the use of any appropriate standard algorithm for the sorting or ordering of objects based on comparison of two objects. A technique is described which can be provided to any such sorting algorithm to enable the sorting algorithm to compare any two class leader computers (with respect to the distance along the path from P to Q) as it progresses. Comparing of the two class leader computers proceeds in three steps if a binary result is required; it proceeds in six steps if a ternary result is required by the sorting algorithm.

Consider an example network in which P and Q denote two computers in the network, and that the two class leaders being chosen for comparison are denoted by A and B. As with the above methods and systems, an address X is chosen which is not in use by any computer in the system. In a first step, computer A sends a training packet from address X across the network to computer P. This causes the switches in the path from A to P to know how to deliver packets for address X (namely to computer A). In step two, computer Q sends a similar training packet from address X to computer B. This causes all the switches in the path from Q to B to know how to deliver packets for address X (namely to computer Q). In step three, computer P sends a probe packet to address X. If the packet in step two passes through a switch which also carried the packet from step one, then when the probe packet reaches that switch the probe packet will follow the more recent training information and will be delivered to computer Q. In this case, the class of computer A is greater than or equal to the class of computer B with respect to the ordering defined by the path from P to Q. If the packet in step two does not pass through a switch which carried the packet from step one, then the switches which were trained by the packet in step one will retain that training information and the probe packet in step three will be delivered to computer A. In this latter case (the class of) computer A is less than (the class of) computer B with respect to the ordering defined by the path from P to Q.

If a ternary result is required by the sorting algorithm, and if steps one to three indicated that computer A is greater than or equal to computer B, then the method proceeds to use steps four to six, which are the same as steps one to three except that the roles of computers A and B are reversed. These additional steps will determine whether B is greater than or equal to computer A with respect to the path from P to Q (in which case A and B are equal—their equivalence classes are attached to the same switch along the path from P to Q) or computer B is less than computer A with respect to the path from P to Q (in which case A is greater than B).

Figure 7A:
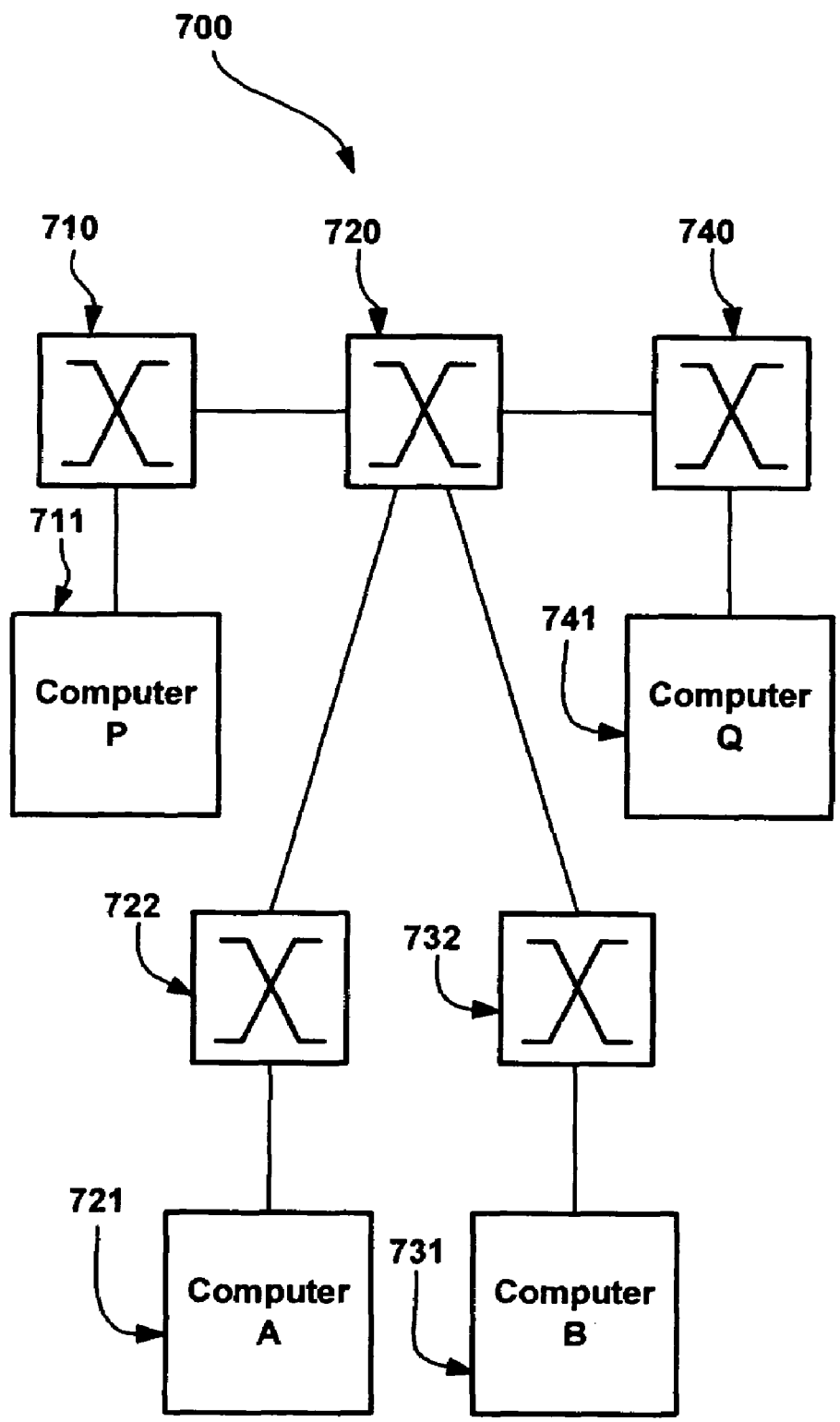
FIGS. 7A and 7B are block diagrams showing two networks of several switches and computers, illustrating an example of path trained ordering by which equivalence classes may be ordered with respect to a path through the network.
Figure 7B:
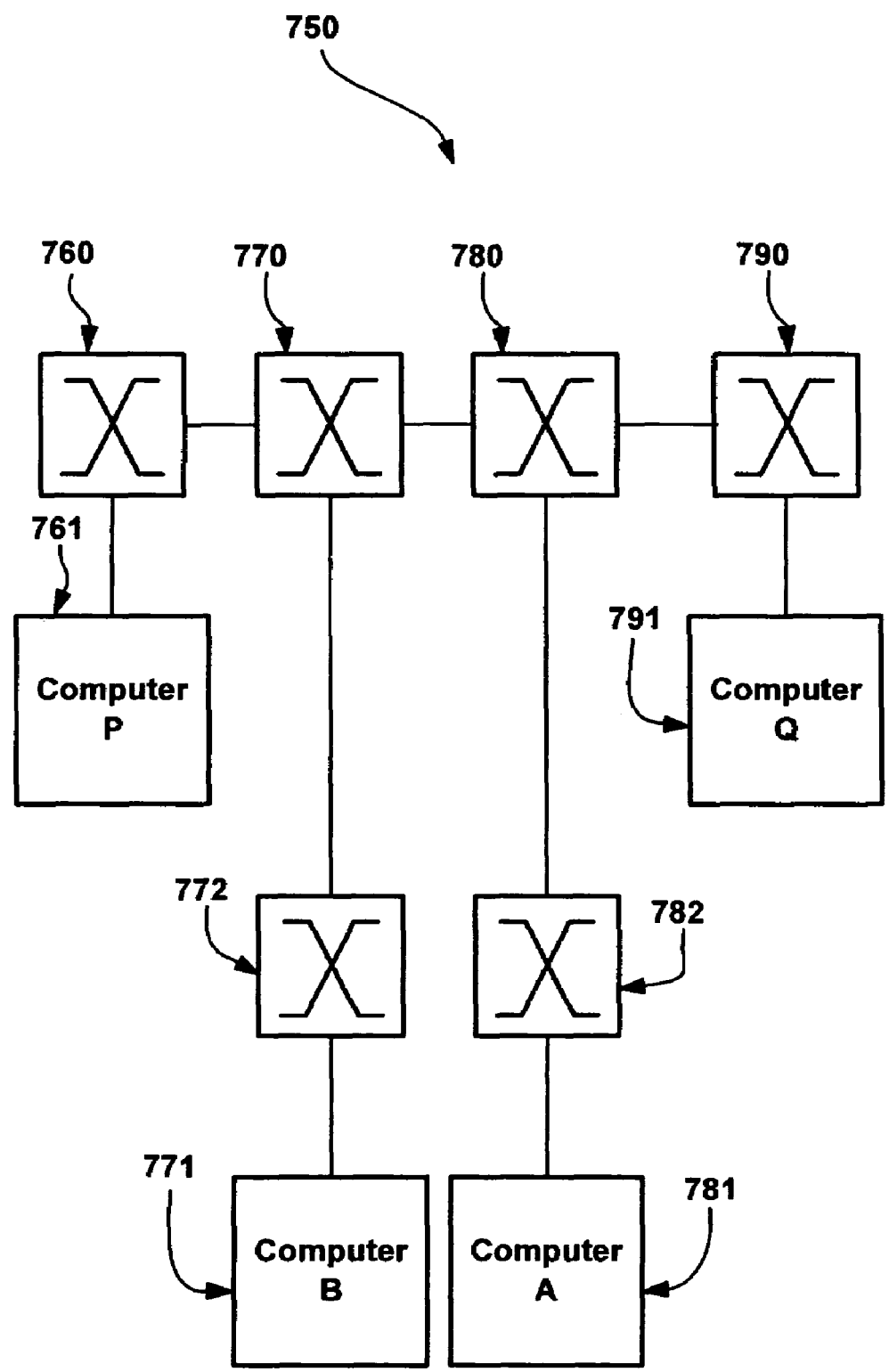

Consider by way of example and not of limitation, the network 650 depicted in FIG. 6B, together with the network 700 and the network 750 respectively depicted in FIGS. 7A and 7B. These three diagrams show three networks each comprised of computers P and Q, and two equivalence class leaders A and B. The sequence of packets used to compare A and B for these three networks is described below.

Considering the network 650 of FIG. 6B, in step one the training packet travels from the computer 671 through the switch 672, the switch 670 and the switch 660 to arrive at the computer 661. In step two the training packet travels from the computer 691 through the switch 690, the switch 680 and the switch 682 to arrive at the computer 681. In step three the packet travels from the computer 661 through the switch 660, the switch 670 and the switch 672 to arrive at the computer 671. The result is that the class represented by the computer A is less than the class represented by the computer B with respect to the path from P to Q.

Next, considering the network 700 of FIG. 7A, in step one the training packet travels from the computer 721 through the switch 722, the switch 720 and the switch 710 to arrive at the computer 711. In step two, the training packet travels from the computer 741 through the switch 740, the switch 720 and the switch 732 to arrive at the computer 731. In step three, the computer 711 sends a probe packet which travels through the switch 710 to the switch 720; at this point the switch 720 has been updated by the training packet sent in step two and so the probe packet continues to the switch 740 and arrives at the computer 741. Note that at this point A may be greater than or equal to computer B, and so the method continues with additional steps four through six. In step four, the computer 731 sends a training packet which travels through the switch 732, the switch 720 and the switch 710 to the computer 711. In step five, the training packet travels from the computer 741 through the switch 740, the switch 720 and the switch 722 to arrive at the computer 721. In step six, the computer 711 sends a probe packet which travels through the switch 710 to the switch 720. At this point switch 720 has been updated by the training packet sent in step five, whereby the probe packet continues to the switch 740 and arrives at the computer 741. The result is that the class represented by the computer A is equal to the class represented by the computer B with respect to the path from P to Q.

Considering the network 750 of FIG. 7B, in step one, the training packet travels from the computer 781 through the switch 782, the switch 780, the switch 770, and the switch 760 to arrive at the computer 761. In step two, the packet travels from the computer 791 through the switch 790, the switch 780, the switch 770 and the switch 772 to arrive at the computer 771. In step three, the probe packet travels from the computer 761 through the switch 760 to switch 770. At this point, the switch 770 has been updated by the training packet sent in step two, therefore the probe packet continues to the switch 780 and the switch 790 to be delivered to the computer 791. At this point, A could be greater than or equal to computer B and so the method continues with the additional steps four through six. In step four, the computer 771 sends a packet through the switch 772, the switch 770 and the switch 760 to arrive at the computer 761. In step five, the computer 791 sends a training packet which travels through the switch 790, the switch 780 and the switch 782 to arrive at the computer 781. In step six, the computer 761 sends a probe packet which travels through the switch 760, the switch 770 and the switch 772 to arrive at the computer 771. The result is that the class represented by computer A is greater than the class represented by computer B with respect to the path from P to Q.

It should be understood that there are many possible variant implementations of this method including varying the ordering by which A can be tested for being less than B, or B tested for being less than A, or the ordering by which less than is determined with respect to the path from P to Q, or from Q to P. In accordance with one aspect of the present invention one efficient variant implementation of the present method is to keep a record within the system from one instance of determining the network topology to the next, and to select for comparison ordering the class leader computers which were found to be in some particular order in some previous instance of determining the network topology. The advantage of this variation is that if the network has changed little then the sorting method will essentially just be checking the order of the classes rather than finding the order of the classes, and since this can be done with fewer comparisons the result will be found with fewer packets. Conversely, if the network has changed significantly then this variation method will statistically not perform any worse than any arbitrary ordering of comparison between class leaders with respect to the path from P to Q.

Since any sorting algorithm can be used, a particular sorting algorithm that minimizes the number of comparisons can be selected, (because comparison can be relatively expensive, since they involve waiting for packets to be exchanged). For example, one can use memorization, so that every comparison is performed at most once during the sort.

In accordance with another aspect of the present invention, one efficient variant implementation is to choose the computers P and Q based on the information obtained and kept from some previous instance of determining the network topology, in such a way as to tend to optimize the amount of information learned about the network topology from the formation of equivalence classes and their subsequent ordering, and to tend to minimize the number of packets which must be sent, under the present method and system.

Path Trained Ordering Edge Case

In accordance with an aspect of the present invention, a "Path trained ordering edge case" method and system is described that may be used to determine certain information about the ordering of certain sections of a deep portion of a computer network (where it can be assumed that there are no intermediate segments) with respect to a particular path through the network topology. More particularly, given that the previously described "Path trained ordering" method has been used to order equivalence classes of switch leaders with respect to the path from P to Q, the Path trained ordering edge case method may be used to determine if the class closest to P is or is not attached through to the path from P to Q using the switch of which P is the switch leader; and symmetrically whether the class closest to Q is or is not attached through to the path from P to Q using the switch of which Q is the leader. The Path trained ordering edge case method proceeds in several steps which are similar (though not identical) to the steps described in the path trained ordering method, and is thus described below for reasons of clarity.

To explain this method, consider an example network in which P and Q denote two computers, and in which A is the class leader determined from the "Path trained ordering" mechanism to be closest to P (or any one of the class leaders where there are more than one equal under the ordering). As with previous methods and systems, an address X is chosen which is not in use by any computer in the system. In step one, computer A sends a training packet from address X across the network to computer Q. This causes the switches in the path from A to Q to know how to deliver packets for address X (to computer A). In step two, computer P sends a switch local training packet from address X which will be seen by only its local switch (as described above). This causes only the switch closest to P to know that it should deliver packets for address X to computer P. In step three, computer Q sends a probe packet to address X. If the packet in step one passes through the switch to which P is attached, then the packet of step two will change that switch's delivery destination for address X. As a result, when the packet in step three reaches that switch it will follow the more recent training information and will be delivered to computer P; in this case the class of computer A is attached to the path from P to Q using the same switch as computer P. If the packet in step one does not pass through the switch which will see the packet in step two, then the switches which were trained by the packet in step one will retain that training information and the probe packet in step three will be delivered to computer A. In this case, the class of computer A is not connected to the path from P to Q using the same switch as computer P.

Using symmetry a similar arrangement of packets can be used to determine if the class leader (denoted B) determined to be closest to Q is attached to the path from P to Q using the same switch as the computer Q. In step one, a training packet is sent by computer B from address X to computer P. In step two, computer Q sends a local training packet from address X which is seen by only its local switch. In step three, computer P sends a probe packet to address X. If the class of computer B is attached to the path from P to Q using the same switch as computer Q, then the probe packet will be received at computer Q. Otherwise the probe packet will be received by computer B.

Figure 8A:
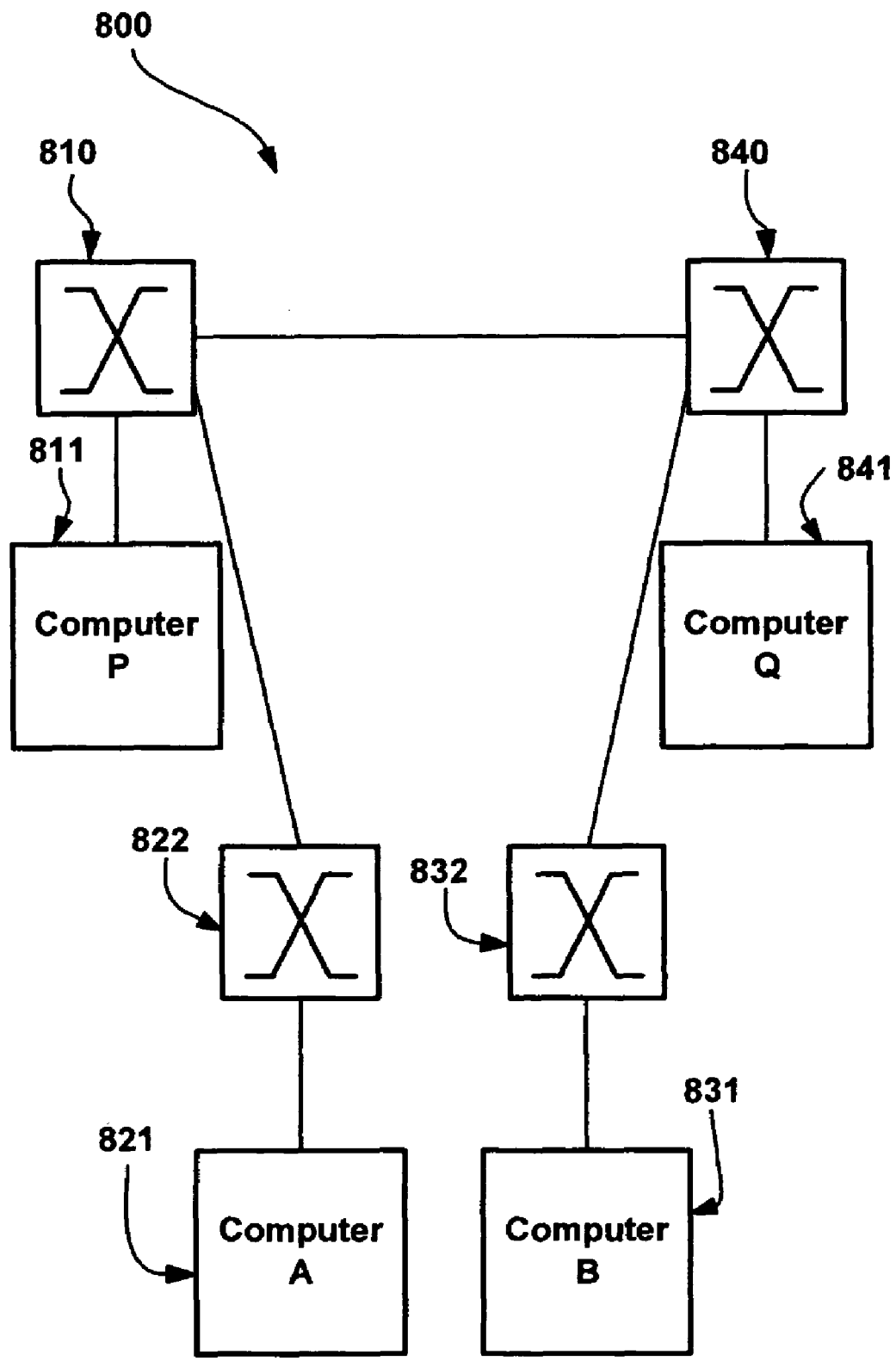
FIGS. 8A and 8B are block diagrams showing two networks of several switches and computers, illustrating an example of path trained ordering edge case by which an ordered equivalence class may be tested for adjacency with one end of a path through the network.
Figure 8B:
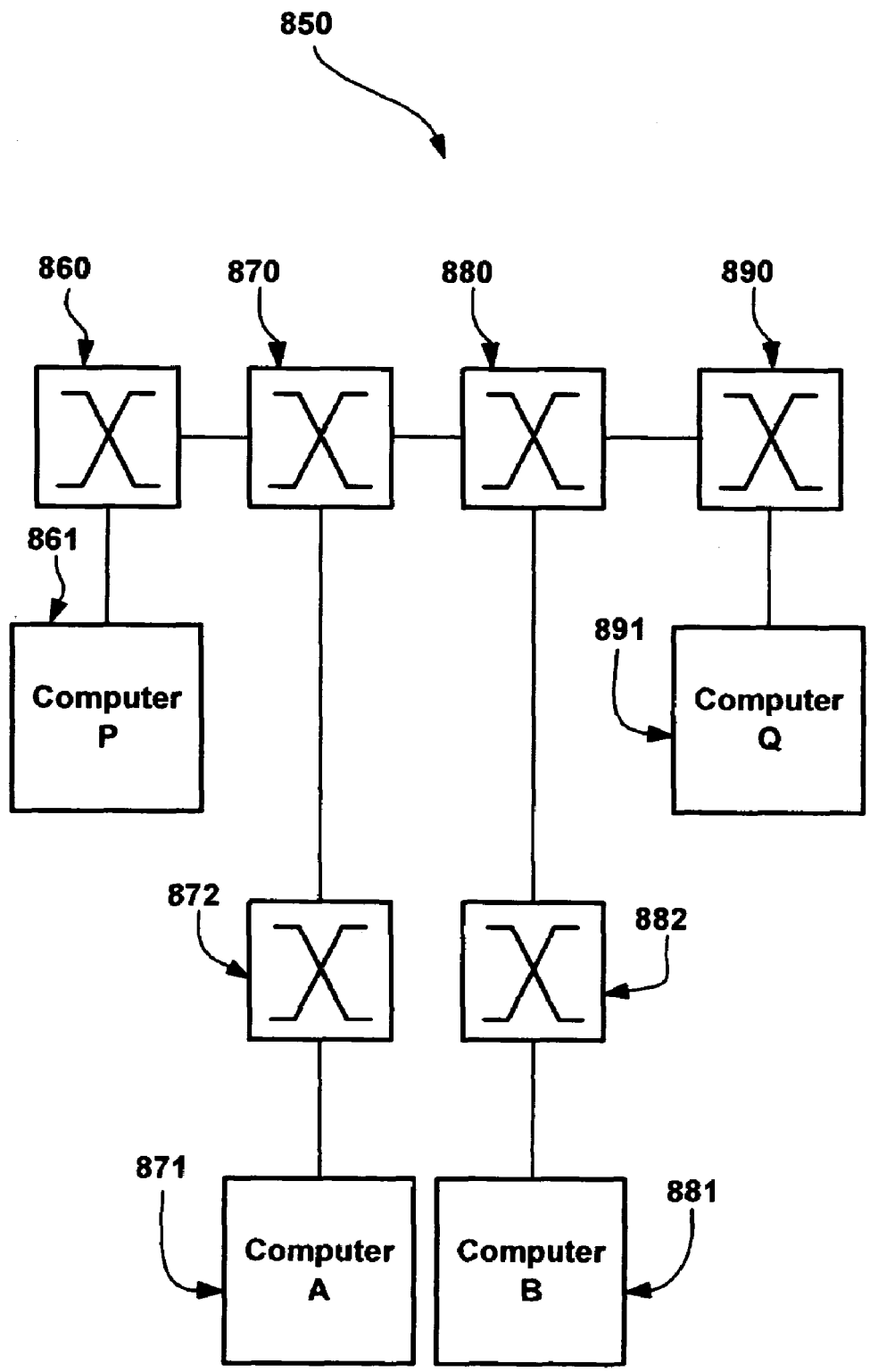

By way of example and not of limitation, the networks 800 and 850 are depicted in FIGS. 8A and 8B. For both of these networks 800 and 850, the path trained grouping and path trained ordering methods will have detected two equivalence classes, one containing the computer A and one containing the computer B, and will have determined that the computer A is closer along the path from P to Q to the computer P than the computer B is. The difference between the two networks is discovered using the "Path trained ordering edge case" method.

Considering the network 800 of FIG. 8A, in step one, the training packet travels from the computer 821 through the switch 822, the switch 810, and the switch 840 to the computer 841. In step two, the computer 811 sends a training packet which retrains the switch 810. In step three, the computer 841 sends a probe packet which travels through the switch 840, and the switch 810, to the computer 811. Thus it can be deduced that the equivalence class of the computer 821 (which includes switch 822) is attached to the path from the computer 811 to the computer 841 through the switch 810.

Considering the network 850 of FIG. 8B. In step one, the training packet travels from the computer 871 through the switch 872, the switch 870, the switch 880, and the switch 890 to the computer 891. In step two, the computer 861 sends a training packet which retrains the switch 860. In step three, the computer 891 sends a probe training packet which travels through the switch 890, the switch 880, the switch 870, and the switch 872 to the computer 871. Thus it can be deduced that the equivalence class of the computer 871 (which includes the switch 872) is not attached to the path from the computer 861 to the computer 891 through the switch 860.

It should be understood that there are many possible variant implementations of this method and system whereby the variations may include the ordering of computers A and P (since the method is also symmetric in these computers), or the ordering by which the class closest to P is tested with respect to the switch attached to P, before or after the class closest to Q is tested with respect to the switch attached to Q. In addition, there are many possible ways of selecting from among the class leaders closest to P (or Q) if there are more than one determined to be equally the closest under the "Path trained ordering" method and system.

Path Trained Ordering Singleton Case

In accordance with one aspect of the present invention, a method and system known as "path trained ordering singleton case" is described that may be used to determine certain information about the ordering of certain sections of a deep portion of a computer network (where it can be assumed that there are no intermediate segments) with respect to a particular path through the network topology. Specifically, given that the previously described "Path trained grouping" method has been used to find equivalence classes of switch leaders with respect to the path from P to Q, and that the "Path trained ordering" method has determined that one or more equivalence classes of size one are attached to the path from P to Q by the same switch, this current method and system can be used to determine which (if any) of those equivalence classes which have been found to contain a single switch is the switch which forms part of the path from P to Q. If none of them are, then they are all indirectly connected using a switch which has no computers directly attached (and therefore no switch leader). Note that it follows from the operation of the path trained grouping method and system that no equivalence class containing more than one switch leader can have a switch leader whose switch is the switch connecting the equivalence class to the path from P to Q. The method proceeds in several steps which are similar though not identical to the steps described above, and the method is therefore described separately herein for reasons of clarity.

Consider that P and Q are given, and that A is the only switch leader of an equivalence class determined from the above-described "Path trained grouping" method to contain a single switch leader. As with several previous methods, an address X which is not in use by any computer in the system is chosen. In a first step, a computer P sends a training packet from the address X across the network to the computer Q. This causes the switches in the path from P to Q to know how to deliver packets for address X (namely to computer P). In a second step, the computer A sends a switch local training packet from address X which will be seen by only its local switch (as described above). This causes only the switch closest to A to know that it should deliver packets for address X to computer A. In a third step, the computer Q sends a probe packet to address X. If the packet in step one passes through the switch to which A is attached, then the packet of step two will change its delivery destination for address X. Then, when the packet in step three reaches that switch, the packet will follow the more recent training information and will be delivered to computer A. If the packet in step one does not pass through the switch which will see the packet in step two, then the switches which were trained by the packet in step one will retain that training information and the probe packet in step three will be delivered to computer P. In such a case, the switch of computer A is not a part of the path from P to Q.

Figure 9A:
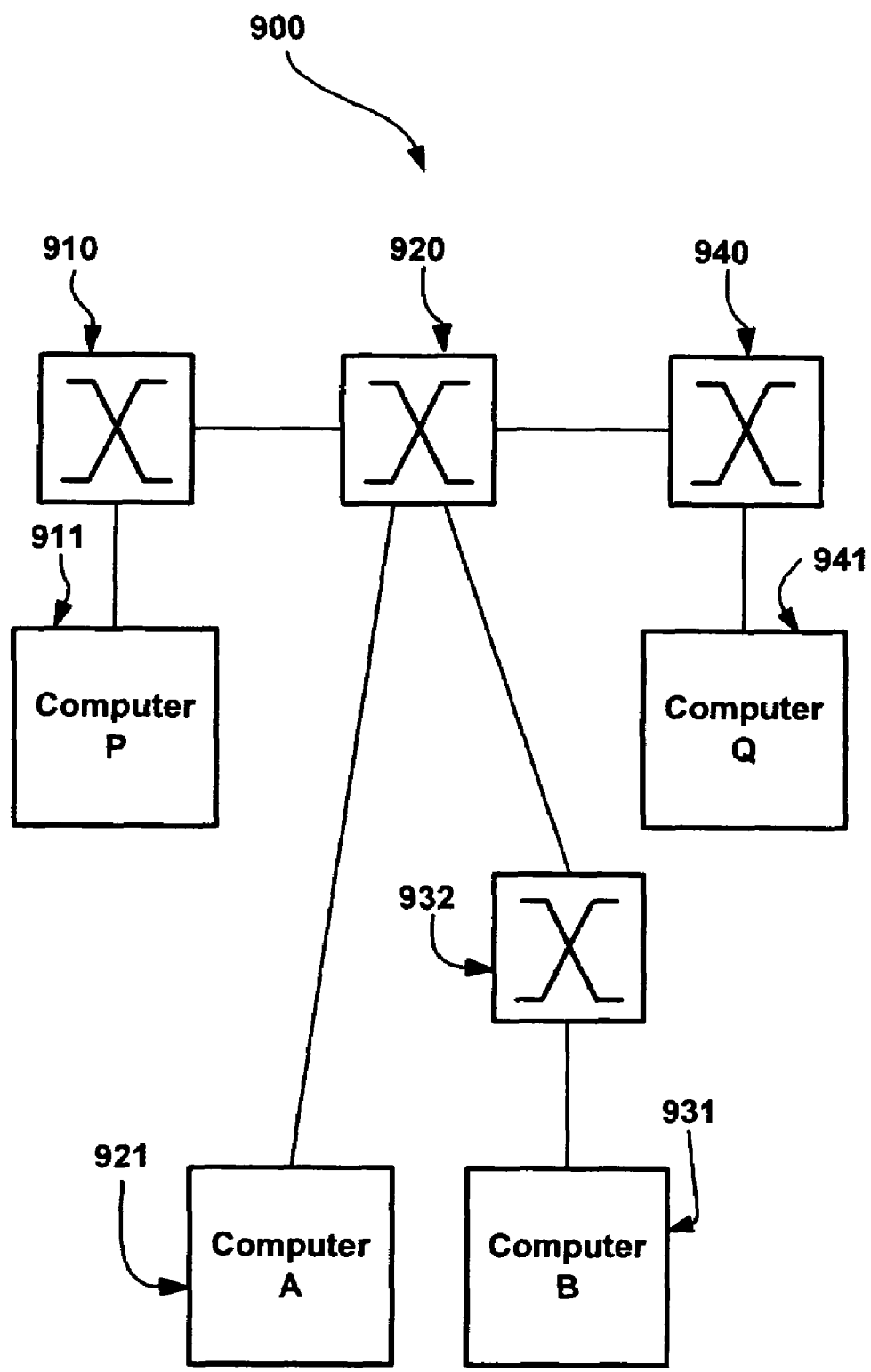
FIGS. 9A and 9B are block diagrams showing two networks of several switches and computers illustrating an example of path trained ordering singleton case by which an equivalence class containing a single switch may be tested for direct or indirect connection with a path through the network.
Figure 9B:
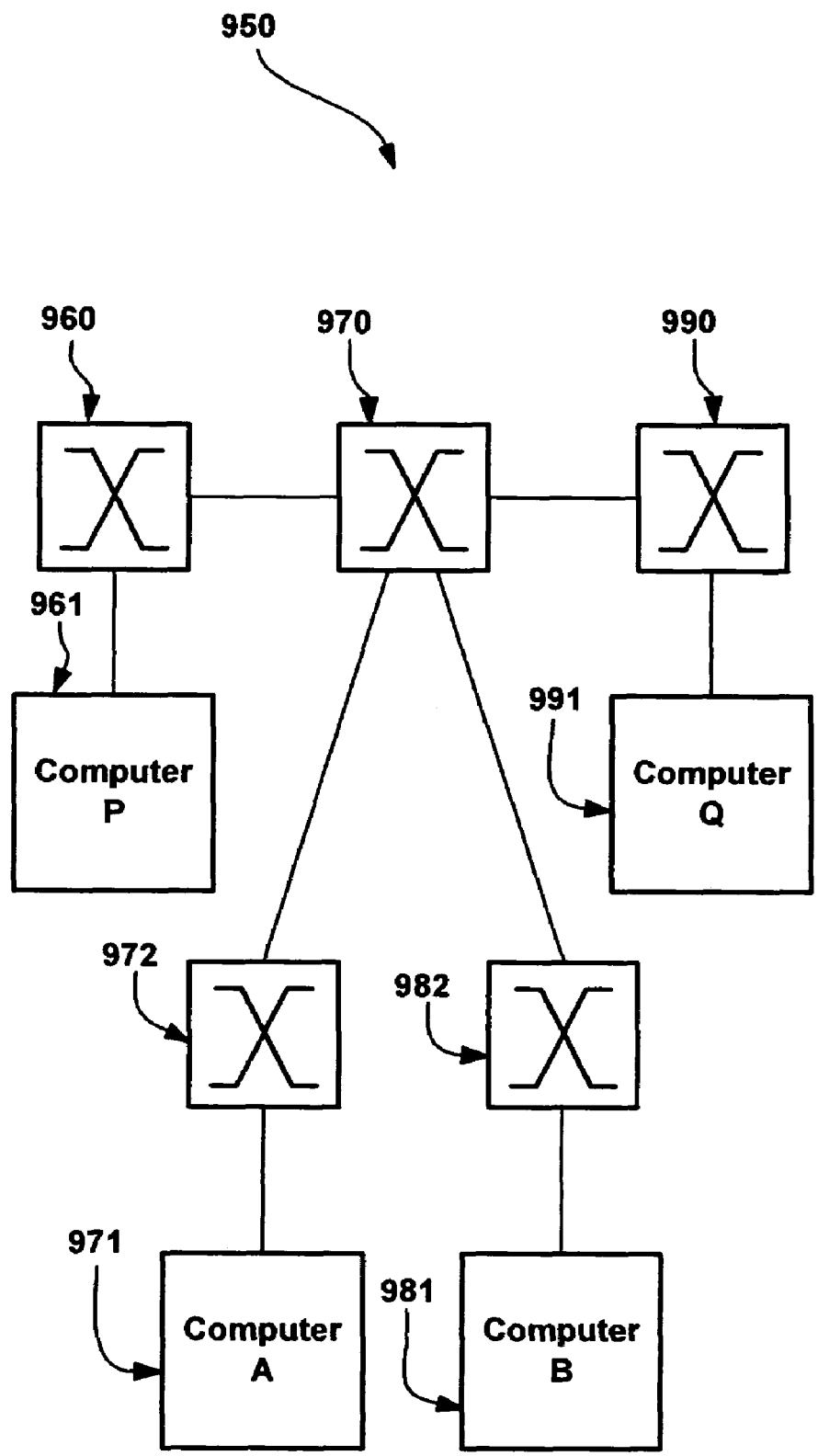

Consider by way of example and not of limitation, the network 900 of FIG. 9A and the network 950 of FIG. 9B. For both of these networks, the path trained grouping and path trained ordering methods will have detected two equivalence classes, one containing computer A and one containing computer B, and will have determined that the equivalence class of computer A is attached to the path from P to Q at the same point as the equivalence class of computer B (that is that A and B are equal under the "path trained ordering" method). Further, the "Path trained ordering edge case" method will have determined that neither A nor B are connected to the path from P to Q using the switches of which either P or Q are switch leaders. The difference between the two networks is discovered using the "Path trained ordering singleton case" method and system. Note that it is not possible for both computer A and computer B to be directly connected to the same switch on the path from P to Q since both A and B are switch leaders.

Considering the network 900 of FIG. 9A, in step one of the Path trained ordering singleton case method, the training packet travels from the computer 911 through the switch 910, the switch 920, and the switch 940 to the computer 941. In step two, the computer 921 sends a training packet which retrains the switch 920. In step three, the computer 941 sends a probe packet which travels through the switch 940, and the switch 920, to the computer 921. Thus it can be deduced that the switch of which the computer 921 is the switch leader is present on the path from the computer 911 to the computer 941. Since the computers 921 and 931 are known to be equal under the path trained ordering method and system, the path trained ordering singleton case need not consider the computer 931, as the topology of network 900 is now known.

Considering the network 950 of FIG. 9B, in step one, the training packet travels from the computer 961 through the switch 960, the switch 970, and the switch 990 to the computer 991. In step two, the computer 971 sends a training packet which retrains the switch 972. In step three, the computer 991 sends a probe packet which travels through the switch 990, the switch 970, and the switch 960 to the computer 961. Thus it can be deduced that the switch of the computer 971 is not attached to the path from the computer 961 to the computer 991. The method then proceeds to evaluate the computer 981. In step one, the training packet travels from the computer 961 through the switch 960, the switch 970, and the switch 990 to the computer 991. In step two, the computer 981 sends a training packet which retrains the switch 982. In step three, the computer 991 sends a probe packet which travels through the switch 990, the switch 970, and the switch 960 to the computer 961. Thus it can be deduced that the switch of the computer 981 is not attached to the path from the computer 961 to the computer 991. The existence of the switch 970 can therefore be inferred and the topology of the network 950 is therefore known.

It should be understood that there are many possible variant implementations of this method and system whereby the variations may include the ordering of the computers P and Q (since the method is also symmetric in these computers), or the ordering by which the classes containing a single switch leader are considered for testing under the method.

In accordance with one aspect of the present invention, one particular efficient variant implementation is to cause the switch leaders of the classes which contain a single switch leader, and which are under consideration by the present method and system, to execute the second step for the method in sequence and before the third step is executed. In this implementation, the probe packet of step three will be delivered to whichever switch leader is connected directly to the switch of attachment for these classes to the path from P to Q, if there is such a switch. This may reduce the number of packets which are sent. For example, one efficient variation implementation is to choose the computer A for testing based on the information obtained and kept from some previous instance of determining the network topology, in such a way as to select the same switch leader which was previously found to be attached to the switch which is in the path from P to Q first, in order to minimize the number of packets which are sent under the present method and system.

It should be noted that in these four methods and systems, namely "path trained grouping", "path trained ordering", "path trained ordering singleton case" and "path trained ordering edge case", a witness packet is always received at some computer. This allows for considerable simplification of retransmission logic to cope with packet loss, because these four methods do not deduce any information from the absence of a packet. Failure of a computer to observe a packet always indicates a loss event, and thus never reveals information about the topology being probed.

Inductive Determination of Network Topology

In accordance with one aspect of the present invention, a method and system known as "Inductive determination of network topology" and described herein can be used to determine the network topology of a deep portion of a computer network (where it can be assumed that there are no intermediate segments). Specifically, given that the previously described "Path trained grouping", "Path trained ordering", "Path trained ordering edge case" and "Path trained ordering singleton case" methods are available to be applied, the Inductive determination of network topology method and system determines the order in which those methods and systems should be applied in order to determine the overall network topology.

As described above, various methods and systems of the present invention were used to determine switches in the network and representative switch leader computers for those switches. If there is only one switch leader in the network, then the topology of the network is one switch. If there are two switch leaders in the network, then the topology of the network is two switches which are connected together.

If there are three or more switches in the network, then the method is to choose a switch leader to be the computer P, to choose a switch leader to be the computer Q and to apply the "Path trained grouping", "Path trained ordering", "Path trained ordering edge case" and "Path trained ordering singleton case" methods to split the remaining switches up into classes, to order the classes, to test the classes for attachment at the same point as computer P or computer Q, and to test singleton classes (if any) to see if they are directly or indirectly attached to the path from P to Q. Once this has been done, if there are any classes that contain more than one switch, then the topology within those classes is determined by inductive reapplication of those four methods in sequence, using the original P but selecting a new Q inside the class. This is applied inductively over and over on each class larger than one switch until the complete topology is known. Note that in the worst case choice of Q at any stage, the other switches may be found to be in a single equivalence class and little information about the network is known. However, at each choice of Q and application of the four methods, the switch leader Q and its switch are eliminated from the switches under consideration, and the remaining class must be at least one switch smaller. Because there is no infinite descending chain of positive integers the "Inductive determination of network topology" method and system will eventually terminate with the complete knowledge of the network topology.

It should be understood that even for this method and system there are many possible variant implementations. For example, in keeping with the current invention, one possible variant implementation is to keep information about the network topology from one instance of mapping of the network topology to another, and to select the computer Q at each stage in the method and system in order to tend to maximize the information which is obtained in each stage and tend to minimize the number of packets which must be sent to complete the method.

In accordance with another aspect of the present invention, the computer which is chosen to act as computer P in an inductive step of the current method and system may be any computer which is outside the equivalence class which is being inductively decomposed under the operation of the current method and system. Such a computer could be chosen in order to reduce the load on the computer system, or the network, or to select the most powerful or well placed computer to act as the computer P.

In particular, and in accordance with another aspect of the present invention, the topology information gained at one instance of operating a combination of the four methods used by the current method and system enables the choosing of multiple computers P (such as the switch leaders of singleton equivalence classes) along the path from P to Q in that one instance of application of the method and system such that the multiple computers can engage in multiple simultaneous inductive steps on remaining equivalence classes. This particular implementation has benefits of performance and efficiency.

As is understood, methods and systems that may be used to determine the topology of a deep network which does not contain intermediate segments have been described. The following description is directed towards extending these methods and systems to show how they may be applied to the more general case of a network which is deep, and which contains intermediate segments.

Path Crossing Test

In accordance with one aspect of the present invention, a method and system known as "path crossing test" and described herein may be used to determine the nature of the crossing point (if any) of two paths in the network. In the above-described methods of training and probing, three sweep detection, path trained grouping, path trained ordering, path trained ordering edge case, and path trained ordering singleton case, the methods determined information about the topology of the network, generally by training the switches along some path in the network and then probing to see whether the path of the probe intersects with the path of the training messages. In those former methods, it was assumed that the paths either intersected at a switch, or did not intersect. The path crossing test method, described below, deals with the general case where the paths in the network may intersect at intermediate segments.

The path crossing test involves four distinct computers indicated by the letters A, B, P and Q, and the test is written herein using the notation AB/PQ. The test evaluates the possible crossing of the paths from A to B and from P to Q using a method of three steps. As with several previous methods, an address X (which is not in use by any computer in the system) is chosen. In the first step, the computer A sends a message from address X to computer B. In a second step the computer P sends a message from address X to computer Q. In the third step the computer B sends a packet to address X. Finally, it is checked whether the packet sent at the third step arrived at computer A, computer P, or both.

The result of the test is zero ("AB/PQ=0") when only A gets X. This happens if and only if there are two deep switches separated by at least one segment with the path from A to B passing through one of the switches and the path from P to Q passing through the other, and neither path crossing the segment separating the switches. The "switch" result of the test, when only P gets X, may be written as ("AB/PQ=x"). This happens if and only if there is a switch on the path from A to B that is directly connected to at least one segment of the path from P to Q. Alternatively, when both A and P receive X, the result of the test is "hub" and is written as ("AB/PQ=h"). This happens if and only if there is a switch on the path from P to Q that is directly connected to a segment of the path from A to B but that that switch is not itself a part of the path from A to B.

Consider, by way of example and not of limitation, the networks 1600, 1620, 1640 and 1660 shown in FIGS. 16A, FIG. 16B, FIG. 16C and FIG. 16D, respectively. In these figures, indirect connections (in which the exact topology of which does not affect the path crossing test method) are shown with dashed lines. In the network 1600 of FIG. 16A, in step one, a computer 1611 sends the training packet to a computer 1619 which trains a switch 1615. In step two, a computer 1601 sends a packet to a computer 1609 which trains a switch 1605. In step three, a computer 1619 sends a packet to address X which travels back through the switch 1615 to the computer 1611. The result of this test is zero; there is no shared component on the paths.

Figure 16A:
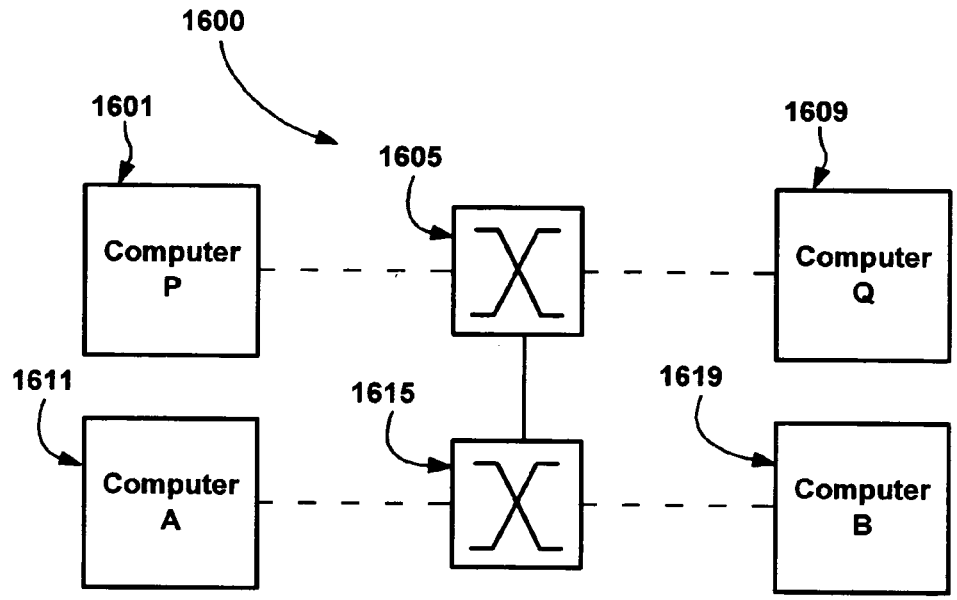
FIGS. 16A, 16B, 16C and 16D are block diagrams showing four networks of several computers and switches illustrating an example of a path crossing test in which the arrangement of several paths in the network may be tested to see if they affect each other, in accordance with various aspects of the present invention.
Figure 16B:
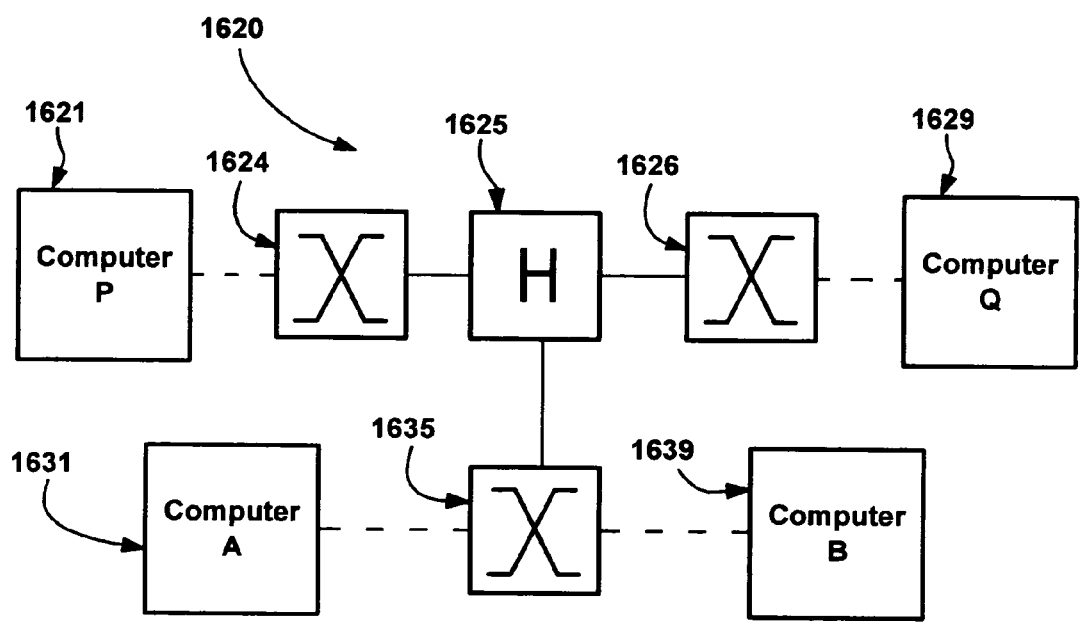

In the network 1620 of FIG. 16B, in step one, a computer 1631 sends a packet which trains a switch 1635 on its way to a computer 1639. In step two, a computer 1621 sends a packet through a switch 1624, a hub 1625, and a switch 1626, to a computer 1629. As the packet passes through the hub 1625, it will the retrain switch 1635 that the address X is on the segment including the hub 1625. In step three, the computer 1639 sends a packet to address X; when this packet reaches the switch 1635 it will pass through the hub 1625 to the switch 1624 and then to the computer 1621. The result of this test is "switch" as a switch of the path from A to B is present on a segment of the path from P to Q (specifically the segment comprising the hub 1625).

Figure 16C:
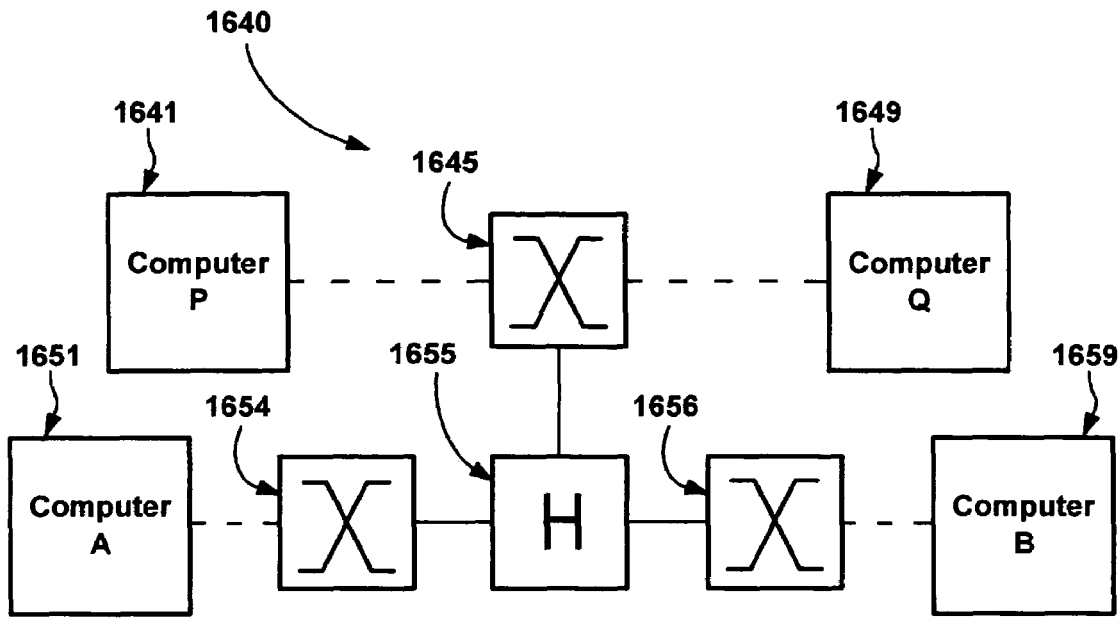

In the network 1640 of FIG. 16C, in step one, a computer 1651 sends a packet which passes through a switch 1654, a hub 1655, and a switch 1656, to a computer 1659. In step two, a computer 1641 sends a packet through a switch 1645 to a computer 1649. In step three, the computer 1659 sends a packet which passes through the switch 1656 onto the segment comprising the hub 1655; the switch 1654 and the switch 1645 both see the packet, and since both have been trained to recognize address X they both deliver the packet, to the computer 1641 and the computer 1651, respectively. The result of this test is "hub" because there is a switch (1645) on the path from P to Q that is directly connected to a segment of the path from A to B, but the switch is not itself a part of the path from A to B.

Figure 16D:
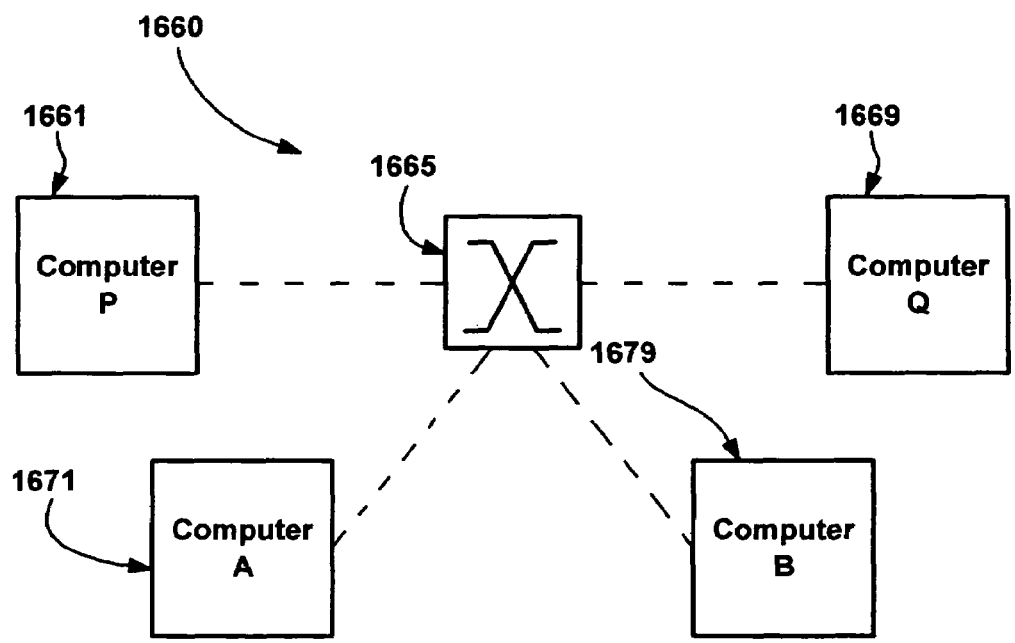

In the network 1660 of FIG. 16D, in step one, a computer 1671 sends a packet which passes through a switch 1665 to a computer 1679. In step two, a computer 1661 sends a packet to a computer 1679 which passes through (and retrains) the switch 1665. In step three, the computer 1679 sends a packet which passes through the switch 1665 and is delivered to the computer 1661. The result of this test is "switch" as there is a switch (1665) on the path from A to B that is directly connected to at least one segment of the path from P to Q (in this example, two segments on the path from P to Q, the one from switch 1665 towards computer 1661 and the one from switch 1665 towards computer 1669). This is the result that one skilled in the art would expect, given the similarity of this method to the path trained grouping method described above.

In accordance with one aspect of the present invention it can be understood that certain useful properties hold about the "path crossing test" method, which can be used in the efficient implementation of the test. These properties may be used by an implementation of the path crossing test method in order to avoid the cost of having to undertake particular tests. For example, such an implementation may retain a knowledge of each test carried out (in an instance of discovery network topology) and when some other method requests the result of some test, the implementation may be able to provide the answer from the knowledge that it has already obtained, or by performing some different test, and without having to undertake the exact test that was requested. The example networks shown in FIGS. 16A-16D may facilitate understanding of the following.

A first property is that the test is equivalent in the ordering of the two pairs of computers that represent the two training paths that are used in the steps of the method; to avoid any confusion that is the ordering within each pair as to which of the computers is the source of the packet and which is the destination of the packet, and not as to which of the pairs is in step one of the method and which is in step two of the method. Using the notation this property can be written as BA/PQ=AB/PQ=AB/QP=BA/QP.

A second property is that the test is transitive with respect to computers in the first pair (in the path used in step one) in the case that the test result is zero. Using the notation this can be written as AB/PQ=0 and BC/PQ=0 implies AC/PQ=0. This property holds because the network is a tree structure, and is related to the properties of the network that permit the "path trained grouping" method described above.

A third property is that if there are two distinct deep switches connecting the two paths of the test, then there are still two distinct deep switches connecting the two paths of the test when the two paths are considered in the other order. In other words, the zero result is symmetric. Using the notation this can be written as AB/PQ=0 implies PQ/AB=0. Also, since these two switches are distinct, there is a segment in the network that carries traffic between them and is distinct from either path. Therefore if the cross set of paths are considered it follows that they cross on that segment. Using the notation, AB/PQ=0 implies AP/BQ=AQ/PB=x.

A fourth property is that if two paths cross when considered in one order then they cannot pass through distinct switches when considered in the other order. Using the notation AB/PQ=x implies PQ/AB≠0 (that is, PQ/AB is either h or x). This is because there must be some switch of the path AB which is on a segment of the path PQ; therefore the path PQ must at least touch (or pass through) that switch on the path AB.

A fifth property is that if a path AB touches another path PQ, then the path PQ crosses the path AB. This holds because if a path AB touches PQ then there is a switch on the path PQ that is on a segment of the path AB, but not connected to a switch on the path AB; this switch will be retrained by any message on the path AB. Therefore if the path AB is the path used in the second step of the method, it will be retrained causing the paths to cross. Using the notation AB/PQ=h implies PQ/AB=x.

In accordance with one aspect of the present invention, in addition to the use of the above properties to improve performance, the method has a variation in which a large number of tests may be made of the network with fewer packet transmissions. In this variation, the first step is for the computer A to send a packet from the address X to the broadcast destination address (or to a multiplicity of computers B). The second step is unchanged, and in the third step the test probe packet can be sent from a multiplicity of computers B (distinct from A, P and Q) without having to repeat the steps one and two. This holds because for any B a broadcast packet in step one is a packet from A to B. It is then very efficient to analyze the set of packets from the many B computers which arrived at either A or P; this significantly reduces the total number of packets which must be sent to perform a large number of tests. This is written in the present notation as the set of tests A*/PQ.

In accordance with one aspect of the present invention, the above properties permit tests to be carried out where full support from all of the computers is not present. Note that the steps of the method require that computers A and P can send packets from a forged source address X; the computers B and Q do not need to do so. Note also, that the computers A and P need to be able to be queried to see if they received the probe packet send in step three; the computers B and Q do not need to do so. Note that the steps of the method require that computers A, P and B can send packets on demand; computer Q does not need to do so, as long as the network knows how to deliver packets to it without flooding.

In accordance with one aspect of the present invention, there exists a modified method to the path crossing test method in which the computers P and Q, which form the path through the network used in the second step, are the same computer. Using the notation this is written as AB/PP. In the modified method, step two is replaced by a local segment transmission (for example using the similarly named method described above) to train the address X on the segment local to the computer P. In all other respects the method operates as normal. The reader may find it helpful to compare this modified method with the method of "path trained ordering edge case" which is described above. This modified method may have all three possible results depending on the network topology.

In accordance with one aspect of the present invention, there exists a modified method to the path crossing test method in which the computers A and B, which form the path through the network used in the first step, are the same computer. Using the notation this is written as AA/PQ. In the modified method, step one is replaced by a local segment transmission (for example using the similarly named method described above) to train the address X on the segment local to the computer A. In this modified method it is impossible for A to receive the transmission, and hence impossible for the method to give the "h" result. This is not a problem because there is no network topology in which there can be a deep segment between A and itself, and so there can also be no switch of PQ on that segment.

Island Edge Detection

In accordance with another aspect of the present invention, a method and system known as "island edge detection" and described herein may be used to determine the segment or switch at the boundary of an island which is closest in the network topology to some other island. The method and system operate with the general purpose of discovering both the location of the island in the network topology and the selection of the preferred computer to use as a representative of the island in the analysis of the deep network between the islands.

As described above, most computer networks do not have intermediate segments and thus most islands are comprised of several segments attached to the same switch, with the switch forming the point at which the island attaches to the rest of the network. Some networks however, have intermediate segments, and these may be within, on the edge of, or outside any island. Since the network is always a tree, the information from the original sees matrix determines shallow segments (and hence islands) which are in between other islands; such islands may mean that there are multiple disjoint portions of deep network, which are generally best analyzed separately.

The method proceeds by operating over the order of segments in the tree, such as defined by the "shallow segment tree order" method and system. The method has found the edge of an island when it finds some segment S in the order with a child T which is in a different island. When this happens the method checks the number of children of S in the island of T. If there is more than one, then the island including the children has as its edge (towards S) a switch which connects those segments. A computer on one of those segments is appropriate for analysis of the gap (the portion of deep network) between the island of S and the island of T; such a computer could be the switch leader for that switch, such as determined by the aforementioned "switch leader election" method and system. If there is only one such child T, then the segment of T is the edge of that island (towards S) and that segment is connected to a switch which forms part of the gap. The segment leader of T is chosen as the switch leader of that switch; note that no other shallow segment can be connected to that switch or otherwise such other shallow segment would have been in the same island as T.

The segment S may have multiple islands connected to it indirectly; the method must also determine whether any of these share attachment via the same switch or whether they are attached through different switches. The method proceeds as follows: when the method determines that a segment S has a child segment T (in a different island) then it checks the number of switches of S through which child segments are attached (these may be in the same island as S or in other islands; initially the only possibility will be those in the same island). If there are no such switches then the method adds to the known topology a switch on the segment S through which the island of segment T is reached, and the segment leader of S becomes the switch leader for that switch. If there is such a switch (leading to any computer C) then the method tests whether a packet from T to C is seen on the segment of S (for example, by causing the segment leader of segment T to send such a packet and checking whether the segment leader of segment S observed the packet). If it is not seen, then the island of T is reachable from S via the same switch as C; if that switch does not already have a switch leader then the segment leader of segment S becomes the switch leader for that switch. If the packet is seen, then the island of T is connected to the segment of S via a new switch for which the segment leader of S becomes the switch leader. Finally, the different switches on the segment of S through which the children of different islands are reached represent the multiple edges of different gaps which remain to be analyzed.

Figure 18:
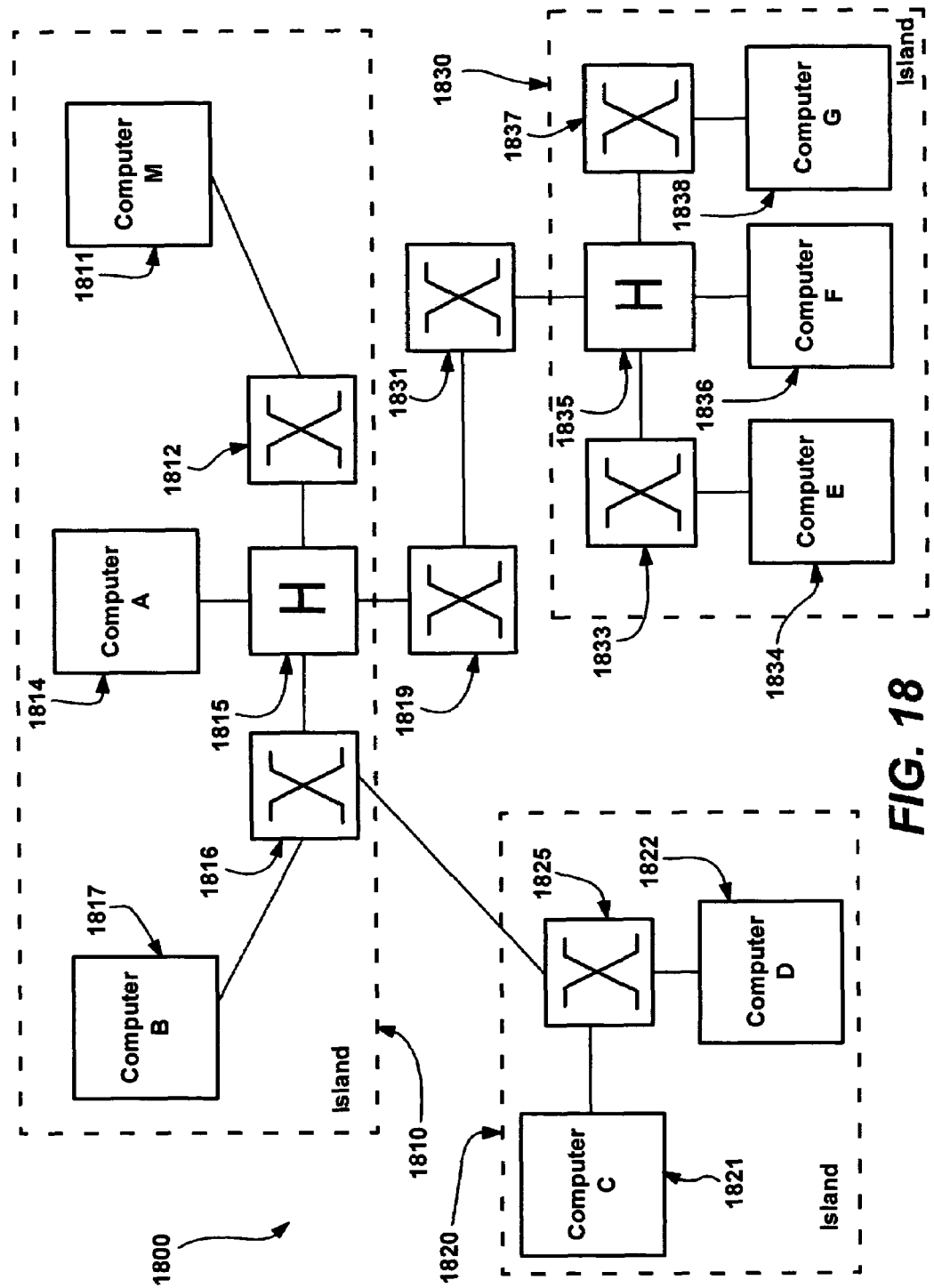
FIG. 18 is a block diagram showing a network of several switches, hubs and computers illustrating an example of island edge detection in accordance with an aspect of the present invention.

Consider by way of example and not of limitation, the network 1800 shown in FIG. 18. In this example, the computer M (1811) is the master computer which acts as the collector for the segment detection methods, and its segment is the root for the shallow segment tree ordering method. The description of FIG. 18 begins after the three sweep detection method or the like and subsequent analysis has been done, which will result in the three islands denoted with the dashed boxes marked 1810, 1820 and 1830. One skilled in the art should recognize the shallow segment tree order. The island edge detection method examines every segment of the tree, and the relevant details occur when the method applies its steps to segment 1815. The method will first consider the child segment 1817; since it is on the same island no special action need be taken.

The island edge detection method will then consider the child segment 1821 and notice that it is on a different island (1820). The method will then find the other child segments of segment 1815 that are on island 1820 and determine that there are two, 1821 and 1822. Since there is more than one, the island 1820 must have its island edge link leaving the island from the switch which joins those two segments (namely 1825). The method will then check where the outgoing link from island 1810 towards island 1820 is, by causing computer 1821 to send a packet to computer 1817 and checking whether it is seen at computer 1814. In this case it will not be seen at computer 1814 and so the method can deduce that the island edge link of island 1810 towards island 1820 is connected to the switch which is between segment 1815 and segment 1817, namely the switch 1816.

The method then continues to consider the child segments of 1815, and will observe that segment 1835 is a child on island 1830. Since there is only one child of segment 1815 which is on island 1830 the segment 1835 must be connected to a switch which is not already a part of island 1830 through which is the edge of island 1830 towards island 1810 (this is switch 1831). The method will then check where the outgoing link from island 1810 towards island 1830 is by causing computer 1836 to send a packet to computer 1817 and check whether it is observed by computer 1814. In this example such a packet will be observed and so the method can infer that the segment 1815 is connected to a switch 1819 through which the edge of island 1810 towards island 1830 is connected. Note that the method can tell that both 1819 and 1831 are distinct switches (not a single switch), because if it was a single switch, then segment 1835 and segment 1815 would have been adjacent in the three sweep detection method and so would have been part of the same island and not of distinct islands.

It should be understood that there are many possible variant implementations of this method and system, including varying the ordering that is used to check the edges, the computers in each island that are used to check for the location of the edge switch, the way in which the visibility of packets crossing from one island to another are checked, and so forth.

Gap Splitting

In accordance with one aspect of the present invention, a method and system known herein as "gap splitting" may be used to split a gap (or deep portion of a network between islands) into several smaller gaps which are each easier to analyze, such as when the topology of the gap has multiple deep segments which connect to a switch which is on the edge of an island.

A general concept of the gap splitting method is to simplify the task of analyzing the gaps in the network topology; gaps which are reduced to only two single islands can be connected trivially by a piece of wire. Referring again to the network 1800 shown in FIG. 18, the two remaining gaps (between switches 1816 and 1825 and between 1819 and 1831) are easily described by a simple connection. Note that there could be an arbitrary amount of redundant network equipment between these points, however that equipment has no bearing on the operation of the network and thus it can be elided from the network topology. The method is similar to, and/or an extension of, the "path trained grouping", "path trained ordering edge case" and "path trained ordering singleton case" methods and systems described above; a general purpose is to identify switches which are at the edge of an island and where that switch partitions the gap. The method uses the path crossing test A*/PP as a component step.

Recall that a gap is represented by some island edges where the number of islands is more than two. The method is applied a number of times to each gap, where the number of applications is the same as the number of islands in the gap, once for each member of the gap. Each application of the method proceeds in a number of steps. The chosen member of the gap is denoted P. Recall from the "Island edge detection" method that every island edge is at a switch with a switch leader computer which is inside the island. The method extends the "path trained grouping" for other islands by grouping the islands into classes and sub-classes depending on whether packets between the islands cross, touch, or do not cross the switch closest to P. This is done by in each step, evaluating A*/PP for each A in turn (in the general method described in the path trained grouping method above). If the result of the test AB/PP is zero, then the islands A and B are in the same subclass. If the result is h (hub), then they are in the same class. If the result is x (switch), then they are in different classes. If an application of the method results in more than one class then the gap has been split and more information about the topology of the network has been determined.

Figure 19:
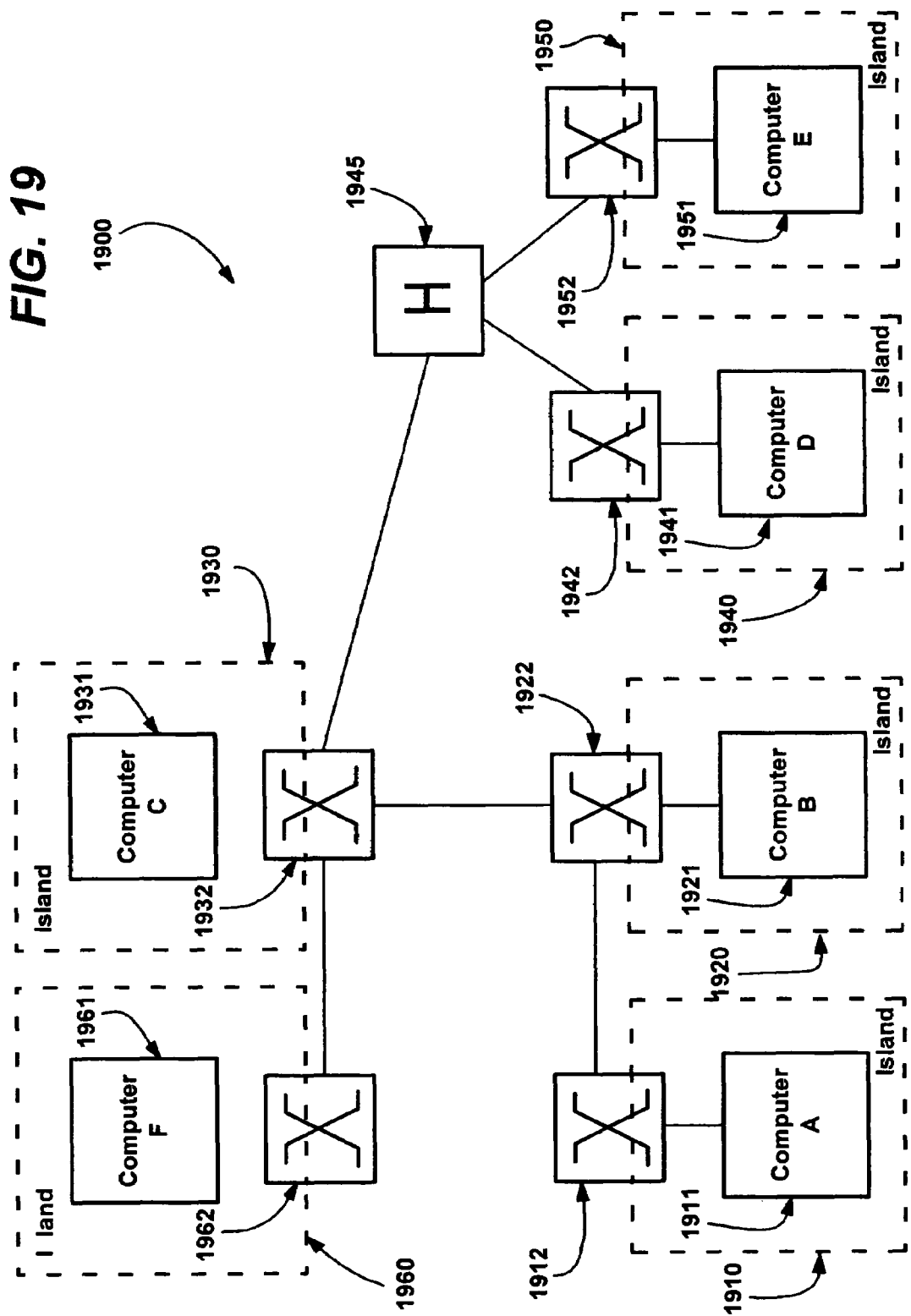
FIG. 19 is a block diagram showing a network of several switches, hubs, computers and islands illustrating an example of gap splitting in accordance with an aspect of the present invention.

Consider by way of example and not of limitation, the network 1900 shown in FIG. 19. The network shows a gap between six islands, each of which is represented by a single computer. The previously described island edge detection method has detected that there is a switch on the edge of each island; these switches are denoted 1912, 1922, 1932, 1942, 1952 and 1962 respectively. In step one of the method, the island 1910 is considered first (with computer 1911 being the node P). When the extended path trained grouping method is applied it is discovered that the other islands are in the same class; it can be deduced that there is a single link from switch 1912 into the unknown component of the gap. When the path trained grouping method is applied to the island 1920, the other islands will be divided into two classes; one class contains island 1910 and the other contains all the other islands; it can be deduced that switch 1922 has two links into the gap, one of which connects to the island 1910 and the other of which connects to the rest of the gap. In effect, the second step has split the gap into a trivial gap connecting islands 1910 and 1920, and a gap with the other islands in.

In the third step, the island 1930 is considered. The method will result in three classes; one class contains island 1920, one contains 1960, and one contains both 1940 and 1950. In fact, since DE/CC=h it can be determined that there are two subclasses comprising island 1940 and island 1950 respectively which are attached to a hub that is also attached to switch 1932. At this point, the gap has been entirely split into individual components that are known, and the topology of network 1900 has been fully determined.

It should be understood that there are many possible variant implementations of this method and system including the order in which islands are selected to see if they can split the gap, the testing for islands being in one class or subclass with one another, the ordering in which the tests in the extended path trained group ordering method are applied, and many optimizations and variations similar to those described for the various path training methods described above.

Extended Reach Gap Splitting

In accordance with one aspect of the present invention, the method and system referred to herein as "extended reach gap splitting" may be used to discover the topology of a gap (or deep portion of a network between islands) where the gap, under analysis with the gap splitting method, is known to contain several subclasses of a class of islands starting at a switch on the edge of the unknown portion of the gap. The extended reach gap splitting method can be applied as a result of the gap splitting method, or recursively as a result of an earlier application of the extended reach gap splitting method. The method is based on the ability to use a packet traveling on a path from an island outside the gap to an island in one of the subclasses as a means of locally training the switch connecting another of the subclasses to the class; then application of the path trained grouping method can potentially further refine the gap into classes and subclasses.

The method is applied a number of times, once to each subclass of a class that is present in a gap. The application of the method involves the step of applying an instance of the method and system of the gap splitting method, except that instead of the local island of the machine which is chosen as P being used to train the switch at the edge of the gap in order to split the network into classes and subclasses, depending on whether packets between the islands cross, touch, or not cross the switch closest to P, a modified technique is used. More particularly, a path from P to some computer within one subclass within a class with respect to a switch is instead used to train (and thereby split) another switch which is the switch separating the subclass from the class that was previously determined. This will split the original subclass into classes and subclasses with respect to the latter switch. The method can continue to be applied so long as a class containing multiple subclasses is present.

Figure 21:
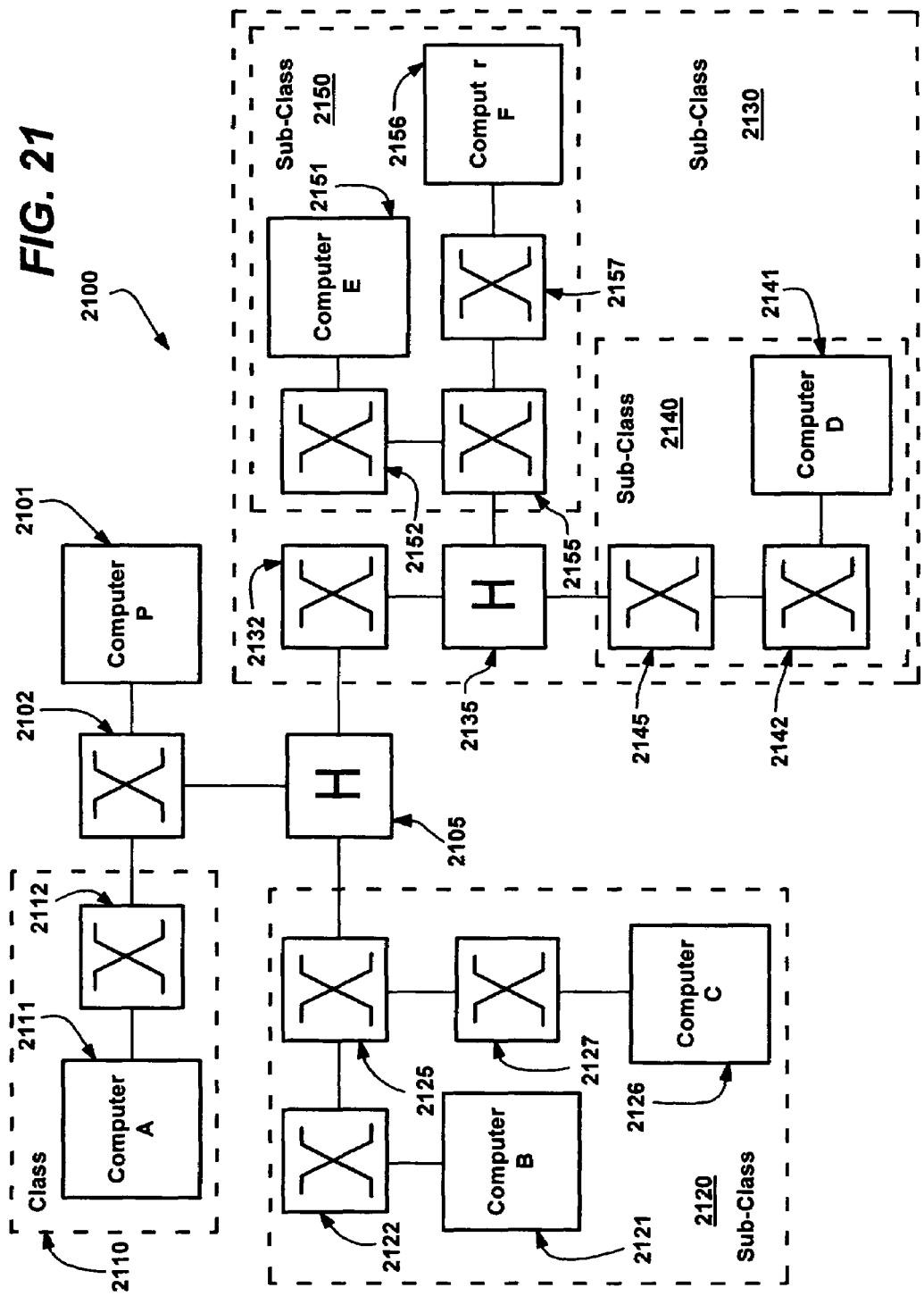
FIG. 21 is a block diagram showing a network of several switches, hubs, and computers illustrating an example of extended reach gap splitting in accordance with an aspect of the present invention.

Consider by way of example and not of limitation the network 2100 shown in FIG. 21. In order to make the diagram as simple as possible, consistent with the description of the extended reach gap slitting method and system, each island is shown formed from a single computer system. When the gap slitting method and system described above is applied to this network, by using the computer P (2101) to split the gap at the switch 2102, the single large gap will be split into the class 2110 and the class comprising subclass 2120, subclass 2130, and hub 2105. The gap between switch 2102 and 2112 is then trivial and so the topology of class 2110 is known.

The extended reach gap slitting method and system can then be applied to the gap comprising subclass 2120 by attempting to split the gap at switch 2125. This is done using the gap slitting method and system described above except that in the step in which computer P should train its local switch, computer P instead sends a packet to any computer in subclass 2130 (such as computer D, 2141). Since that packet travels through the segment of hub 2105 on its way along the path 2101, 2102, 2105, 2132, 2135, 2145, 2142, and 2141 it will train the switch 2125 and can thereby permit the gap slitting method and system to determine that switch 2125 does indeed split the gap comprising subclass 2120. Both the resulting gaps (comprising switches 2122 and 2125, and 2127 and 2125) are trivial and so the topology of subclass 2120 is known.

Similarly the gap of subclass 2130 can be split at switch 2132 by using a packet traveling from computer P to any computer (such as B) in the subclass 2120; the packet will travel along the path 2101, 2102, 2105, 2125, 2122, 2121 and hence train switch 2132. The gap splitting method hence determines that subclass 2132 is itself comprised of a single class split at switch 2132 comprising two subclasses, namely subclass 2140 and subclass 2150.

As mentioned above, since a class of several subclasses exists, the method and system of extended reach gap slitting can continue to be applied to split the gaps. A packet from computer P to computer E (2151) will travel on the segment of hub 2135 and so can be used to train switch 2145 and hence determine the topology of subclass 2140. A packet from computer P to computer D (2141) will travel on the segment of hub 2135 and so can be used to train switch 2155 and hence determine the topology of subclass 2150. The result is that the method and system of extended reach gap slitting can be used to completely determine the topology of network 2100 shown in FIG. 21.

It should be understood that there are many possible variant implementations of this method and system, including varying the selection of the computer within one subclass used to train the switch at the edge of another subclass, varying the selection of one subclass used to select a computer to train another subclass, varying the selection of the order in which subclasses are split, varying the direction of the packet which trains the switch at the edge of a subclass, where sufficient subclasses or classes exist selecting a computer in some other subclass or class instead of the computer P such that the path to this other selected computer also trains the switch at the edge of the subclass of interest without passing through it, and so forth.

Inductive Determination of Network Topology Including Intermediate Segments

In accordance with one aspect of the present invention, a method and system referred to herein as "Inductive determination of network topology including intermediate segments" may be used to discover the topology of a gap (or deep portion of a network between islands) containing at least three islands. The present aspect may be applied to gaps in general, but is especially useful in application to gaps which cannot be further split with the gap splitting methods described above.

The method is similar to the "Inductive determination of network topology" method and system described above, using an extension of the "path trained grouping" and "path trained ordering" methods and systems described above in the general case (not specifically limited to "extended path trained ordering singleton case" or "extended path trained ordering edge case"); the purpose is to identify switches and hubs in the middle of a gap. The method uses the path crossing test AB/PQ as a component step.

The steps of the methods are generally the same, except that in each case where the one of the path trained methods and systems applies a series of three steps in which four computers send two training packets followed by a probe packet, then the method and system of path crossing test is used instead. In the subsequent processing steps, the classification and ordering is extended to deal with multiple subclasses attached to a hub which form a class (due to a hub forming a deep intermediate segment in the network).

By repeated application of this inductive method the complete knowledge of the network topology will eventually be obtained. Note that there are certain gaps whose deep structures are indistinguishable because their observable behaviors are identical under all packet sequences; for each such gap the method and system described produces the smallest network consistent with the observable behavior of the gap.

It should be understood that for this method and system there are many possible variant implementations including the application of the various described optimizations of the path crossing method and system, the order in which subclasses of the network are inductively determined, and so forth.

Remote Transmission Elicitation

In accordance with one aspect of the present invention, the method and system known as "Remote transmission elicitation" and described herein may be used to cause a computer on a local network to send a packet to an address of choice. The method is based on a standard protocol called the Address Resolution Protocol (ARP), described by the Internet standards, and which is implemented by all computers with the Internet protocol in use on an Ethernet network. The purpose of the ARP protocol is to permit a computer which wishes to send an Internet Protocol (IP) packet to some IP address, to ask the owner of that IP address to inform the first computer of the Ethernet address to which it should directly send the IP packet. The request is in the form of a broadcast which includes the IP and Ethernet addresses of the requesting computer, and the IP address of the destination computer. The response is in the form of a directed Ethernet packet to the Ethernet address specified in the request. It is a property of the ARP protocol specification that the response packet is sent to the Ethernet address specified in the ARP protocol portion of the request packet (and not to the Ethernet source address field in the Ethernet header of the request packet). The present invention makes use of this aspect for the purpose of topology discovery by the following method.

The method applies to computers whose IP address is known and which do not necessarily have any software components capable of engaging in topology software. The method is, in the first step, to send an ARP request packet to the computer, specifying in the ARP data that the Ethernet address of the requestor is some other Ethernet address, specifically the one which that is wished to elicit the target computer to send a packet to. In the second step, the target computer will send an ARP response packet to the indicated address. This method therefore enables a computer whose IP address is known but which does not have any topology discovery software to be included in other methods and systems of the topology discovery, provided that it can play the role of a computer which needs to send a packet from its own address and to an address of choice, and does not need to report on packets that it has received. By way of example and not of limitation, the present method can permit a computer whose IP address is known to act as computer B in the "path crossing test" method described above. The present method can also be used to enable a computer whose IP address is known to send a probe packet to the address used in the three sweep detection method or the negative path expression method (and so forth); this locates the computer to the closest switch even though it is unable to train any switch itself.

In accordance with one aspect of the present invention, the remote transmission elicitation method may be used in a way that does not disrupt the normal usage of the network during an instance of topology discovery. The ARP protocol permits the recipient of an ARP request to update its table of information associating IP addresses and Ethernet addresses with the information of the (purported) sender of the ARP request. Therefore the ARP request that is sent must be designed so as to not put misleading information into this association. In the current implementation of the method this is done by setting the IP information field in the ARP request to an invalid IP address, either the all zero address, or the subnet all zero address, or the subnet all ones address, or some other invalid address. This avoids any possible confusion at the computer which is the recipient of the ARP request.

Wireless Computer Detection

In accordance with an aspect of the present invention, a method and system referred to herein as "Wireless computer detection" may be used to detect the presence and location of wireless computers within a computer network. As mentioned above, wireless hosts are usually unable to take part in segment detection methods because promiscuous mode operates differently in their case for several reasons. First, the access point will only send packets to addresses that are associated to it. Second, the nature of the wireless medium is that packets can be lost; for a directed packet the access point will try again unless it received a data-link level acknowledgement for the packet, but a non-intended recipient cannot acknowledge a packet and so the access point will not know to retry the transmission. Third, most vendors' products unfortunately contain a very large number of bugs and fail to operate correctly if they are asked to enter the promiscuous mode. For these reasons the present invention provides an additional method and system for finding wireless computers which does not rely on the promiscuous mode.

The method proceeds in three steps. In the first step each computer checks to see if its network interface is a wireless interface. If it is wireless, the computer then queries from the interface the infrastructure mode and the Basic Service Set identifier (BSSID) which is in use. In the second step, each wireless computer reports its infrastructure mode and BSSID. In the third step the information from each wireless computer is analyzed to discover information about the network topology. The BSSID indicates the set of computers which are communicating packets to each other directly using the wireless link; computers with the same BSSID are directly connected over the wireless medium. The infrastructure mode information indicates whether the computers are associated to an access point, or whether they are communicating over an ad-hoc network with no access point; this information can therefore be used by the current method to determine whether an access point exists in the network. Also, if the computers are operating in infrastructure mode then the BSSID will be the Ethernet address of the access point. Therefore, the current method can group the wireless computers by BSSID, and can determine which of the groups also have an access point present. In addition, if an access point is present then its address is known and can be used subsequently to help place the access point in the rest of the computer network; this can be done for example by using the access point's address as the address Q in the "path crossing test" method and system described above.

In accordance with one aspect of the present invention, the present method can also be used to enable a wireless computer to send a probe packet to the address used in the three sweep detection method, or the negative path expression method (and so forth); this locates the access point of the wireless computer to the closest switch even though it is unable to train any switch itself.

Wireless Half-bridge Detection

In accordance with an aspect of the present invention, a method and system referred to herein as "wireless half-bridge detection" may be used to detect the presence and location of wireless half-bridge devices within a computer network. A wireless half-bridge is a device which permits computers on a wired component of a computer network to be connected to a wireless component of a computer network; it may be thought of as generally having the opposite purpose of an access point device (which is normally used to connect wireless computers to a wired network). The wireless half-bridge acts on the wireless network as if it was a single wireless device and uses a single Ethernet address. In a way similar to an Ethernet switch, the half-bridge can learn from the source addresses in the packets which machines are attached to its wired side. Since the half-bridge can only identify itself as a single device on the wireless network, it modifies packets that pass through it, so that any computer on its wireless side that wishes to talk to a computer on the wired side must (and will) use the address of the half-bridge. It does this by modifying Ethernet, ARP and DHCP packets that pass through it. Ethernet packets which are sent from the wired side to the wireless side must have their Ethernet source address changed to that in use by the half-bridge. ARP packets must be changed so that computers on the wireless side believe that they should use the half-bridge's Ethernet address, and DHCP packets must be handled by techniques similar to the normal methods of DHCP forwarding.

In accordance with an aspect of the present invention, wireless half-bridges may be detected by a method of three steps. In the first step, each computer sends a packet to the broadcast address in which it places its own address within the packet as well as in the source address of the packet header. In the second step, each computer seeing one of the packets sent in step one records the packet. In the third step, the packets recorded in step two are processed to detect the packets in which the source address has changed from the real source address and those packets in which the source address has not. This processing yields several pieces of information. First, it yields whether there are any such half-bridge devices present (because at least one change of address will be detected). Second, it yields the Ethernet addresses of those half-bridge devices, since that will be the address to which the source address changed. Third, it yields the addresses of the machines which are on the wired component of the network attached to the half-bridge device (since they will be the set of machines whose addresses changed) and those which are not (their addresses will not have changed). Fourth, it yields the topology of the half-bridge devices if there are several of them in a sequence through the network.

Figure 17:
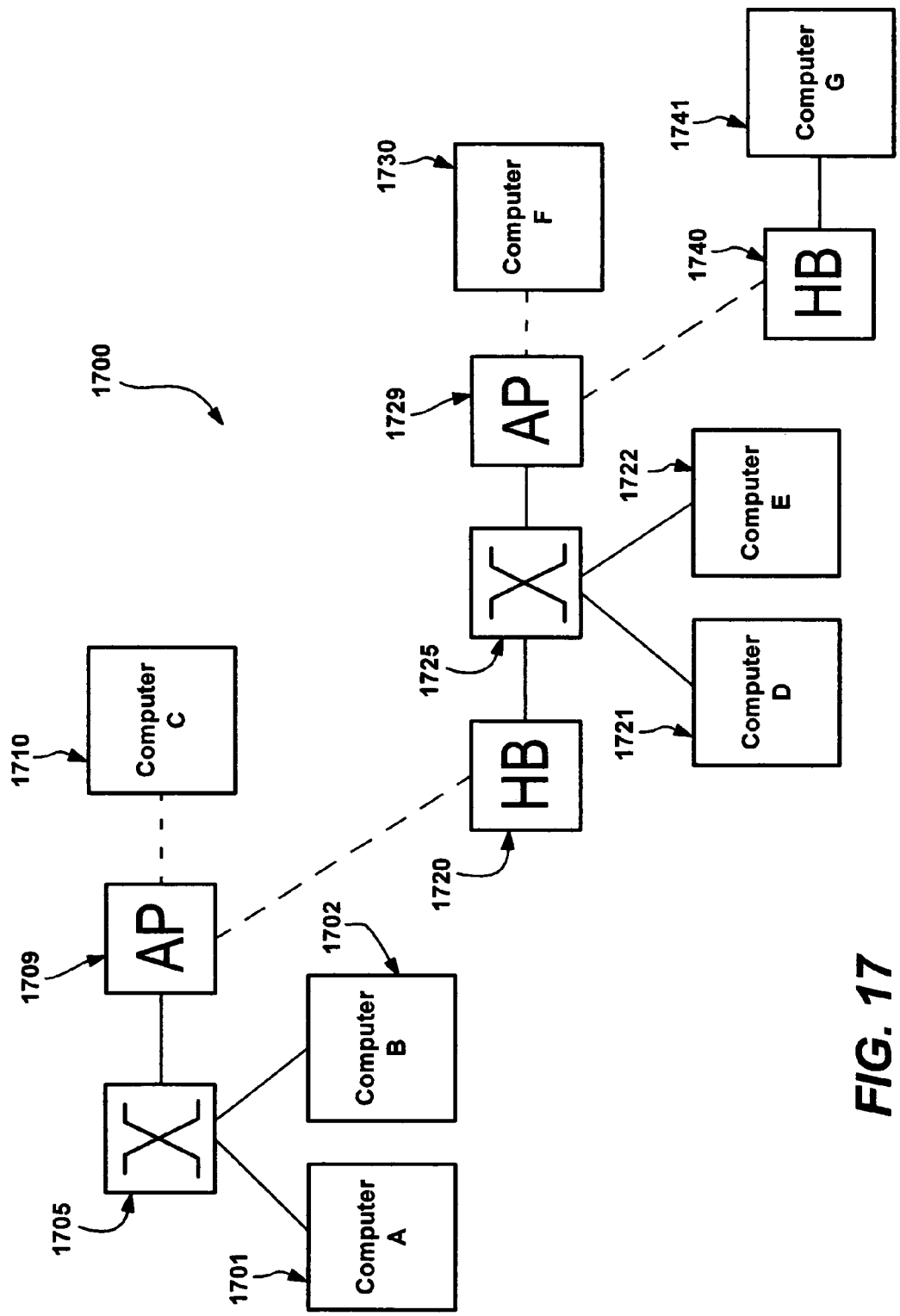
FIG. 17 is a block diagram showing a network of several switches, access points, wireless half-bridges and computers, illustrating an example of wireless half-bridge detection in accordance with an aspect of the present invention.

Consider by way of example and not of limitation, the network 1700 depicted in FIG. 17. This diagram shows a network comprised of several switches and computers, and two access points (1709 and 1729) and two wireless half-bridge devices (1720 and 1740). In the first step each computer will send a packet to the broadcast address. The packets sent by computers A, B and C (1701, 1702 and 1710) will be received by all computers with the original source address (of 1701, 1702 and 1710 respectively). The packets sent by computers 1721, 1722 and 1730 will be received by computers 1701, 1702 and 1710 with the source address of half-bridge 1720 because the half-bridge will rewrite the source address as the broadcast packet travels through it to access point 1709; computers 1721, 1722, 1730 and 1741 will receive the packets sent by computers 1721, 1722 and 1730 with their original source addresses. For the computer 1741, the packet that it sends will be received by computers 1721, 1722 and 1730 with the source address of half-bridge 1740, and will be received by computers 1701, 1702 and 1710 with the source address of half-bridge 1720. This information can be processed by the method and system to deduce the location (with respect to which machines are on which side) of the wireless half-bridge devices.

Note that the current method has a number of imperfections. First, it is not directly possible to determine which access point a half-bridge is associated with. Referring once again to network 1700 for an example, although it is possible to distinguish that half-bridge 1740 is not associated with access point 1709, it is possible that there would be another access point attached to switch 1725 and distinct from 1729, with the computer 1730 attached to one, and the half-bridge 1740 attached to the other.

Another possible problem comes from a recent technique employed by some wireless half-bridges sometimes called "address cloning". In this technique the wireless half-bridge does not associate to the access point until it has seen a packet on its wired side. It then presumes to take the source address in that packet for itself, and associates to the access point using that address. The advantage to the half-bridge product is that the half-bridge and access point combination should then work for an Ethernet protocol other than IP/ARP in which the original address may be contained in the packet in some way. The disadvantage is that the system essentially supports only a single computer on the wired side of the half-bridge, since it must clone a single address. The above mentioned system will not detect half-bridges operating in this mode, since the source address will not change. Referring once again to network 1700 for an example, if half-bridge 1740 is in cloning mode then the broadcast packet from computer 1741 will still have the source address of computer 1741 when it arrives at computers 1721, 1722 and 1730 because the half-bridge 1740 will have cloned the address of computer 1741 when associating to access point 1729.

In accordance with another aspect of the present invention, wireless half-bridges operating in clone mode may be detected by a different method of five steps. In the first step, the computers on the network (which are able to do so) put their Ethernet interfaces into the promiscuous mode. In the second step, the computers chose some address X which is not in use by any computer in the network and which has never been trained by any topology discovery method. In the third step, each computer sends a packet from its own address to the address X. In the fourth step, each computer records the packets that it is able to observe which were sent in step three. In the fifth step, the information about which computers received which packets is analyzed (together with the information about whether the computer's network interface is a wired or wireless interface) to determine information about the network. Ethernet switches within the network will flood packets to an unknown destination address; access points will not do so since they will only send packets to Ethernet addresses that are associated with them. Therefore packets sent to an unknown destination will not travel from an access point to a device (or through a half-bridge to a network) associated with it, whereas packets sent to an unknown destination will travel from a wireless device (or a half-bridge) to (and through) an access point. This asymmetry will be visible to the analysis of the fifth step which will permit identification of the half-bridges in the network.

Consider by way of example and not of limitation, the network 1700 depicted in FIG. 17 with the half-bridge device 1740 acting in cloning mode. The packet sent in step three by computer 1741 will be received by computers 1701, 1702, 1721 and 1722. The packet sent in step three by computer 1721 will not be received by computer 1741 (it will only be received by computers 1701, 1702 and 1722). The packet sent by computer 1701 will only be received by computer 1702. The packet sent by computer 1730 will be received by computers 1701, 1702, 1721 and 1722. In step five, since the packet sent by computer 1721 is not received by computer 1741 it can be deduced that computer 1741 is attached to computer 1721 through an access point; since the interface of computer 1741 is a wired interface it can be deduced that there must be a half-bridge between the computer 1741 and the access point. Further, because the source address of the packet sent by computer 1741 is not changed when the packet arrived at computer 1721, it can be deduced that the half-bridge to which computer 1741 is attached is operating in address cloning mode.

In one implementation of the current invention, the two methods above are combined in order to maximize the potential to determine the presence and configuration of any wireless half-bridge devices that may be present in the computer network.

According to one aspect of the current invention, the detection of wireless half-bridges operating in cloned mode may be performed using an optimized method and system of steps, provided the method and system of wireless half-bridge detection is completed first. In the optimized method and system, the detection of wireless half-bridges operating in cloned mode is carried out independently in each region detected using the wireless half-bridge detection method and system. The method and system applies to each such region a series of steps as described above, except that only two computers need to send a packet to the address X, and not every computer.

The reason that this works is that there can only be one computer behind any wireless-half bridge operating in cloned mode which was not already detected using the wireless half-bridge detection method and system. The lack of reception at such a computer of a single packet sent by some other computer to the address X is sufficient to determine that that computer is behind such a device. The reason that a second computer is chosen to send a packet to the address X is that the sending computer cannot check the possibility that it itself is behind such a device, and so one other computer needs to check that remaining case.

Referring once again to the network 1700 for an example, if the half-bridge 1740 is operating in cloned mode, then it will not be detected by the initial method and system of half-bridge detection. However, when the present more-optimized method and system of cloned mode wireless half-bridge detection is used, it will proceed in several steps. In a first step, the region comprised of devices identified by a number larger than that of 1720 is selected. Two computers in this region are chosen; assume for this example that they are the computer 1741 and the computer 1722. The computer 1741 sends a packet to the address X; it will be received by the computers 1721 and 1722 therefore they are not attached to a cloned-mode wireless half-bridge. If the computer 1722 sends a packet to the address X, it will not be received by the computer 1741; therefore the computer 1741 is attached to a cloned-mode wireless half-bridge. It can be understood that the optimized method and system requires the sending of fewer packets on the network.

According to one aspect of the present invention, a further optimization is possible because the packets sent in one region may also be sufficient to detect any cloned-mode wireless half-bridges in another region. Observe that regions are separated by a pair comprised of an access point and a wireless half-bridge, and that packets sent to unknown addresses may pass from the latter device to the former and not vice-versa. Therefore in a series of interconnected regions, an instance of the current method and system operating on a region in which the wireless half-bridge device is present is sufficient to permit the eliding of the transmissions to address X in any instance of the method in a region attached to the access point device. Referring once again to the network 1700 for example, the operation of the method and system in the region of the device 1720 is sufficient to elide the transmission to address X in the operation of the method and system in the region of the device 1709.

Method Order and Organization

Figure 10A:
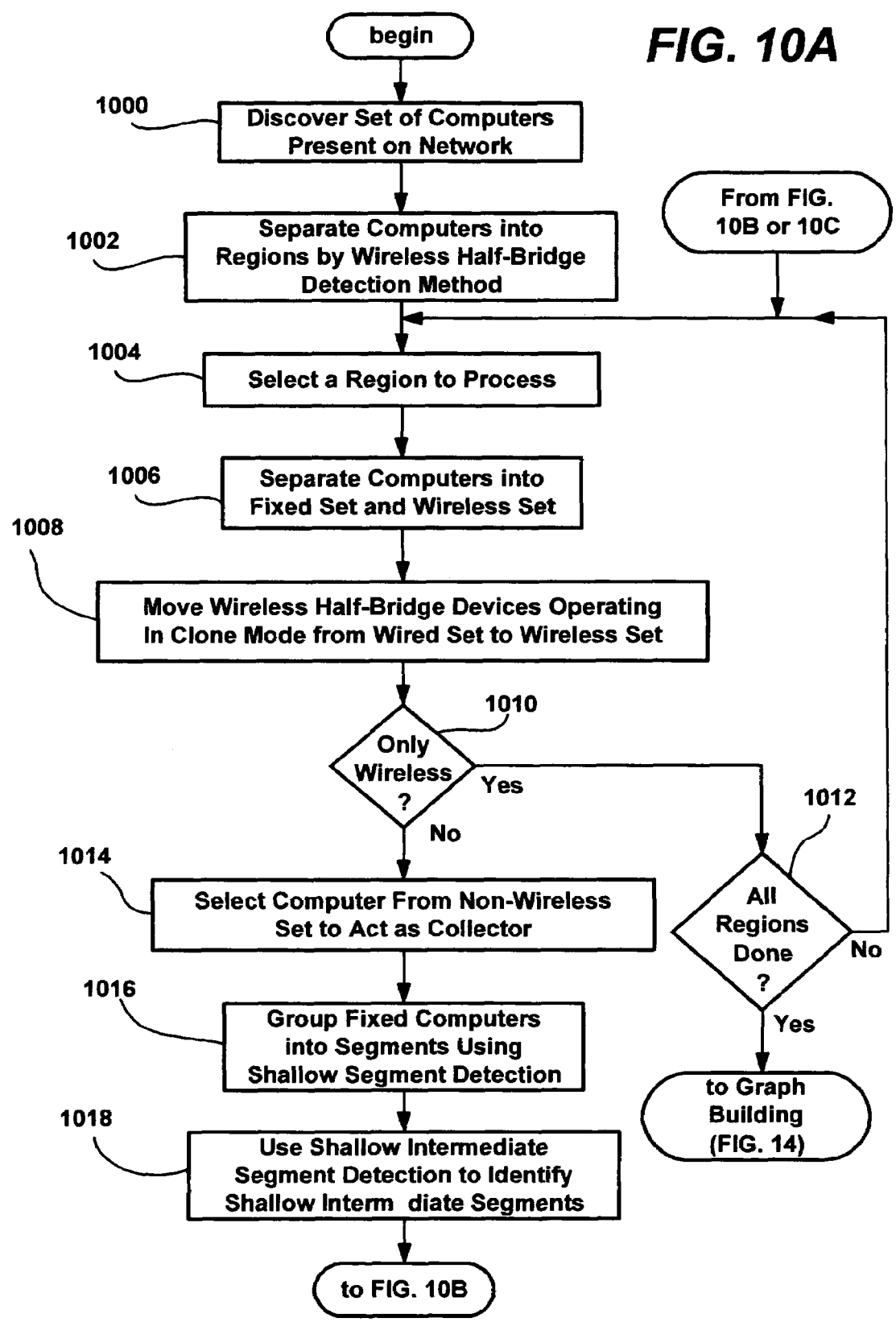
Figure 10B:
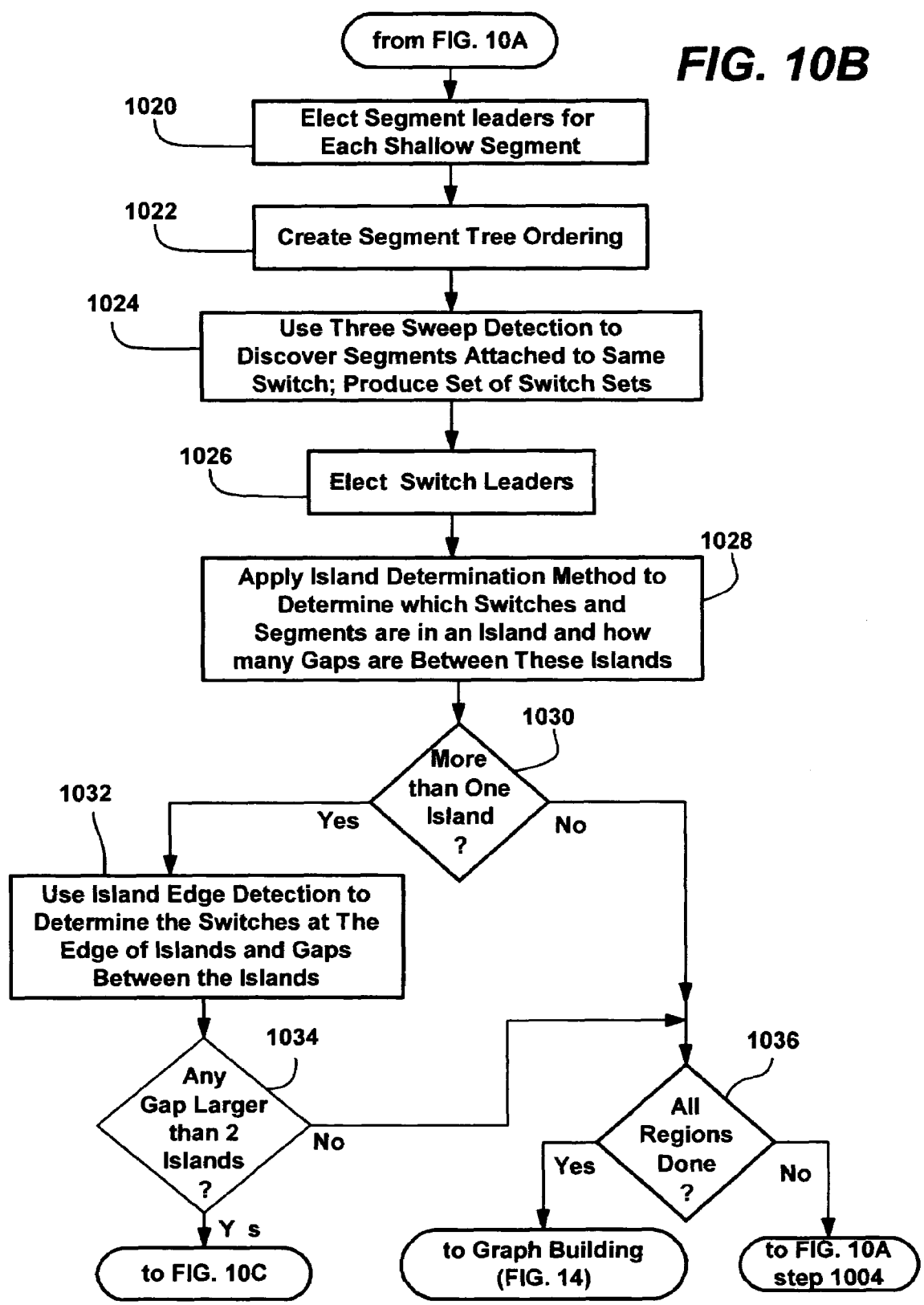

For the sake of completeness, an order and occasions in which the various, previously described systems and methods are invoked are summarized with reference to FIGS. 10A-10C. First, as represented by step 1000 of FIG. 10A, the set of the computers present on the network is discovered, as generally described herein. At step 1002 these computers are separated into regions of the network interconnected with wireless half-bridge devices using the wireless half-bridge detection method. The steps subsequent to step 1002 are applied to each region in turn by selecting a region to process at step 1004 and then returning (via steps 1012 of FIG. 10A, 1036 of FIG. 10B, and 1056 of FIG. 10C) when that region is finished to select another region until none remain to process.

At step 1006, the computers of a region are grouped into two separate sets: one for wireless computers, one for fixed (non-wireless) computers. In step 1008, computers which appear to be wired but are in fact attached to wireless half-bridge devices operating in clone mode are removed from the wired set and placed in the wireless set. If there are only wireless computers at step 1010, the process is finished with this region of the network, and if all regions are finished (step 1012), the process proceeds directly to the graph building system and method (described below with reference to FIG. 14), otherwise the process proceeds to step 1014, which represents selecting a computer from the non-wireless set to act as a collector.

As represented by step 1016, the system and method of shallow segment detection is used to group the set of fixed computers into a set of segments. Then, at step 1018, the method and system of shallow intermediate segment detection is used to identify shallow intermediate segments. As represented in FIG. 10B, segment leaders are elected for each shallow segment (step 1020), and the method and system for creating a segment tree ordering is applied (step 1022) to create an ordered tree for the processing of segments in subsequent methods. Subsequently, the method of three sweep detection is used to discover which segments are attached to the same switch, producing a set of switch sets (step 1024). Then, at step 1026, switch leaders are elected for the switches found in step 1024. In step 1028 the island determination method is applied to determine which switches and segments are found together in an island and how many gaps there are between these islands.

If there is more than one island (step 1030), the island edge detection method and system is used at step 1032 to determine the switches that are at the edge of the islands, and the gaps between the islands. If at step 1034 there are no gaps larger than two islands, the process continues to step 1036 to determine if there are any other regions to process. If at step 1034 any gap is larger than two islands, then the process continues to step 1040 of FIG. 10C.

Via steps 1040, 1042 and 1044 of FIG. 10C, the gap splitting method and system is applied to each such gap (of the set of gaps larger than two islands) to try and break the gap up into smaller gaps (step 1042). If any gap is still larger than two islands (step 1046), then the extended gap splitting method and system is applied to each such gap (steps 1048, 1050 and 1052). Then, the inductive determination of network topology system and method is used at step 1054 to discover the interconnections between these islands. The process returns to select another region via step 1056 until each region has been completed, whereby the process then proceeds to the graph building system and method, which is used to piece together the various results to produce a tree representing the final network topology discovered, as described below with reference to FIG. 14.

Note that because none of these methods and systems make assumptions about the initial state of the network, they can be used "live" on a production network alongside normal network traffic, without disturbing the existing traffic or producing incorrect results (so long as the normal traffic does not use MAC addresses in the range reserved for the purposes of these methods and systems).

In the various methods and systems described above, reference to various steps in these methods have been made, in which many computers in different places in the networks execute different steps in a well defined and controlled order. An aspect of the present invention is directed towards the methods and systems of the present invention which permit the operation of this defined and controlled order.

There are many different ways in which a coordination system may be structured and composed. As such, it should be understood that the descriptions herein of a particularly useful method and system for the coordination of the above methods and systems is only an example, and does not in any way reduce usefulness of the above methods and systems, or to limit the present invention to the coordination method described herein.

One generally idealized system acts as a centralized distributed system, in which the various distributed components of the apparatus are controlled by a centralized point in order to achieve the topology discovery. As generally described above, the system will get the most accurate answer if it has an active component on as many of the segments in the network as possible in order to execute the steps of the various methods. Therefore, in accordance with one aspect of the present invention, the system may be partitioned into a master component, which maintains centralized control of a particular instance of determining the network topology, and makes the decisions about which methods, systems and steps should be carried out, and slave components, which are located on as many computers as possible in the network and which comprise the smallest possible apparatus consistent with their purpose of engaging in the methods, systems and steps as instructed by the master component.

It should be understood that there are several advantages of this, including that the smaller and simpler the slave component can be, the fewer resources the slave component will take up on the several computers in the network. Further, the smaller and simpler the slave component, the more likely it is to be able to be added to simple computing devices such as network attached printers, network firewall devices, wireless access points, network attached gaming devices (e.g., Microsoft Corporation's Xbox™) and the like. Moreover, smaller and simpler slave components make it easier to provide implementations of the slave component for many different operating systems or computer platforms, or as enhancements for old versions of computer software or hardware systems which can be added to those systems without them being upgraded. As yet another advantage, the smaller and simpler the slave component, the more easily it can be evaluated for correctness and security, hence reducing the risks for users or administrators in the deployment of the slave component across a network. Also, if the slave component makes no decisions about the methods, systems and steps to be carried out, but instead obeys the instructions of the master, then problems or bugs in the software, or future enhancements can be carried out by the updating of the master software and the slave software need not be modified.

When a master chooses to discover the topology of a network, the master first finds the computers on the network which are running the topology slave software, in order to control these computers and execute the various methods and systems. The master therefore sends out a packet, such as a broadcast packet that will be delivered to the other computers on the network, to permit those computers to know the master's existence and to respond. In doing this, the master needs to take care not to trigger responses from a very large number of computers. For example, if very many computers responded at the same time, the sending computer could easily be overwhelmed or the network load could be adversely impacted. This problem is called acknowledgment implosion, and one example in the previous literature is in the handling of Internet Group Management Protocol (IGMP) responses. There are many different examples of this type of implosion protection in many different protocols.

In this particular application there are a large number of constraints. First, it is necessary for the master to find out the existence of the slaves in the network, and for each slave to know that it has been found (even in the presence of occasional packet loss). Second, this finding operation should take as little time as possible. In addition, because of the exclusive nature of the use of various addresses and techniques, it follows that there should be only one instance of mapping the network at a given time, and that a slave should be under the control of only a single master, therefore an exclusion system needs to be provided. Another requirement comes from the use, by several of the methods and systems, of fresh addresses which have not previously been used in the network. No one master can be guaranteed to remember the entire state of the network (since a network device may be switched off or the like), therefore the network's memory of which addresses have been used (e.g., stored in the form of a generation number) is maintained in a distributed fashion by the slaves, and this information is to be shared and agreed during the finding of the slaves by the master. One further requirement comes from security considerations, in that although a malevolent node on the network can inflict much damage on the network and preventing it doing so is beyond the scope of the current invention, the deployment of the current invention should not make the situation any worse (such as by providing a means for a malevolent node to magnify the network load). Finally, the methods and systems for discovery of the network topology rely on the fact that the network knows how to deliver directed packets to nodes, and thus it is desirable to train the switches in the network as to the location of the real basic address of each of the computers hosting slave nodes in the network.

Figure 11:
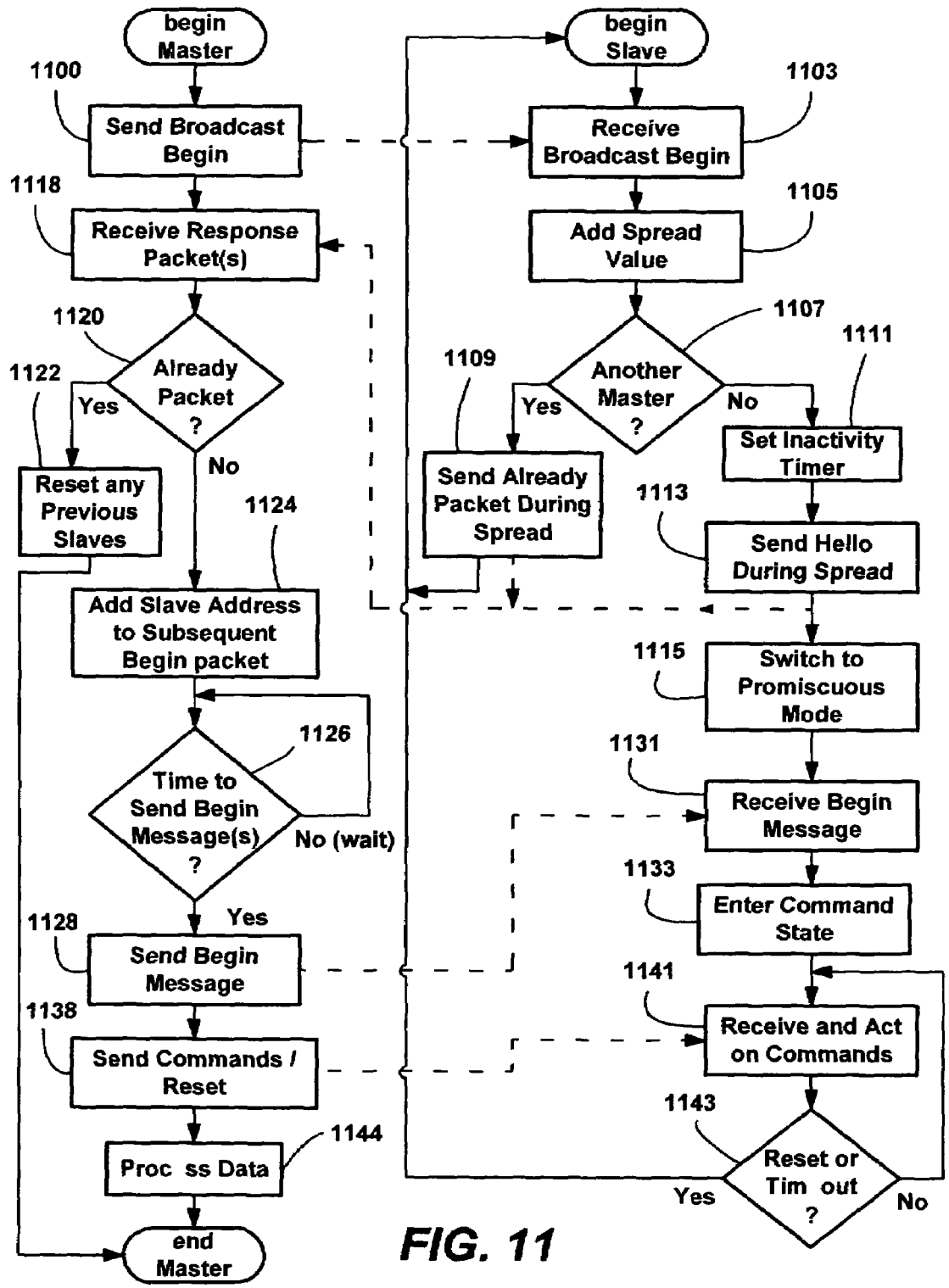
FIG. 11 is a flow diagram generally representing the logic at a master computer and the logic at a representative slave computer in the network to communicate to map the network topology in accordance with various aspects of the present invention.
Figure 22:
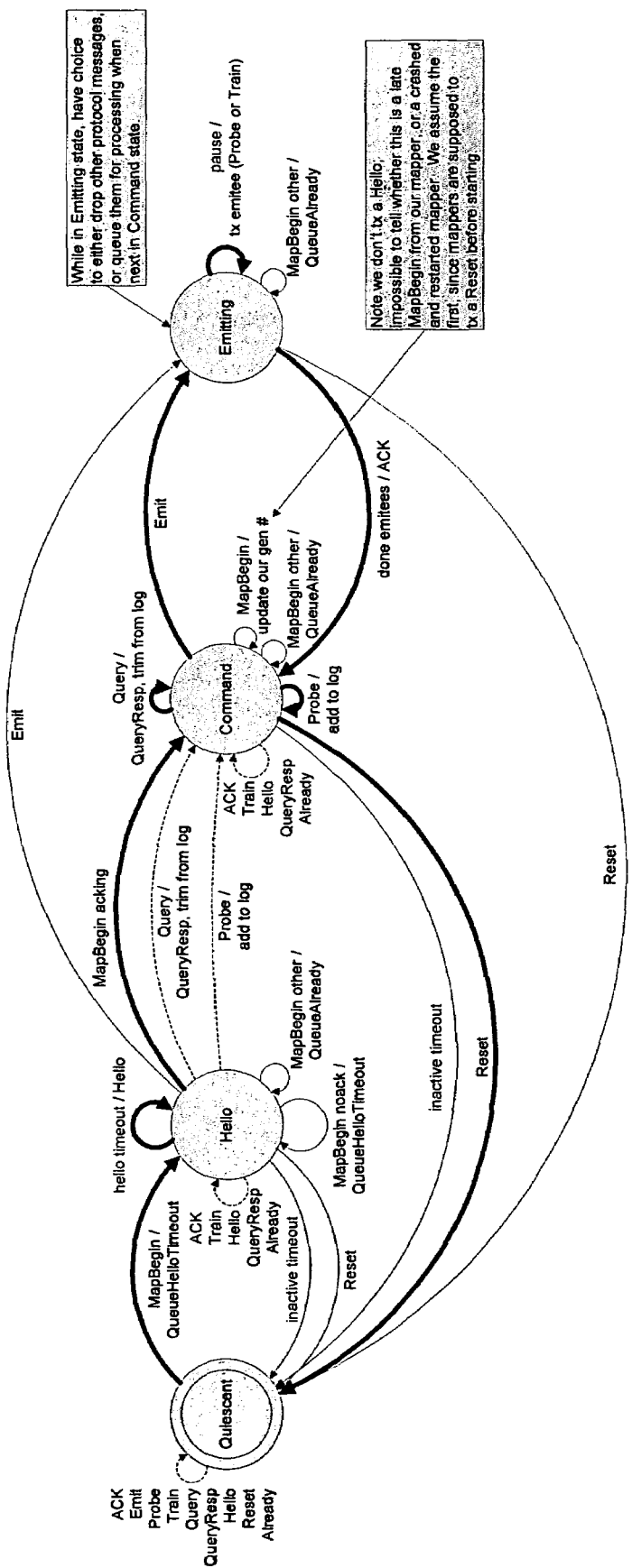
FIG. 22 is a state diagram illustrating states of components within the computer systems of a network configured to determine network topology in accordance with various aspects of the present invention.

In accordance with one aspect of the present invention, the method and system for achieving these above requirements proceeds in a number of steps, generally represented in the flow diagram of FIG. 11 which represents the logic at a master and one of the slaves. FIG. 22 comprises a state diagram also illustrating the logic.

At a first general step labeled 1100, the master sends out a broadcast packet known as a Begin, which in one implementation contains a value representing the probability that a slave should respond, a value representing the time interval (called the spread) over which the slave's response should be sent for any slave which does respond, and a generation number (the handling of generation numbers is explained below).

In a second step, a slave receiving such a Begin (step 1103) adds a minimum spread value at step 1105, such as 100 ms; this prevents a malevolent machine from sending Begin messages which might cause many machines to respond rapidly in a short time and overload the network. Next, at step 1107, a slave machine checks to see whether it is already involved with a different master. If it is, then with the specified probability the slave schedules an "Already" packet to be sent back to the master (step 1109) that sent the Begin message, which is sent at some random time during the spread interval. If it is not currently associated with any master at step 1107, then the slave considers itself to be associated with the master that sent the Begin message, in which event at step 1111 the slave sets an inactivity timer to reset itself if the master should cease unexpectedly, and with the specified probability it responds with a Hello message at some time within the spread interval, as represented by step 1113. The response message is sent to the broadcast address to ensure that the switches in the network know where this slave computer is, and the packet contents include the address of the master being acknowledged, a generation number, and additional information about the slave which can be used to annotate the network topology. The slave also switches to promiscuous mode on the network interface at step 1115 (unless it is a wireless interface as described above).

As represented by step 1118, the master receives either Already packets or Hello packets in response. If the master receives an Already packet, as represented by the test at step 1120, then in turn the master resets any slave which had previously accepted it as master, as represented by step 1122, and the process essentially ends for now. If the master receives Hello packets, then the master notes the addresses of the slaves and will acknowledge those slaves by putting their addresses in a subsequent Begin packet at step 1124. At the end of the initial spread period (plus 100 ms, step 1126) the master can also statistically estimate the number of slaves on the entire network and therefore knows what probability and spread values to use in subsequent begin messages to achieve an appropriately paced response from the slaves on the network. If the master finds at the end of a spread period that it has more Hello messages to acknowledge than will fit in a single Begin message, then the master can send multiple Begin messages where all but the last contain a probability of zero. Thus each packet will cause some number of slave computers to be acknowledged and it is only the final one with a non-zero probability which will cause any non-acknowledged slave computers to consider resending their hello message. This process continues until the master believes it has found all the slaves on the network; finally it will send one or more Begin messages at step 1128 with a probability of one to flush out any remaining clients (over the minimum spread of 100 ms). Note that once a slave receives a Begin message (step 1131) which acknowledges its Hello message, then the slave can enter the command state at step 1133 (as described below); otherwise it can send a Hello message again.

In general, as represented by steps 1138 and 1141 and as described below, the master sends various commands to the slave, which acts on those commands until the desired data is collected. The slave continues to respond to commands until the slave ends on a reset message, or if it times out due to inactivity, as represented by step 1143. Step 1144 represents the master processing the collected data.

It should be understood that there are many possible variant implementations of this method and system whereby the variations may include a mechanism of avoiding acknowledgment implosion, the representation of the probability or spread values, the separation of the Hello message from the initial training of switches in the network, whether the slave should enter promiscuous mode when it first receives a Begin message, the minimum amount of spread, the technique by which a master may dynamically chose specific probability and spread values based on the Hello responses that it receives to maximize the speed of discovering all the slaves on the network, the technique for avoiding a malevolent computer to deliberately create an acknowledgement implosion and the like.

Several of the methods and systems described above make use of addresses that have never been used before. Ethernet network switches have the property that they deliberately forget the location of an Ethernet network address after some time in case the address has moved. Therefore the addresses used by the methods and systems can eventually be recycled and used again. Multiple instances of discovering the network topology may occur before the addresses are recycled, however, and the method and system of generation numbers can be used to generate and use addresses in a sequence such that the addresses are not reused before they have likely been forgotten by the Ethernet network switches in the network. As described above, no one computer system can be expected to retain this information since it could be switched off or connected to another network. Therefore this network memory is kept in a distributed fashion by the slaves in the network.

In accordance with one aspect of the current invention, when a master sends out a Begin message it may include a generation number which is the master's current "best guess" at the generation number to use for this mapping instance. Alternatively it may specify (for example by using a value of zero for the generation number) that it has no knowledge of the generation. When a slave receives a Begin message from a master, the slave notes the contained generation number (if specified) so that the most recent generation number used by a master is correctly recorded throughout the network. If the master did not specify a generation number, or the master used a generation number lower than the generation known to the slave, then the slave uses its own value of the generation number (if it has one) in any Hello packet response. If no slave indicates that it knows a generation number then the master chooses one at random (avoiding zero) and indicates that to the slaves.

Figure 12:
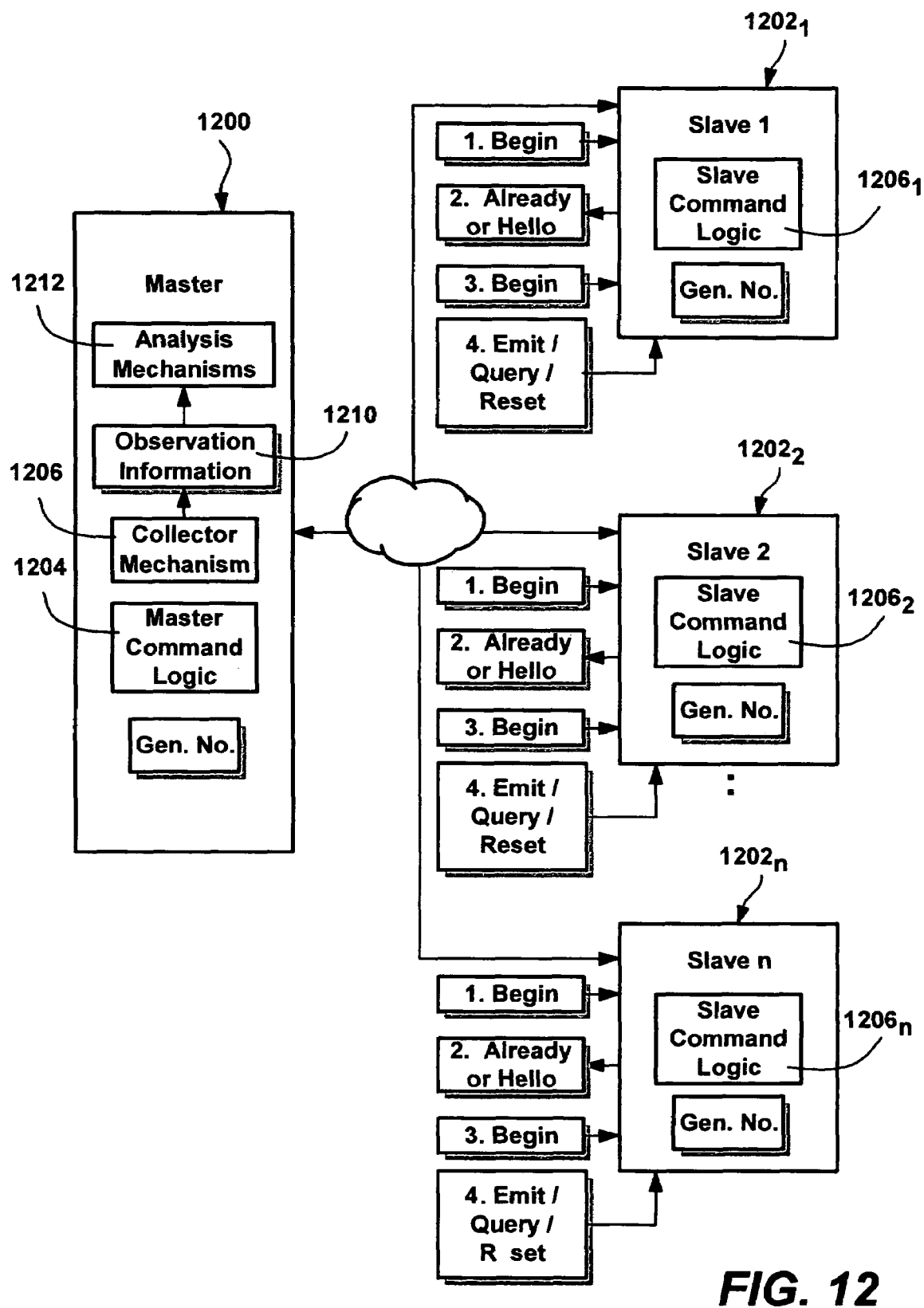
FIG. 12 is a block diagram representing components within the computer systems of a network configured to determine network topology in accordance with various aspects of the present invention.

This is generally represented in FIG. 12, in which the master 1200 and each slave 1202$_1$-1202$_n$ may have a generation number instance maintained therein. This method and system permits a master to first query all the slaves in the network to ask them which generation numbers have been used recently and for it then to decide on a generation number to use and tell the slaves. Thus any subsequent master will always use a different generation number from the one used to generate the addresses used in the current instance of discovering the network topology.

In accordance with one aspect of the current invention, the method and system for choosing the generation number deals with the case of a "wrap" in the allowable values for representing the generation number and therefore in determining whether one value is lower than another. This is done using the standard techniques of two's complement arithmetic: a value is lower than another if subtracting it from the other leaves a result which is positive.

As described above with reference to FIG. 11, once a slave has had its Hello message acknowledged, the slave enters into the command state. In the command state the slave has two primary roles. First, the slave notes the source and destination addresses of any topology probe packets that it sees on the network interface. Second, it acts on commands sent to it by the master. The slave exits the command phase and returns to idle when sent a reset by its master, or when an inactivity timeout occurs (step 1143 of FIG. 11). The commands obeyed by the slave are described below, and generally correspond to the various methods and systems described above that allow topology discovery, as represented by the command logic 1204 in the master and the slave command logic 1206$_1$-1206$_n$.

An Emit command permits the master to command a slave to send training or probe packets into the network. These packets may be sent with a small and specified time period between them (this is because some switches are known to take some milliseconds to learn an address). The master can also request that an acknowledgment be sent by the slave to the master after the packets have been successfully sent. In accordance with one aspect of the present invention, the slave will cease to send packets from a sequence of commanded packets in a Emit command as soon as one of them is reported (by whatever operating system technique may be used to send packets) to have an error. This is to prevent subsequent packets which may depend on the successful transmission of previous packets entering the network if previous packets have not entered the network. Emit command packets which cause an acknowledgment to be sent also carry a sequence number, which permits the slave to re-acknowledge an Emit command if it is retransmitted by the master.

In accordance with one aspect of the current invention, the slave exercises some discretion over whether to obey the Emit command sent to it. The intention is to prevent a malevolent computer from beginning to discover the network topology and then using the slaves to attack some other computer system. The constraints which a slave applies to the training or probe packet it is being asked to send include that first, the slave checks that the emit command is sent to that slave and not to any other computer or to a multicast or broadcast address. Second, the slave checks that the source address which it is being asked to send the training or probe packet from is either this machine's natural address or an address belonging to a range reserved for the topology discovery invention. Third, the slave checks that the destination address is not a multicast or broadcast address.

In accordance with another aspect of the present invention, the slave computer permits a distinction in the packets it can send between train packets and probe packets. However, this distinction is not the same as the difference between the concept of training a switch or switches in the network and probing the network; instead the distinction is designed to reduce the load on any receiving slaves in that the receipt of a train packet is not recorded whereas the receipt of a probe packet is recorded. The dual use of the terminology of training and probing is not confusing because the intention of the master is invisible to the slave; and in the common case training of the network is done using train packets and probing of the network is done using probe packets (the exception is that path training is normally done with probe packets so that the master can check that the training packet was received correctly at the target machine).

A Query command permits the master to command a slave to report the probe packets that it has seen; (train packets are not recorded). The slave puts the source and destination addresses of probe packets that it has seen into a Query response packet and sends it back to the master. These packets also carry sequence numbers to permit the reliable transfer of this information to the master. The slave also removes from its list of probe packets that it has seen those that it has sent in the Query response packet.

A Reset command permits the master to command a slave to return to the idle state. This is used when an instance of discovering the network topology is completed, or aborted. The slave can then be acquired by another master wishing to discover the network topology.

Observe that as described above, the operation of the wireless half-bridge includes the changing of Ethernet addresses of packets that travel through the device, and the method and system for the detection and topology discovery of such devices relies on careful observation of this behavior. Note also that the Ethernet addresses are used in the coordination method and system described above to identify and address the computers in the network. Therefore, in accordance with one aspect of the present invention, the method and system stores an additional Ethernet source and destination address pair within the main body of each topology packet sent on the network. These are referred to as the inner addresses, and they are used for the real identification and addressing of the nodes.

In accordance with another aspect of the present invention, the slave and the master nodes can determine when they will require to use broadcast to communicate with another node rather than a direct non-broadcast packet; specifically a broadcast is required if a packet from that node changed its address (the outer source address in the Ethernet header is different from the inner source address within the packet body). In addition, computers receiving such a broadcast packet (which was not intended for that computer, and was not intended for every computer, but only for a computer for whom it is necessary to broadcast the packet to permit it to travel through a wireless half-bridge) can use the real intended destination address within the body of the packet to check that the packet is not intended for that computer and to discard the packet.

In accordance with one aspect of the present invention, the methods and systems described can be implemented in such a way that the slave computer does not need to actively retransmit packets to ensure reliability; rather this function can be done by the master computer, with the slave acting on packets only. This reduces the complexity of the slave component of the system, although it should be understood that there are many ways of implementing the method and system described which should be considered equivalent.

Figure 20A:
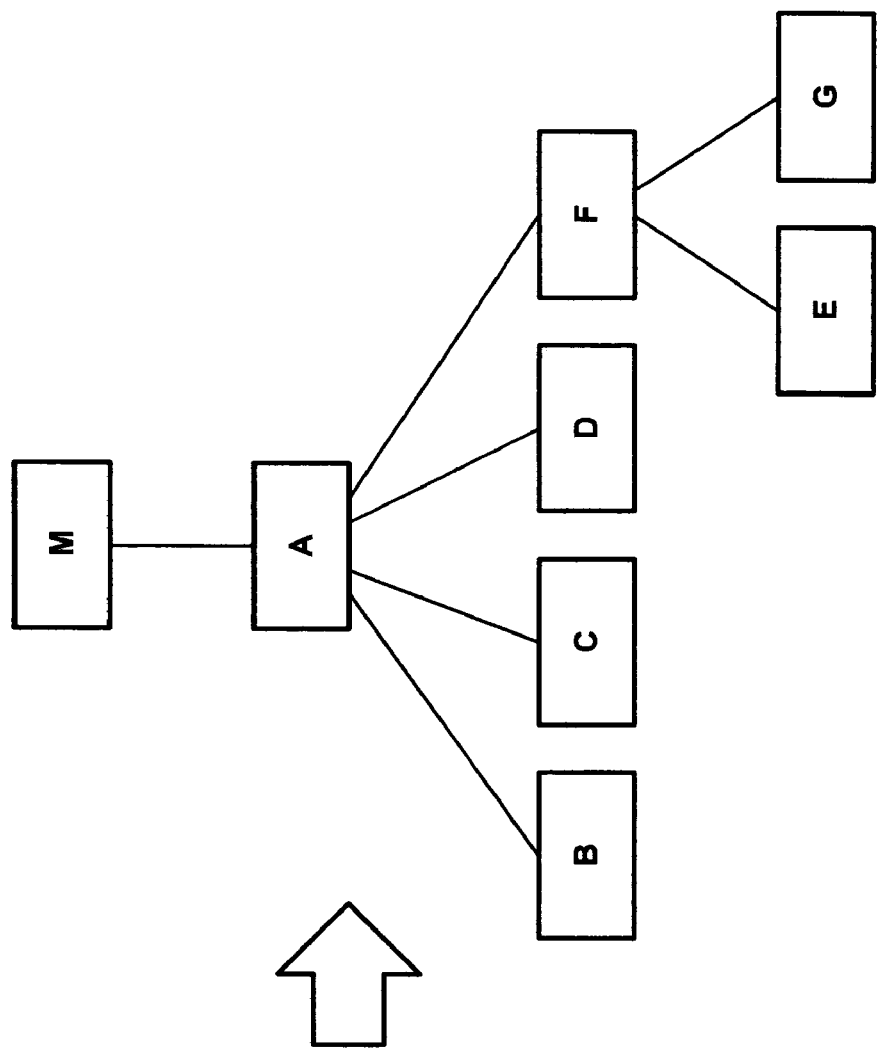
FIGS. 20A, 20B and 20C are block diagrams showing mechanisms by which an internal computer representation of a computer network is developed by application of various methods and systems of the present invention.
Figure 20B:
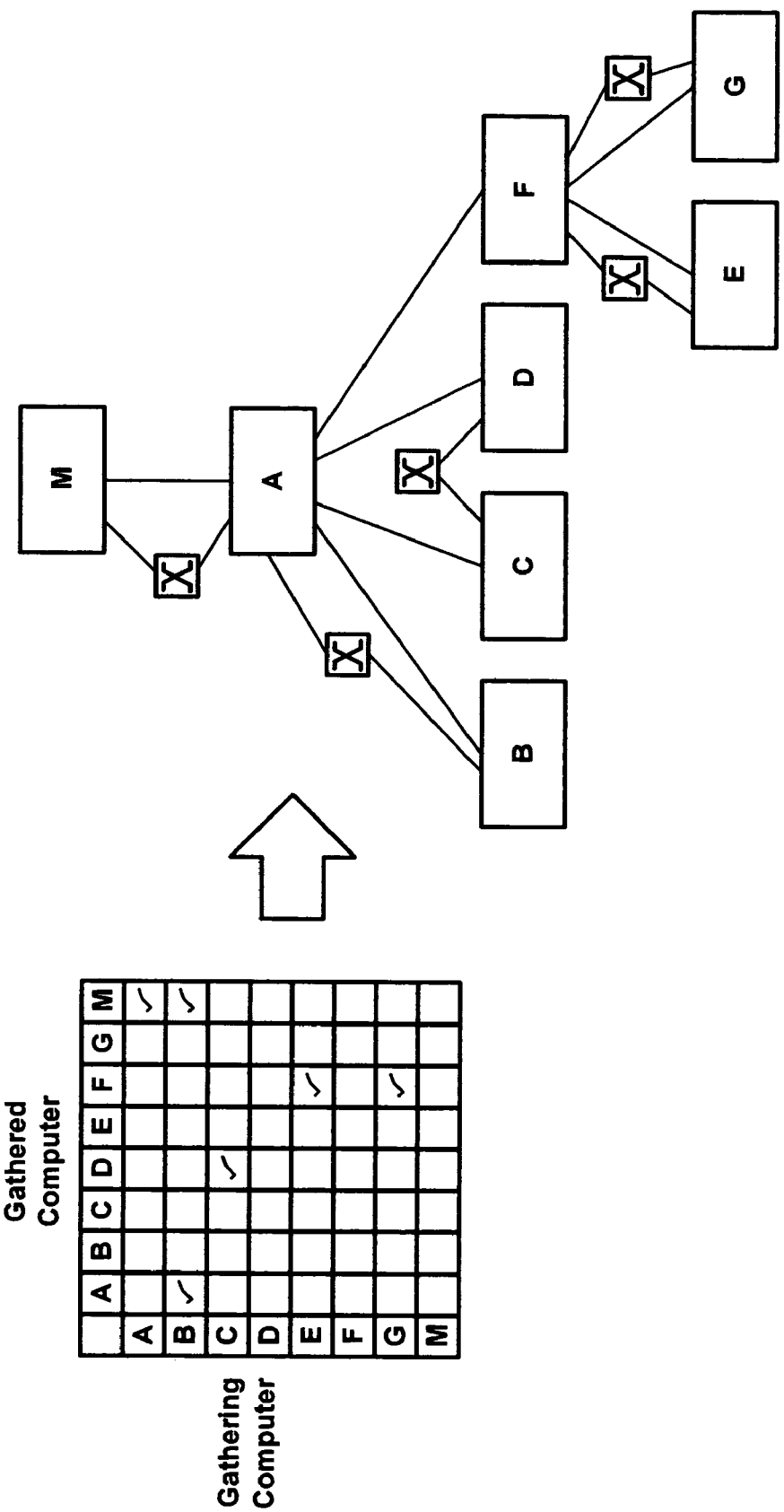
Figure 20C:
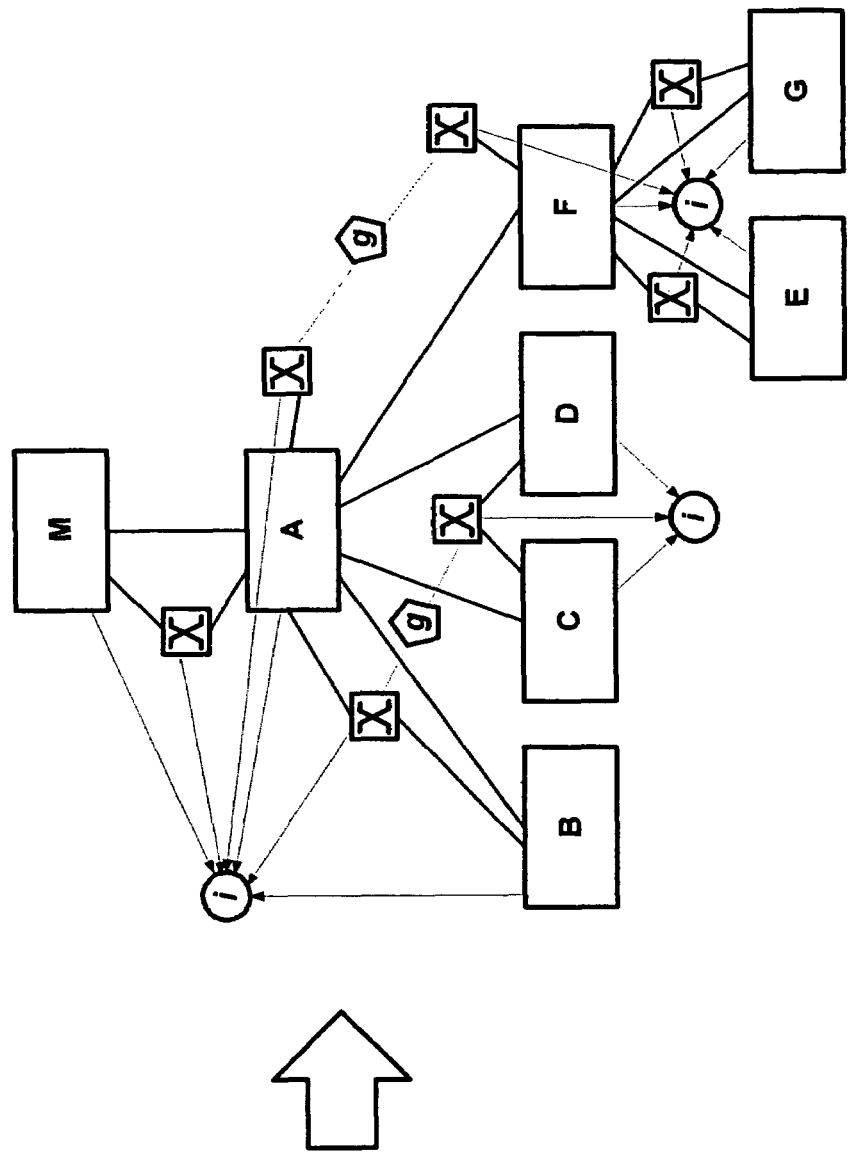

Returning to the general discussion of FIG. 12 showing the operation of the coordination system, the box labeled 1212 represents the analysis mechanisms for the many methods and systems of topology discovery described above. Expanding on detail, FIG. 20 illustrates some principal internal computer representations that are used to enable the processing of the methods and systems described above. To aid the explanation, the diagrams in FIG. 20A-20C include details that would be present for the methods and systems as they are applied to a network such as the network 1800 shown in FIG. 18.

FIG. 20A shows the sees matrix which is generated from the information collected by the shallow segment detection method and system, where a check mark indicates that the observing computer (represented by the letter appearing to the left of the row) observed the probe packet sent (to the collector computer) by the observed computer (represented by the letter appearing at the head of the column). The lack of a check mark in a position within the matrix indicates that the probe sent by the observed computer was not seen at that observing computer.

FIG. 20A also shows the segment tree representation which is created within the computer by the shallow segment tree ordering method and system using the data of the sees matrix already obtained. In the figurative representation, each box represents a segment with the letter in the box indicating the segment leader. In other words, the name of the computers present on each segment is identified within the box. The parent in the ordering is above the children in the ordering with lines connecting parents and children; within the computer system these are objects and inter-object pointers with distinguished pointers for parents and children.

In FIG. 20B, there is shown the gathers matrix which is generated from the information obtained by the three sweep detection method and system. A check mark indicates that the gathering computer (represented by the letter appearing to the left of the row) gathered the probe packet sent from the gathered computer (represented by the letter appearing at the head of the column). The lack of a check mark in a position within the matrix indicates that the probe sent by the gathered computer was not gathered at that gathering computer.

FIG. 20B also shows the segment tree representation which is extended within the computer by the three sweep detection method and system using the data of the gathers matrix already obtained. The figurative representation is extended with small crossed-squares to represent switches; once again the ordering is such that the parent in the ordering is above the children with respect to the lines connecting parents and children. Also observe that the original structure is maintained. Within the computer system, objects and inter-object pointers are used with distinguished pointers for parents and children.

In FIG. 20C, there is shown the Island Edge Results information that is generated from the information obtained by the island edge detection method and system. A check mark indicates that the receiving computer (represented by the letter appearing at the head of the column) received the probe packet sent from the sending computer (represented by the letter appearing to the left of the row). The lack of a check mark in a position within the matrix indicates that the probe sent by the sending computer was not received at the receiving computer.

FIG. 20C also shows the segment tree representation which is further extended within the computer by the island determination and island edge detection methods and systems using the data of the island edge results already obtained. The figurative representation is extended with small circles (each labeled with an "i") to represent islands and with small pentagons to represent gaps (each labeled with a "g"). For islands there is no ordering implied; for gaps once again the ordering is such that the ordering is above the children with respect to the lines connecting parents and children. Also observe that the previous structure is maintained. Within the computer system objects and inter-object pointers are used with distinguished pointers for parents and children.

In accordance with one aspect of the present invention, a method and system known as "graph building" and described herein and with reference to FIGS. 13-14 can be used to collate the information from previously described methods and systems to produce a tree of nodes describing the discovered network topology. The method and system uses a skeleton tree of segments generated by the shallow segment tree ordering method and system with the original collector of the shallow segment detection method and system at the root of the tree. The present method uses the information affixed to this tree by the many other methods and systems described herein which represent information about the various network devices and deep segments which connect those shallow segments together. The present method and system also uses the set of wireless computers determined at steps 1006 and 1008 in FIG. 10. This information is available for each of the regions identified by step 1002 of FIG. 10. The present method and system produces a tree of nodes, each node representing a particular discovered network element or computer. Nodes exist in five types: switch, hub, wireless access point (AP), wireless half-bridge (HB), and computer. The first four types have one or more child nodes, whereas computer nodes have no children. A parent-child relationship exists where the two network elements are discovered to be connected together.

The graph building method and system proceeds using the steps generally represented in FIGS. 13A, 13B, 13C, 13D, and 13E.

Figure 13A:
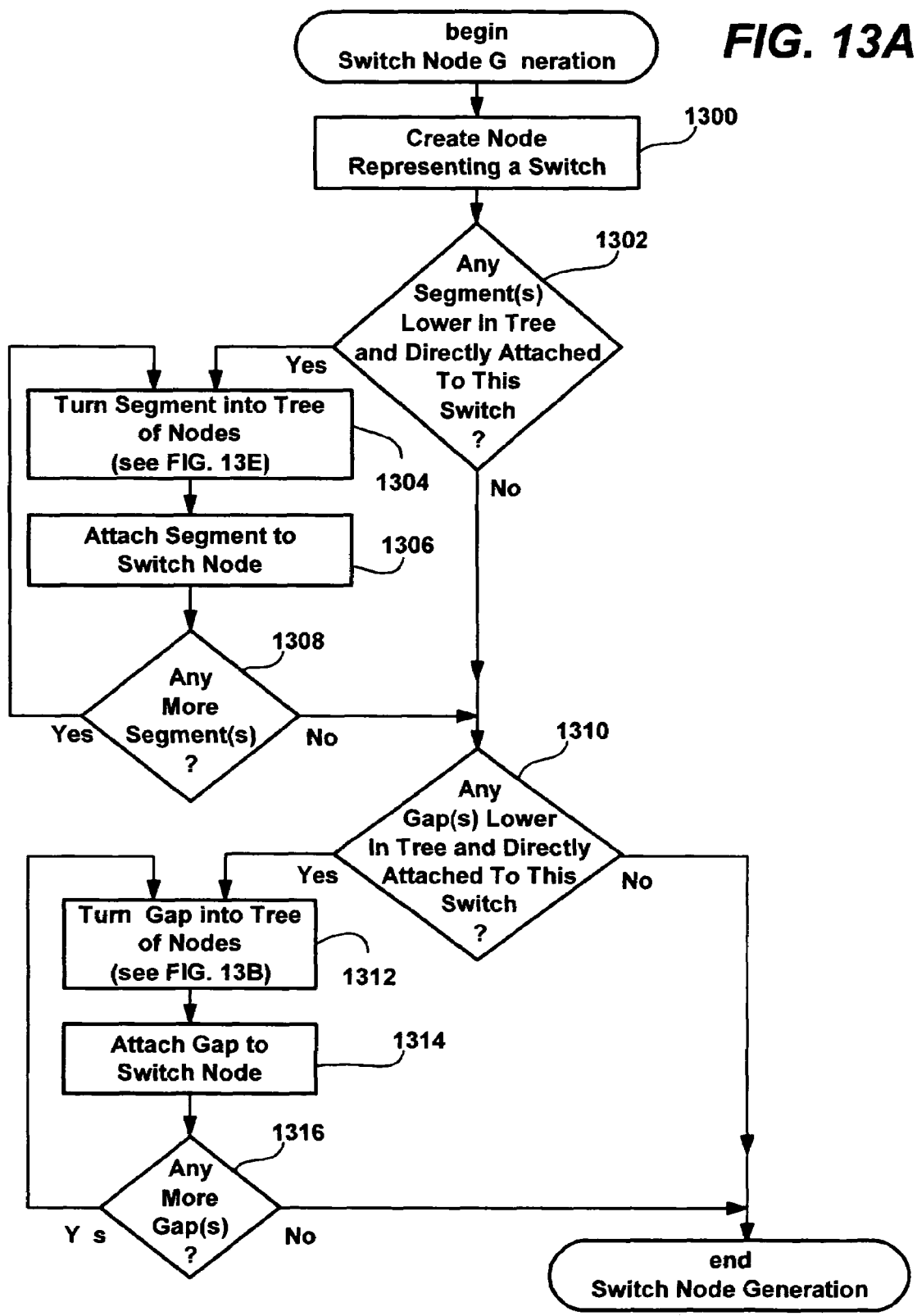
FIGS. 13A-13E and 14A-14B comprise flow diagrams generally representing the operation of a graph building process to produce a tree of nodes that describe a discovered network topology, in accordance with various aspects of the present invention.

In FIG. 13A the steps, beginning at step 1300, represent the generation of a switch node. In step 1300 the method creates a node representing a switch. Then in step 1302, the number of segments lower in the tree and directly attached to this switch is checked. If there are none then the method proceeds to step 1310, if there are then the method at step 1304 turns the segment into a tree of nodes using the steps of FIG. 13E and attaches it to the switch node (step 1306). Then in step 1308 the method checks to see if there are any more segments, returning to step 1304 if so. If not, in step 1310 the method checks to see if there are any gaps lower in the tree and directly attached to this switch. If not the method of creating a switch node is finished. If there are then step 1312 turns the gap into a tree of nodes using the steps of FIG. 13B and attaches it to the switch node (step 1314). Then step 1316 checks to see if there are any more gaps; if there are the method returns to step 1312, if not the method of creating a switch node is finished.

Figure 13B:
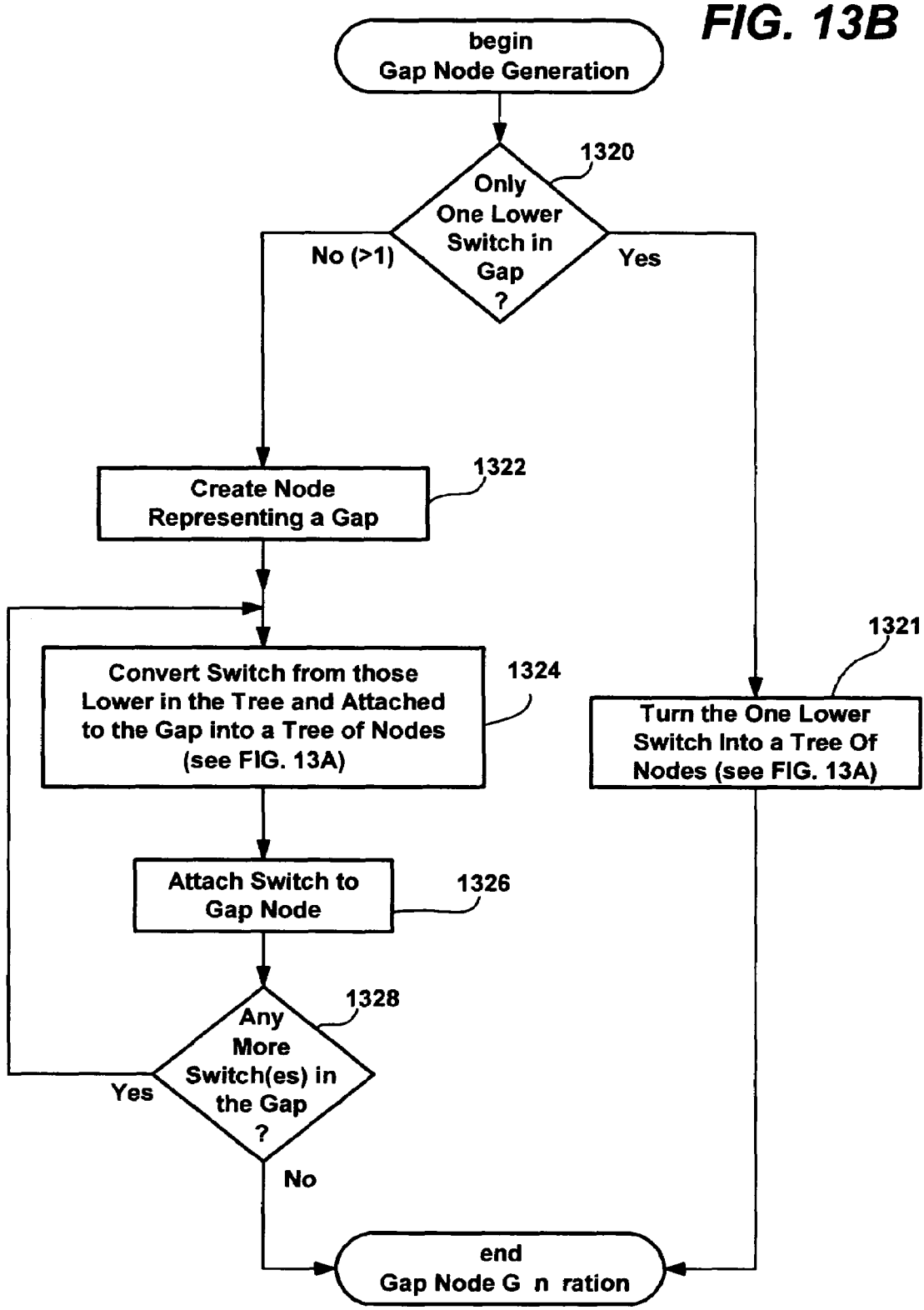

In FIG. 13B, the steps, beginning at step 1320, represent the conversion of a gap into a tree of nodes. In step 1320 the method checks the number of lower switches in the gap. If there is only one, the method proceeds to step 1321, otherwise the method proceeds to step 1322. In step 1321 the method turns the one lower switch into a tree of nodes using the method of FIG. 13A, and is then finished. Otherwise, in step 1322, the method creates a node representing a gap. In step 1324 a switch from those lower in the tree and attached to the gap is converted to a tree of nodes using the steps of FIG. 13A, and it is attached to the gap node by step 1326. In step 1328, the method checks to see if there are any more switches in the gap, returning to step 1324 if there are. If not, the method of creating a gap node is finished.

Figure 13C:
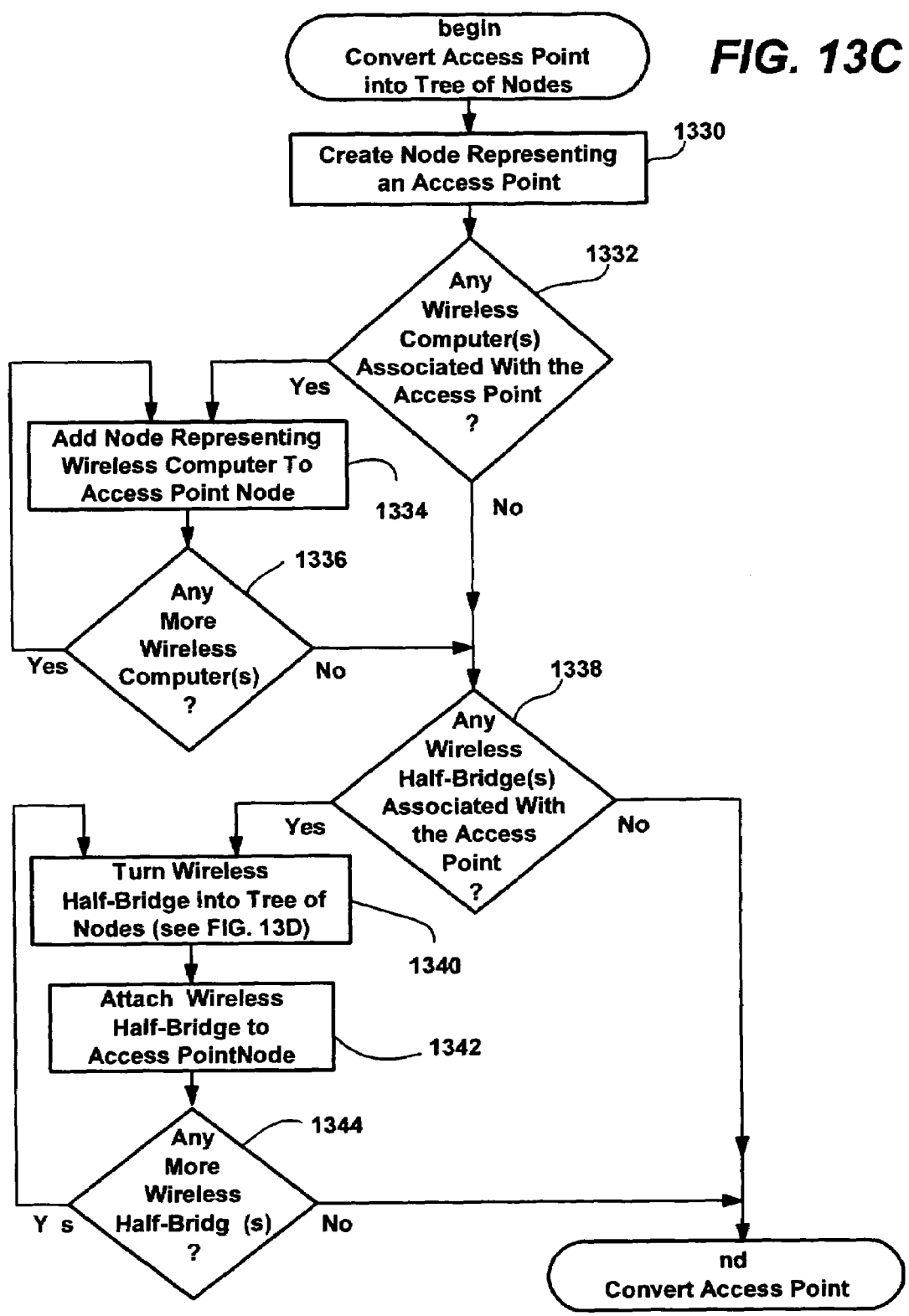

In FIG. 13C the steps, beginning at step 1330, represent the conversion of an access point into a tree of nodes. In step 1330 the method creates a node representing an access point. Then in step 1332, the number of wireless computers associated with the access point is checked. If there are none, then the method proceeds to step 1338. If instead there is at least one, then the method at step 1334 adds a node representing the wireless computer to the access point node. Then in step 1336 the method checks to see if there are one or more wireless computers to add, returning to step 1334 as necessary until each wireless computer has a node added for it. When none remain at step 1336, at step 1338 the method checks to see if there are any wireless half-bridges attached to the access point. If not, the method of creating an access point node is finished. If there are then step 1340 turns the wireless half-bridge into a tree of nodes using the steps of FIG. 13D and attaches it to the access point node (step 1342). Then step 1344 checks to see if there are any more wireless half-bridges; if there are the method returns to step 1340, if not the method of creating an access point node is finished.

Figure 13D:
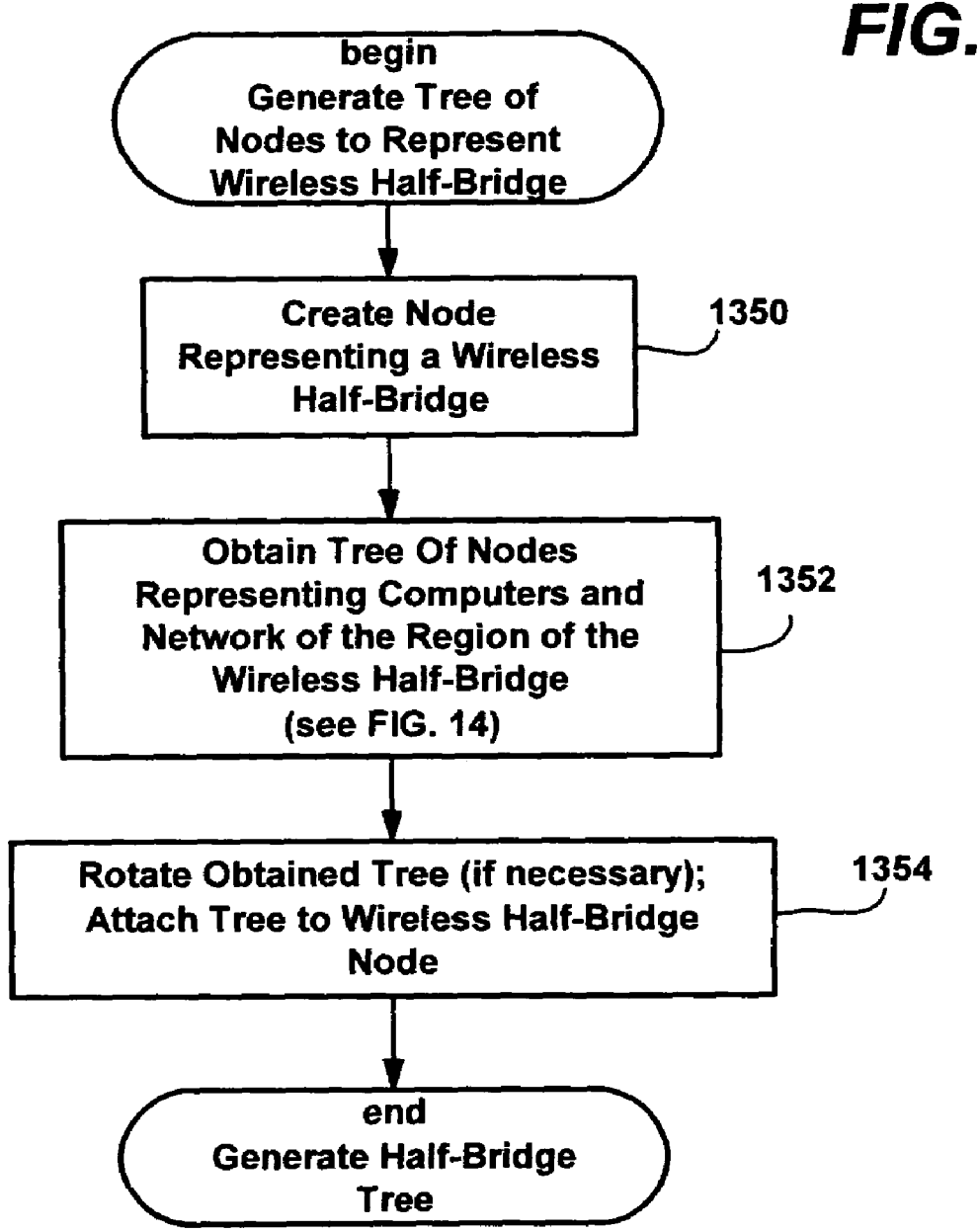

In FIG. 13D the steps, beginning at step 1350, represent the generation of a tree of nodes to represent a wireless half-bridge. In step 1350 the method creates a node representing a wireless half-bridge. Then in step 1352 the method obtains a tree of nodes representing the computers and network of the region of the wireless half-bridge using the general methods and steps of FIG. 14. In step 1354 the method rotates the tree obtained (if necessary) so that the wireless half-bridge is at the root, and attaches it to the wireless half-bridge node. The method of creating a wireless half-bridge node is then finished.

Figure 13E:
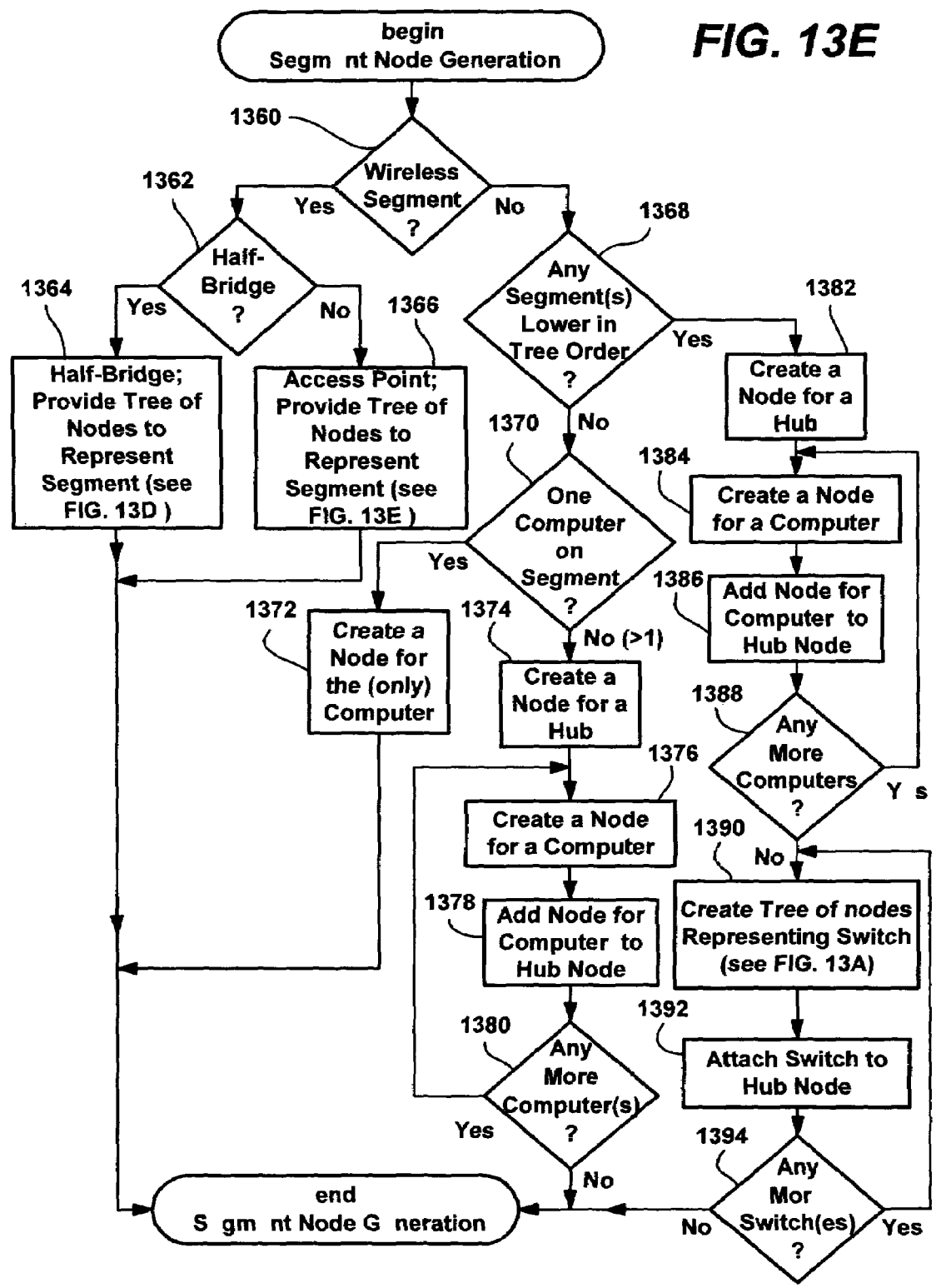

In FIG. 13E the steps, beginning at step 1360, represent the generation of a tree of nodes to represent a segment. In step 1360, the method checks to see if the segment is a wireless segment; if not the method proceeds to step 1368, otherwise step 1360 branches to step 1362. In step 1362 the method checks to see if the wireless segment is a half-bridge. If it is, the method via step 1364 uses the steps of FIG. 13D to provide a tree of nodes representing the wireless half-bridge segment, and then finishes. If not a half-bridge, the segment represents an access point, whereby at step 1366 the method uses the steps of FIG. 13C to provide a tree of nodes representing the segment, and then finishes.

When a wired segment, step 1368 of FIG. 13E checks the number of segments that are lower in the tree order. If there is at least one lower segment, then the method proceeds to step 1382, described below. If there are none, then via step 1370 the method checks to see how many computers are on this segment. If there is only one such computer, then via step 1372 the method creates a node for the computer, and then finishes. If there is more than one computer, then step 1374 is executed, whereby the method creates a node for a hub. Then in step 1376 the method creates a node for a computer, and in step 1378 adds this computer node to the node for the hub. In step 1380 the method checks if there are any more computers on this segment, returning to step 1376 if there are. Otherwise, the method is done, with the hub node being the node representing the segment.

When step 1382 of FIG. 13E is executed, the method creates a node for a hub. Then in step 1384, the method creates a node for a computer, and in step 1386 it adds that computer node to the node for the hub. In step 1388 the method checks if there are any more computers on this segment, returning to step 1384 if there are. When none remain at step 1388, via step 1390 the method creates a tree of nodes representing a switch, by using the steps of FIG. 13A. In step 1392, the method adds this tree to the node for the hub. In step 1394, the method checks whether there are any other switches attached to the segment, returning to step 1390 if so. Otherwise the method is finished, with the hub node representing the segment.

Figure 14A:
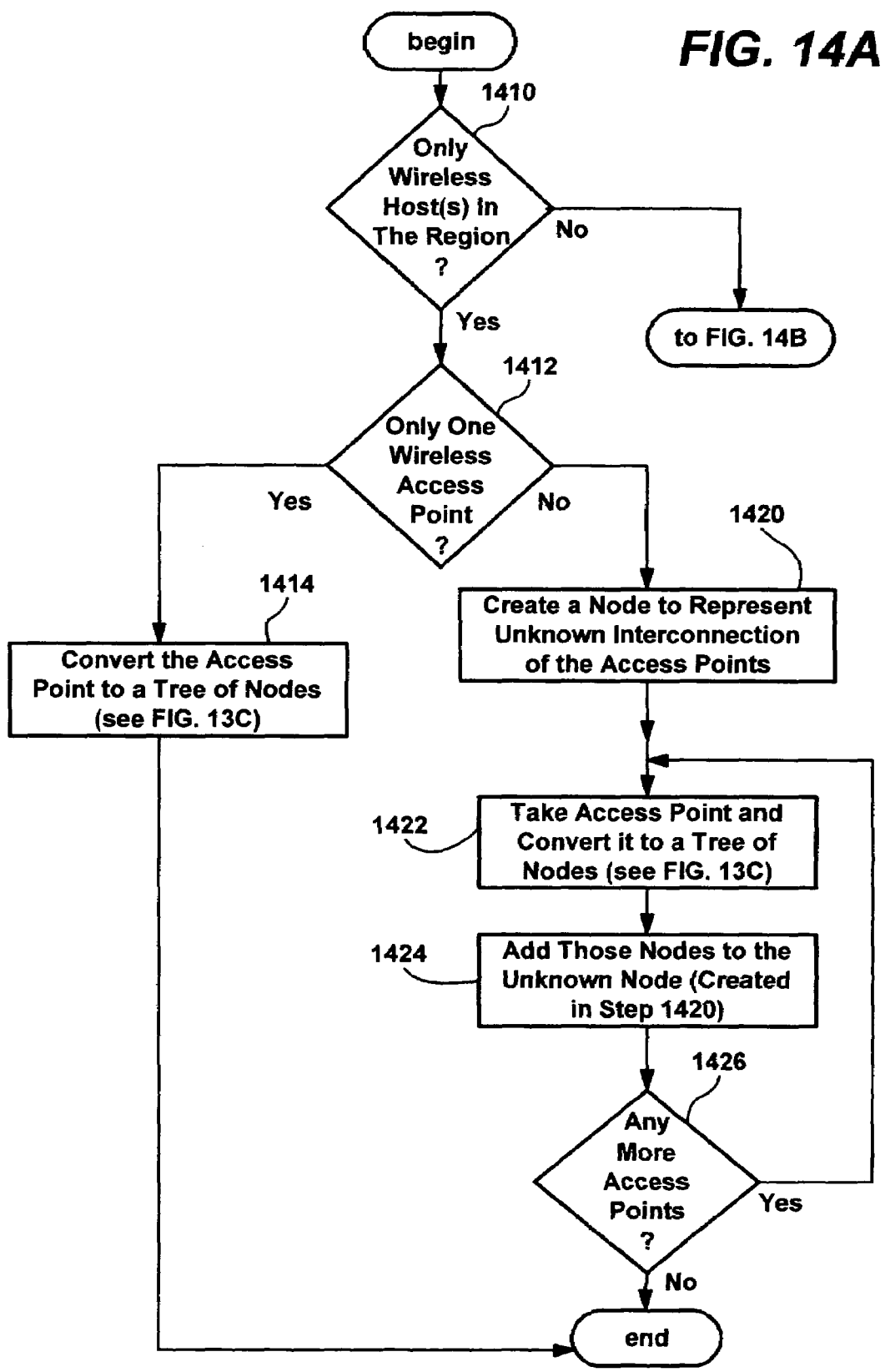
Figure 14B:
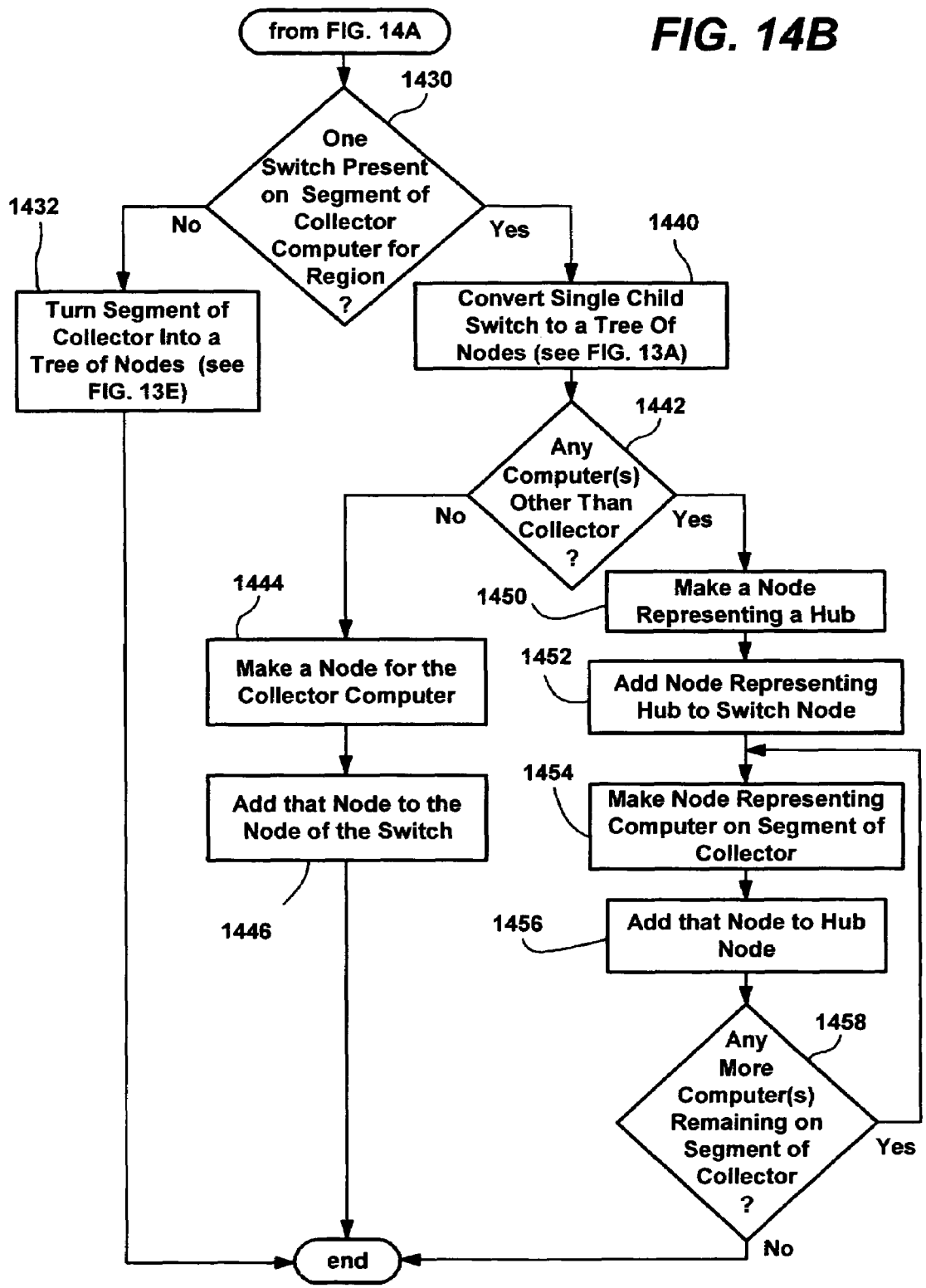

The graph building method and system for converting a region of the network (including the complete network) into a tree of nodes using the methods and systems of FIGS. 13A-13E is described in FIGS. 14A and 14B. In FIGS. 14A and 14B, the steps, beginning at step 1410 of FIG. 14A, convert the region as follows. In step 1410 the method tests to see if there are only wireless hosts in the region. If only wireless hosts are present the method proceeds to step 1412, if there is at least one wired host it proceeds to step 1430 of FIG. 14B.

In step 1412 of FIG. 14A, the method tests whether there is only one wireless access point in the network. If there is only one, then the method proceeds to step 1414; if there is more than one then the method proceeds to step 1420. In step 1414 the method converts the access point to a tree of nodes using the steps of FIG. 13C and is then finished.

In step 1420, the method creates a node to represent the unknown interconnection of the access points, and then in step 1422 it takes an access point and converts it to a tree of nodes using the steps of FIG. 13C. Subsequently in step 1424 it adds those nodes to the unknown node created in step 1420. Then in step 1426 the method checks to see if there are any more access points, returning to step 1422 if there are. If there are none then the method is finished.

In step 1430, the method examines how many child switches are present on the segment of the collector computer for the region. If there is not exactly one then the method proceeds to step 1432 where the steps of FIG. 13E are used to turn the segment of the collector into a tree of nodes and the method is finished. If there is exactly one child switch then the method proceeds to step 1440; the purpose of the special processing steps for exactly one child switch is that the segment of the collector should not appear materially different in the converted tree of nodes than any other segment attached to a single switch.

In step 1440, the method uses the steps of FIG. 13A to convert the single child switch to a tree of nodes. Then in step 1442 the method checks the number of computers on the segment of the collector. If there are computers other than the collector then the method proceeds to step 1450. If there is only the collector then in step 1444 the method makes a node for the collector computer and in step 1446 it adds that node to the node of the switch; the method is then finished.

In step 1450 the method makes a node representing a hub and in step 1452 adds it to the switch node. In step 1454 the method makes a node representing a computer on the segment of the collector and in step 1456 the method adds it to the hub node. Then in step 1458 the method tests if there are computers remaining on the segment of the collector, returning to step 1454 if so. If there are no computers left then the method is finished.

Note that the methods and systems of the present invention can be applied to networks having additional computers and other devices that do not support the protocol described, or that are unavailable. The method then provides an incomplete (but still useful) network topology.

As can be seen from the foregoing detailed description, there is provided a method and system for discovering the topology of an Ethernet network. The method and system are flexible depending on the types of computing components and network arrangements in given systems and networks.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer network, a method for discovering information about a topology of the network, comprising:

training a switch with a training message sent from a first computer so that the switch knows a training address, the training address comprising an address that is known by the switch, such that the switch can use the training address as a base in determining which other computers have access to the training address;

probing with a probe message sent from a second computer to the training address;

determining which other computer or computers in the network see the probe message;

detecting at least one segment in the network, the detecting including placing a plurality of computers in the network into a promiscuous mode, selecting a master computer, and, at each computer other than the master computer:

a) sending a packet to the master computer;

b) recording any packet observed from another computer sent to the master computer; and c) reporting the source address of each packet observed; and collecting the source addresses of the packets observed in order to determine which computers see which other computer or computers in the network.

2. The method of claim 1 wherein detecting the at least one segment further comprises, constructing a matrix indicative of whether each computer sees each other computer in the network, and analyzing the matrix, a given computer being in a segment with another computer when the given computer can see the other computer and the other computer can see the given computer.

3. The method of claim 1 further comprising sending a packet from the master computer to an address distinct from those belonging to any computer on the network, such that any computer on the segment of the master computer will see the packet to the distinct address.

4. The method of claim 1 further comprising sending a packet from the master computer such that any computer on the segment of the master computer will see the packet to the distinct address, and no computer on any other segment will see the packet.

5. The method of claim 4 wherein sending the packet from the master computer comprises the master computer first sending a packet from a distinct address to another address, and further comprising, sending a packet from the master computer's address to the distinct address.

6. The method of claim 1 further comprising, determining a segment leader for each segment, and wherein training the switch with the training message sent from the first computer comprises training the switch with the training message sent from a first segment leader, and wherein probing with the probe message sent from the second computer comprises probing the switch with the probe message sent from a second segment leader.

7. The method of claim 1 wherein training a switch comprises, for a first segment leader of a first segment, training any switches attached to the first segment by sending a training message from a training address, and further comprising, for a second segment leader of a second segment, training any switches attached to the second segment by sending a message from the training address.

8. The method of claim 7 wherein probing with a probe message comprises sending a packet from the first segment leader to the training address to determine how each switch attached to the first segment was trained.

9. A computer-readable medium encoded with computer-executable instructions for performing the method of claim 1.

10. In a computer network, a method of detecting at least one segment in the network comprising:

placing a plurality of computers in the network into a promiscuous mode;

selecting a collector computer;

at each computer other than the collector computer a) sending a packet to the collector computer;

b) recording any packet observed from another computer sent to the collector computer; and c) reporting the source address of each packet observed;

collecting the source addresses of the packets observed; and determining which computers see which other computer or computers in the network based on the source addresses collected.

11. The method of claim 10 further comprising, constructing a matrix indicative of whether each computer sees each other computer in the network, and analyzing the matrix such that a first computer is in a segment with a second computer when the first computer can see the second computer and the second computer can see the first computer.

12. The method of claim 10 wherein a master computer collects the source addresses and determines which computers see which other computer or computers in the network.

13. The method of claim 10 wherein the collector computer sends a packet to a distinct address such that any computer on the segment of the collector computer will see the packet sent to the distinct address.

14. The method of claim 10 further comprising, determining a segment leader for each segment.

15. The method of claim 14 further comprising, determining whether there is an intermediate segment between switches, including, selecting a segment leader as a distinguished computer that is of a different segment than the collector computer, at each segment leader other than the distinguished computer:
   a) sending a packet to distinguished computer;
   b) recording any packet observed from another segment leader sent to the distinguished computer; and
   c) reporting the source address of each packet observed;
   collecting the source addresses of the packets observed; and
   determining whether the collector computer's segment is asymmetric, and if so, determining that the collector computer's segment is an intermediate segment.

16. The method of claim 14 further comprising, for a first segment leader of a first segment, training any switches attached to the first segment by sending a training message from the training address, and further comprising, for a second segment leader of a second segment, training any switches attached to the second segment by sending a message from the training address.

17. The method of claim 16 further comprising, probing with a probe message from the first segment leader to the training address to determine how each switch attached to the first segment was trained.

18. The method of claim 14 further comprising, having each segment leader, in turn, train any switches attached to its segment with a particular address which is the same for each segment leader, having each segment leader, in turn, send a probe packet to the particular address such that each switch adjacent a segment leader will deliver the probe packet to the segment attached to that switch which most recently had its segment leader send the train message, collecting the results from each segment leader as to whether the probe packet was received, and unifying the results to determine which segments share a switch and which segments are attached to a switch to which no other segment is attached.

19. The method of claim 18 wherein the segment leaders send the train messages in an order comprising a tree ordering on the segments in the network.

20. The method of claim 19 further comprising, constructing a matrix indicative of whether each computer sees each other computer in the network, and wherein the tree order comprises the tree order rooted at the collector computer and generated from the matrix.

21. The method of claim 14 further comprising, having each segment leader train its local switch with a training address that is different from the training address of another segment leader, probing the training address of each other segment leader, collecting information as to each probe packet received at each segment leader, and processing the information to determine an interconnection of switches in the network.

22. The method of claim 10 further comprising, selecting as a switch leader a representative computer from among each segment attached to a switch.

23. The method of claim 22 wherein a plurality of switch leaders are selected corresponding to a plurality of switches, and further comprising, allocating different training addresses, each different address corresponding to a different switch leader; having each switch leader train its local switch with the training addresses of the other switch leaders, having each switch leader probe its corresponding switch with the training address corresponding to that switch leader, collecting information as to each probe packet received at each segment leader, and processing the information to determine an interconnection of switches in the network.

24. The method of claim 22 wherein a plurality of switch leaders are selected corresponding to a plurality of switches, and further comprising, selecting a first switch leader from among the switch leaders, selecting a second switch leader from among the switch leaders, the second switch leader being different from the first switch leader, and grouping remaining switch leaders into at least one equivalence class, in which any switch leaders that exchange packets without those packets traveling through a switch in the network on the path from the first switch leader to the second switch leader are grouped in the same equivalence class.

25. The method of claim 24 wherein at least a first and second equivalence class are present, and further comprising, selecting a first class leader from the first equivalence class and a second class leader from the second equivalence class, sending a training packet corresponding to a training address from the first class leader to the first switch leader from the training address, sending a training packet from the second switch leader corresponding to the training address to the second class leader, sending a probe packet from the first switch leader to the training address, and ordering the class based on where the probe packets are received.

26. The method of claim 25 wherein the ordering is not determined, and further comprising, sending a training packet corresponding to a training address from the second class leader to the second switch leader from the training address, sending a training packet from the first switch leader corresponding to the training address to the first class leader, and sending a probe packet from the second switch leader to the training address, and ordering the class based on where the probe packets are received.

27. A computer-readable medium encoded with computer-executable instructions for performing the method of claim 10.

28. In a computer network, a system for determining the topology of the network, comprising:
   a master computer, the master computer directing other computers in the network to send training packets, to send probe packets, and to report which probe packets were received at the other computers, wherein the master computers optimizes the directions to the other computers by performing operations including, remembering the topology of the network from one instance of discovering network topology to the next, and, when there is a freedom in the order of giving directions to the other computers, selecting an order which would be most efficient if the network topology were alike to the previous instance of discovering network topology;
   a collector for collecting information from the other computers including data corresponding to each probe packet received at each other computer; and
   an analysis mechanism, the analysis mechanism determining the topology of the network based on the information from the other computers.

29. The system of claim 28 wherein the collector constructs a sees matrix indicative of which computers see which other computers in the network, and the analysis mechanism processes the sees matrix.

30. The system of claim 28 wherein some of the computers in the network may be directed to send probe packets but may not be directed to send training packets or to report which probe packets were received at the computer.

31. The system of claim 30 wherein a direction of those computers comprises the use of remote transmission elicitation.

32. The system of claim 28 wherein some of the computers in the network may not be directed to send training packets, but may be directed to send probe packets or to report which probe packets were received at the computer.

33. The system of claim 28, wherein the master computer on the wireless side of a wireless half bridge instructs another computer on the wired side of a wireless half-bridge, comprising: the master computer places an additional copy of the address of the computer to be instructed inside the packet containing the instruction
the master computer broadcasts the instruction packet to the entire network
other computers do not obey the instructions in broadcast instruction packets unless a copy of their own address is found within the instruction packet.

34. The system of claim 28 wherein the other computer on the wireless side of a wireless half bridge responds to an instruction from the master computer on the wired side of a wireless half-bridge, wherein the other computer places an additional copy of the address of the master computer inside the packet containing the response, the other computer broadcasts the instruction packet to the entire network, and the other computers ignore responses in broadcast response packets unless they are the master computer whose address is found within the response packet.

35. In a computer network, a method for discovering information about a topology of the network, comprising:
determining the segments in the network which contain at least one computer;
training a portion of the network with at least one training message sent from one or more of the computers in the network so that the switches in the portion of the network know at least some training address, the training address comprising an address that is known by the switch, such that the switch can use the training address as a base in determining which other computers have access to the training address;
probing with at least one probe message sent from one or more of the computers in the network;
determining which computer in the network sees which of the probe message or messages
determining which switches and segments are found together in an island, including:
putting a first segment in a first proposed island;
for each other segment:
determining whether that segment shares a switch with any segment already in a proposed island, and
a) if so, merging the segment into that proposed island, and
b) if not, creating a new proposed island, and
wherein when each segment has been put in a proposed island, maintaining information such that each of the proposed island is an actual island in the network.

36. The method of claim 35 wherein determining the segments in the network comprises detecting shallow segments.

37. The method of claim 36 wherein determining the segments in the network further comprises detecting any shallow intermediate segments.

38. The method of claim 35 wherein training a portion of the network comprises applying three sweep detection to discover which segments are attached to a common switch.

39. The method of claim 35 further comprising, determining whether there is more than one island, and if so, using an island edge detection mechanism to determine any switch at the end of an island and any gap between the islands.

40. The method of claim 39 further comprising, determining whether there is any gaps larger than two islands, and if so, for each such gap, applying at least one gap splitting method to break the gap into smaller gaps.

41. The method of claim 39 further comprising, discovering interconnections between each of the islands.

42. The method of claim 35 further comprising separating computers in the network into a fixed set and a wireless set containing fixed computers and wireless computers, respectively, and wherein the segments are determined from the fixed set.

43. The method of claim 42 further comprising separating the network into regions based on detecting wireless half-bridges.

44. The method of claim 35 further comprising, building a graph to represent the topology of the discovered network.

45. A computer-readable medium encoded with computer-executable instructions for performing the method of claim 35.

46. In a computer network, a method comprising:
discovering information about a topology of the network, including sending and receiving training packets and probe packets using addresses distinct from those belonging to any computer on the network, where the addresses used in the packets are fresh addresses which have never been used on the network before and are not known to the network because they have not been used on the network recently;
reporting which probe packets were received at the computers in the computer network, including remembering the topology of the network from one instance of discovering network topology to the next and selecting an order which would be most efficient if the network topology were alike to the previous instance of discovering network topology; and
choosing addresses from a range apportioned into generations, using the addresses from a portion of the generation which is least recently used, and remembering the generation which is least recently used.

47. The method of claim 46, wherein the addresses used in the packets are distinct from those belonging to any computer by being selected from a range allocated by an address allocating authority for the type of computer network, and not used for constructing any network interface for any computer.

48. A computer-readable medium encoded with computer-executable instructions for performing the method of claim 46.

49. In a computer network, a method comprising:
discovering information about a topology of the network, including training a portion of the network with at least one training message sent from one or more of the computers in the network so that the switches in the portion of the network know at least some training address, the training address comprising an address that is known by the switch, such that the switch can use the training address as a base in determining which other computers have access to the training address;
probing with at least one probe message sent from one or more of the computer in the network;
determining which computer in the network sees which of the probe message or messages;
detecting at least one segment in the network, the detecting including placing a plurality of computers in the network into a promiscuous mode, selecting a master computer, and, at each computer other than the master computer:
a) sending a packet to the master computer;
b) recording any packet observed from another computer sent to the master computer; and c) reporting the source address of each packet observed; and collecting the source addresses of the packets observed in order to determine which computers see which other computer or computers in the network.

50. The method of claim 49 further comprising using the discovered topology to evaluate the network.

51. The method of claim 50 wherein using the discovered topology for evaluating the network comprises using the discovered topology for diagnostics.

52. The method of claim 50 wherein using the discovered topology for evaluating the network comprises using the discovered topology for quality of service.

53. The method of claim 50 wherein using the discovered topology for evaluating the network comprises using the discovered topology for performance recommendations.

54. The method of claim 50 wherein using the discovered topology for evaluating the network comprises using the discovered topology for product recommendations.

55. A computer-readable medium encoded with computer-executable instructions for performing the method of claim 49.

56. In a computer network, a method for discovering information about a topology of the network, comprising:

training a switch with a training message sent from a first computer so that the switch knows a training address, the training address comprising an address that is known by the switch, such that the switch can use the training address as a base in determining which other computers have access to the training address;

probing with a probe message sent from a second computer to the training address;

determining which other computer or computers in the network see the probe message;

detecting at least one segment in the network;

determining a segment leader for each segment;

determining whether there is an intermediate segment between switches, including, selecting a segment leader as a distinguished computer that is of a different segment than the master computer, at each segment leader other than the distinguished computer:

a) sending a packet to distinguished computer;

b) recording any packet observed from another segment leader sent to the distinguished computer; and c) reporting the source address of each packet observed;

collecting the source addresses of the packets observed; and determining whether the master computer's segment is asymmetric, and if so, determining that the master computer's segment is an intermediate segment.

57. The method of claim 56, wherein detecting the at least one segment further comprises, constructing a matrix indicative of whether each computer sees each other computer in the network, and analyzing the matrix, a given computer being in a segment with another computer when the given computer can see the other computer and the other computer can see the given computer.

58. The method of claim 56, further comprising sending a packet from the master computer to an address distinct from those belonging to any computer on the network, such that any computer on the segment of the master computer will see the packet to the distinct address.

59. The method of claim 56, further comprising sending a packet from the master computer such that any computer on the segment of the master computer will see the packet to the distinct address, and no computer on any other segment will see the packet.

60. The method of claim 59, wherein sending the packet from the master computer comprises the master computer first sending a packet from a distinct address to another address, and further comprising, sending a packet from the master computer's address to the distinct address.

61. The method of claim 56, further comprising determining a segment leader for each segment, and wherein training the switch with the training message sent from the first computer comprises training the switch with the training message sent from a first segment leader, and wherein probing with the probe message sent from the second computer comprises probing the switch with the probe message sent from a second segment leader.

62. The method of claim 56, wherein training a switch comprises, for a first segment leader of a first segment, training any switches attached to the first segment by sending a training message from a training address, and further comprising, for a second segment leader of a second segment, training any switches attached to the second segment by sending a message from the training address.

63. The method of claim 62, wherein probing with a probe message comprises sending a packet from the first segment leader to the training address to determine how each switch attached to the first segment was trained.

64. A computer-readable medium encoded with computer-executable instructions for performing the method of claim 56.

65. In a computer network, a system for determining the topology of the network, comprising:

a master computer, the master computer directing other computers in the network to send training packets, to send probe packets, and to report which probe packets were received at the other computers, wherein the master computer discovers the other computers on the network by sending at least one packet asking other computers to identify themselves to the master, and the other computers sending at least one packet identifying themselves to the master computer and wherein only one master is allowed to be active at a time on the network, wherein one master computer receives a packet from another master computer asking other computers to identify themselves and the one master computer responds with a packet indicating that there is already a master computer present, and wherein any other computer already identified with another master computer may send a packet indicating that it is already identified to another master computer;

a collector for collecting information from the other computers including data corresponding to each probe packet received at each other computer;

an analysis mechanism, the analysis mechanism determining the topology of the network based on the information from the other computers.

66. The system of claim 65 wherein the packet sent by the master computer may contain the identification or others computers which the master computer has already identified, and the other computers need not identify themselves again if they have already been identified.

67. The system of claim 65, wherein the other computers spread their packets over an interval of time in order to avoid overwhelming the master computer, wherein each computer selects a time from some interval, and each computer sends its response at its selected time.

68. The system of claim 65, wherein the collector constructs a sees matrix indicative of which computers see which other computers in the network, and the analysis mechanism processes the sees matrix.

69. The system of claim 65, wherein some of the computers in the network may be directed to send probe packets but may not be directed to send training packets or to report which probe packets were received at the computer.

70. The system of claim 69, wherein a direction of those computers comprises the use of remote transmission elicitation.

71. The system of claim 65, wherein some of the computers in the network are not directed to send training packets, but are directed to send probe packets or to report which probe packets were received at the computer.

72. The system of claim 65, wherein the master computer on the wireless side of a wireless half bridge instructs another computer on the wired side of a wireless half-bridge, comprising:

the master computer placing an additional copy of the address of the computer to be instructed inside the packet containing the instruction;

the master computer broadcasting the instruction packet to the entire network; and other computers failing to obey the instructions in broadcast instruction packets unless a copy of their own address is found within the instruction packet.

73. The system of claim 65, wherein the other computer on the wireless side of a wireless half bridge responds to an instruction from the master computer on the wired side of a wireless half-bridge, wherein the other computer places an additional copy of the address of the master computer inside the packet containing the response, the other computer broadcasts the instruction packet to the entire network, and the other computers ignore responses in broadcast response packets unless they are the master computer whose address is found within the response packet.

\* \* \* \* \*